United States Patent
Lemay et al.

(10) Patent No.: US 12,314,529 B2
(45) Date of Patent: May 27, 2025

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Stephen O. Lemay, Palo Alto, CA (US); Jeffrey M. Faulkner, Sisters, OR (US); Israel Pastrana Vicente, Spring, TX (US); Philipp Rockel, San Francisco, CA (US); Robert T. Tilton, Los Angeles, CA (US); William A. Sorrentino, III, Mill Valley, CA (US); Kristi E. S. Bauerly, Los Altos, CA (US); Peter D. Anton, Portola Valley, CA (US); Alan C. Dye, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/244,864

(22) Filed: Sep. 11, 2023

(65) Prior Publication Data

US 2023/0418432 A1    Dec. 28, 2023

Related U.S. Application Data

(63) Continuation of application No. 17/727,627, filed on Apr. 22, 2022, now Pat. No. 11,768,579, which is a
(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/017* (2013.01); *G06F 3/04817* (2013.01);
(Continued)

(58) Field of Classification Search
None
See application file for complete search history.

(56) References Cited

U.S. PATENT DOCUMENTS

| 5,528,735 A | 6/1996 | Strasnick et al. |
| 5,671,381 A | 9/1997 | Strasnick et al. |

(Continued)

FOREIGN PATENT DOCUMENTS

| CN | 103180893 A | 6/2013 |
| CN | 105264480 A | 1/2016 |

(Continued)

OTHER PUBLICATIONS

Office Action, dated Jun. 27, 2023, received in U.S. Appl. No. 18/107,375, 17 pages.
(Continued)

*Primary Examiner* — Edward Martello
(74) *Attorney, Agent, or Firm* — Morgan, Lewis & Bockius LLP

(57) ABSTRACT

An electronic device, while displaying a three-dimensional environment, including one or more virtual objects, detects gaze of a user directed toward a first virtual object in the three-dimensional environment. The gaze meets first criteria and the first virtual object is responsive to at least one gesture input. In response to detecting the gaze that meets the first criteria, in accordance with a determination that a hand is in a predefined ready state for providing gesture inputs, the electronic device displays an indication of one or more interaction options available for the first virtual object in the three-dimensional environment; and in accordance
(Continued)

with a determination the hand is not in the predefined ready state for providing gesture inputs, the electronic device forgoes displaying the indication of one or more interaction options available for the first virtual object.

48 Claims, 28 Drawing Sheets

Related U.S. Application Data continuation of application No. 17/030,200, filed on Sep. 23, 2020, now Pat. No. 11,340,756.

(60) Provisional application No. 62/907,480, filed on Sep. 27, 2019.

(51) Int. Cl.
  G06F 3/04817 (2022.01)
  G06T 7/70 (2017.01)
  G06T 15/00 (2011.01)

(52) U.S. Cl.
  CPC ............... *G06T 7/70* (2017.01); *G06T 15/00* (2013.01); *G06T 2200/24* (2013.01)

(56) References Cited

U.S. PATENT DOCUMENTS

| | | | |
|---|---|---|---|
| 5,861,885 | A | 1/1999 | Strasnick et al. |
| 6,480,210 | B1 | 11/2002 | Martino et al. |
| 7,834,846 | B1 | 11/2010 | Bell |
| 8,405,680 | B1 | 3/2013 | Cardoso Lopes et al. |
| 8,446,288 | B2 | 5/2013 | Mizushima et al. |
| 9,836,127 | B2 | 12/2017 | Jung |
| 10,055,887 | B1 | 8/2018 | Gil et al. |
| 10,261,595 | B1 | 4/2019 | Kin |
| 10,262,036 | B2 | 4/2019 | Paine et al. |
| 10,621,439 | B2 | 4/2020 | Fu |
| 10,725,308 | B1 | 7/2020 | Trail |
| 11,086,475 | B1 | 8/2021 | Ravasz et al. |
| 11,386,621 | B2 | 7/2022 | Abdoo et al. |
| 11,436,828 | B1 | 9/2022 | Little et al. |
| 2010/0241525 | A1 | 9/2010 | Aguera y arcas et al. |
| 2010/0289664 | A1 | 11/2010 | Mizushima et al. |
| 2012/0047468 | A1 | 2/2012 | Santos et al. |
| 2012/0113223 | A1 | 5/2012 | Hilliges et al. |
| 2013/0050432 | A1 | 2/2013 | Perez et al. |
| 2014/0282220 | A1 | 9/2014 | Wantland et al. |
| 2015/0042679 | A1 | 2/2015 | Jarvenpaa |
| 2015/0205484 | A1 | 7/2015 | Morishita et al. |
| 2015/0312559 | A1* | 10/2015 | Ueno ................... H04N 13/117 348/53 |
| 2016/0041619 | A1 | 2/2016 | Ishiwata et al. |
| 2016/0313790 | A1 | 10/2016 | Clement et al. |
| 2017/0343811 | A1 | 11/2017 | Mese et al. |
| 2017/0345219 | A1 | 11/2017 | Holz |
| 2018/0020312 | A1 | 1/2018 | Visser et al. |
| 2018/0053337 | A1 | 2/2018 | Nakashima et al. |
| 2018/0095636 | A1 | 4/2018 | Valdivia et al. |
| 2018/0189354 | A1 | 7/2018 | Paine et al. |
| 2018/0307303 | A1* | 10/2018 | Powderly ............... G06T 19/006 |
| 2019/0026936 | A1 | 1/2019 | Gorur Sheshagiri et al. |
| 2019/0035124 | A1 | 1/2019 | Kapinos et al. |
| 2019/0065027 | A1 | 2/2019 | Hauenstein et al. |
| 2019/0121517 | A1 | 4/2019 | Jackson et al. |
| 2019/0221035 | A1 | 7/2019 | Clark et al. |
| 2019/0236835 | A1 | 8/2019 | Gorur Sheshagiri et al. |
| 2019/0362556 | A1 | 11/2019 | Ben-Dor et al. |
| 2019/0394607 | A1 | 12/2019 | Laaksonen et al. |
| 2020/0026922 | A1 | 1/2020 | Pekelny et al. |
| 2020/0082555 | A1 | 3/2020 | Lyer et al. |
| 2020/0112711 | A1 | 4/2020 | Enriquez et al. |
| 2020/0211285 | A1 | 7/2020 | Abdoo et al. |
| 2020/0252739 | A1 | 8/2020 | Eronen et al. |
| 2020/0258278 | A1 | 8/2020 | Mirhosseini et al. |
| 2020/0273251 | A1 | 8/2020 | Palos et al. |
| 2021/0034222 | A1 | 2/2021 | Brems et al. |
| 2021/0081034 | A1 | 3/2021 | Olson et al. |
| 2021/0117712 | A1 | 4/2021 | Huang et al. |
| 2021/0233341 | A1 | 7/2021 | Hayes et al. |
| 2021/0364809 | A1 | 11/2021 | Olson et al. |
| 2022/0091723 | A1 | 3/2022 | Faulkner et al. |
| 2022/0092862 | A1 | 3/2022 | Faulkner et al. |
| 2022/0244835 | A1 | 8/2022 | Faulkner et al. |
| 2022/0284684 | A1 | 9/2022 | Abdoo et al. |
| 2023/0168788 | A1 | 6/2023 | Faulkner et al. |
| 2023/0186578 | A1 | 6/2023 | Faulkner et al. |

FOREIGN PATENT DOCUMENTS

| | | |
|---|---|---|
| CN | 106937531 A | 7/2017 |
| CN | 107548470 A | 1/2018 |
| JP | 2018-077876 | 5/2018 |
| KR | 2018-0017227 A | 2/2018 |
| WO | WO 2013/180966 A1 | 12/2013 |
| WO | WO 2019/046597 A1 | 3/2019 |
| WO | WO 2019/217163 A1 | 11/2019 |

OTHER PUBLICATIONS

Anonymous, "Micro-Gestures", https://web.archive.org/web/20190808194109/http://gestureml.org/doku.php/gestures/fusion/microgesture_index, Aug. 8, 2019, 5 pages.

Crasto, et al., "The Smart Bookshelf: A Study of Camera Projector Scene Augmentation of an Everyday Environment", 2005 Seventh IEEE Workshops on Applications of Computer Vision, Los Alamitos, CA USA, Jan. 5, 2005, 8 pages.

Butz et al., "Searchlight_A_Lightweight_Search_Function_for_Pervasive_Environments", Springer-Verlag, Berlin/Heidelberg, Mar. 23, 2004, 3 pages.

Darzentas et al., "Designed to Thrill: Exploring the Effects of Multimodal Feedback on Virtual World Immersion", International Conference, ICB Proceedings; (Lecture Notes in Computer Science; Lect.notes Computer), Springer, Berlin, Heidelberg, Jul. 21, 2015, 30 pages.

Lang, "Microsoft is Adding Pass-through Video to Windows VR Headsets", http://www.roadtovr.com/microsoft-is-adding-pass-through-video-to-windows-vr-headsets, Jul. 27, 2018, 2 pages.

Li Ming et al., "ProFi Design and Evaluation of a Product Finder in a Supermarket Scenario", proceedings of the 16th ACM International Conference on Modeling, Analysis & Simultation of Wireless and Mobile Systems, New York NY, Sep. 8, 2013, 8 pages.

Lu et al., "Attributes of Subtle Cues for Facilitating Visual Search in Augmented Reality", IEEE Transactions on Visualization and Computer Graphics, IEEE, USA, Mar. 21, 2014, 9 pages.

Microsoft HoloLens, "Gesture Input", https://www.youtube.com/watch?v=kwn9LhOE_vU, Feb. 29, 2016, 3 pages.

Microsoft, "Introducing Instinctual Interactions", http://docs.microsoft.com/en-us/windows/mixed-reality/gestures, Apr. 11, 2019, 7 pages.

Mitsushita et al., "Interactive Bookshelf Surface for in Situ Book Searching and Storing Support", Proceedings of the 2nd Augmented Human International Conference, ACM, 2 Penn Plaza, Suite 701 New York NY 10121-0701, Mar. 13, 2011, 8 pages.

Soliman, "FingerInput: Capturing Expressive Single-Hand Thumb-to-Finger Microgestures" Proceedings of the 2018 ACM International Conference on Interactive Surfaces and Spaces, New York, Nov. 19, 2018, 4 pages.

Whitmire et al., DigiTouch: Reconfigurable Thumb-to-Finger Input and Text Extry on Head-Mounted Displayshttps://upicomplab.cs.washington.edu/pdfs/digitouch.pdf, Sep. 2017, 21 pages.

Youtube, "Envisioning the Future with Windows Mixed Reality", https://www.youtube.com/watch?v=2MqGrF6JaOM, Jun. 1, 2016, 4 pages.

Youtube, "Interactive Light Source Position Estimation for Augmented Reality with an RGB-D Camera", http://www.youtube.com/watch?v=1WHW4cOEe6c, Nov. 6, 2016, 3 pages.

(56) References Cited

OTHER PUBLICATIONS

Youtube, "Job Simulator Gameplay—Office Worker—HTC Vive", http://www.youtube.com/watch?v=jF6RzK50fDs, Apr. 6, 2016, 3 pages.
Office Action, dated Aug. 16, 2021, received in U.S. Appl. No. 17/030,200, 21 pages.
Notice of Allowance, dated Feb. 3, 2022, received in U.S. Appl. No. 17/030,200, 8 pages.
Office Action, dated Sep. 6, 2022, received in Indian Patent Application No. 202217011878, which corresponds with U.S. Appl. No. 17/030,200. 9 pages.
Office Action, dated Mar. 6, 2023, received in Japanese Patent Application No. 2022-513681, which correspond with U.S. Appl. No. 17/030,200, 7 pages.
Notice of Allowance, dated Sep. 15, 2022, received in U.S. Appl. No. 17/483,717, 10 pages.
Office Action, dated Aug. 8, 2022, received in U.S. Appl. No. 17/483,722, 21 pages.
Notice of Allowance, dated Apr. 27, 2023, received in U.S. Appl. No. 17/727,627, 25 pages.
Invitation to Pay Additional Fees, dated Dec. 17, 2020, received in International Patent Application No. PCT/US2020/052640, which corresponds with U.S. Appl. No. 17/030,200, 18 pages.
International Search Report and Written Opinion, dated Feb. 8, 2021, received in International Patent Application No. PCT/US2020/052640, which corresponds with U.S. Appl. No. 17/030,200, 22 pages.
International Search Report and Written Opinion, dated Feb. 24, 2022, received in International Patent Application No. PCT/US2021/051976, which corresponds with U.S. Appl. No. 17/483,717, 57 pages.
International Search Report and Written Opinion, dated Mar. 14, 2022, received in International Patent Application No. PCT/US2021/052016, which corresponds with U.S. Appl. No. 17/483,722, 19 pages.
U.S. Appl. No. 17/030,200 (English version of JP2022546502), filed Sep. 23, 2020, Faulkner et al.
Office Action, dated Oct. 12, 2023, received in Australian Patent Application No. 2020351739, which corresponds with U.S. Appl. No. 17/030,200, 3 pages.
Final Office Action, dated Oct. 2, 2023, received in Japanese Patent Application No. 2022-513681, which correspond with U.S. Appl. No. 17/030,200, 1 page.
Final Office Action, dated Oct. 10, 2023, received in U.S. Appl. No. 18/107,375 (7935), 23 pages.
Office Action, dated Dec. 20, 2023, received in Korean Patent Application No. 2022-7007798, which corresponds with U.S. Appl. No. 17/030,200, 5 pages.
U.S. Appl. No. 11/494,988 B2 filed Nov. 8, 2022, Ben-Dor et al..
Notice of Allowance, dated Jan. 23, 2024, received in Australian Patent Application No. 2020351739, which corresponds with U.S. Appl. No. 17/030,200, 3 pages.
Certificate of Grant, dated May 23, 2024, received in Australian Patent Application No. 2020351739, which corresponds with U.S. Appl. No. 17/030,200, 3 pages.
Office Action, dated Apr. 29, 2024, received in Chinese Patent Application No. 202210375296X, which corresponds with U.S. Appl. No. 17/030,200, 2 pages.
Office Action, dated Jan. 4, 2025, received in Chinese Patent Application No. 202210375296X, which corresponds with U.S. Appl. No. 17/030,200, 2 pages.
Notice of Allowance, dated Mar. 4, 2024, received in Japanese Patent Application No. 2022-513681, which corresponds with U.S. Appl. No. 17/030,200, 2 pages.
Patent, dated Apr. 3, 2024, received in Japanese Patent Application No. 2022-513681, which corresponds with U.S. Appl. No. 17/030,200, 7 pages.
Notice of Allowance, dated Aug. 22, 2024, received in Korean Patent Application No. 2022-7007798, which corresponds with U.S. Appl. No. 17/030,200, 5 pages.
Office Action, dated Jul. 18, 2024, received in European Patent Application No. 21799406.0, which corresponds with U.S. Appl. No. 17/483,722, 10 pages.
Office Action, dated Jul. 29, 2024, received in Japanese Patent Application No. 2023-315649, which corresponds with U.S. Appl. No. 17/483,722, 4 pages.
Patent, dated Nov. 12, 2024, received in Japanese Patent Application No. 2023-315649, which corresponds with U.S. Appl. No. 17/483,722, 2 pages.
Office Action, dated Mar. 15, 2024, received in U.S. Appl. No. 18/097,136, 17 pages.
Final Office Action, dated Oct. 8, 2024, received in U.S. Appl. No. 18/097,136, 19 pages.
Office Action, dated Feb. 16, 2024, received in U.S. Appl. No. 18/107,375, 23 pages.
Final Office Action, dated Apr. 22, 2024, received in U.S. Appl. No. 18/107,375, 9 pages.
Notice of Allowance, dated Jul. 16, 2024, received in U.S. Appl. No. 18/107,375, 9 pages.

\* cited by examiner

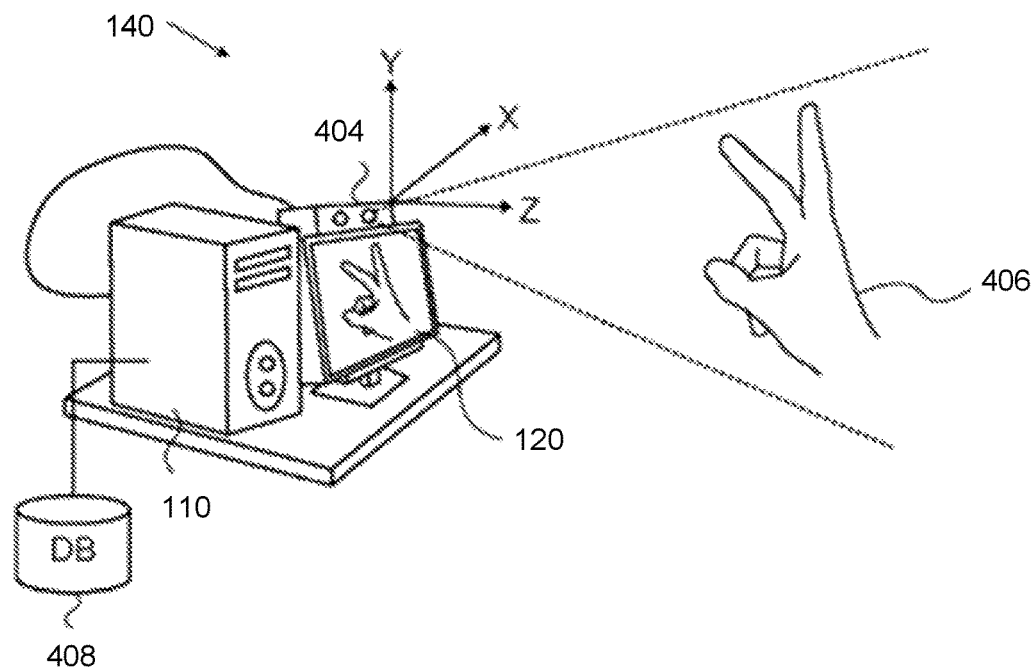
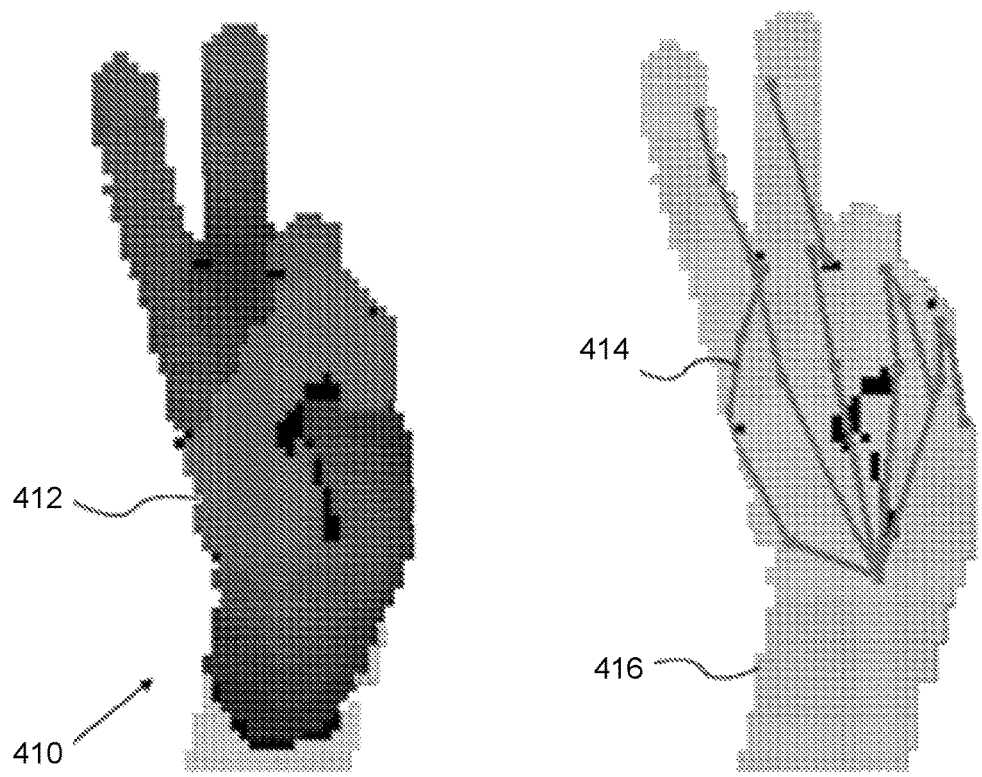
Figure 4

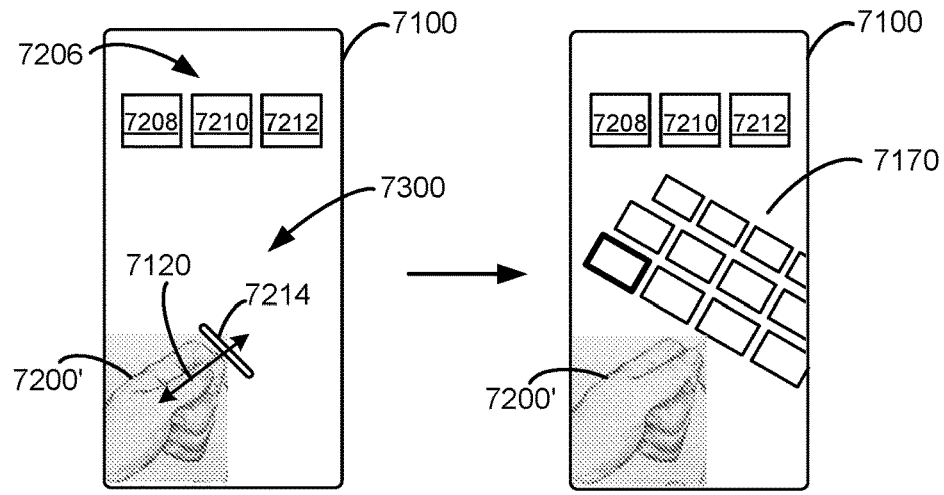
(A)
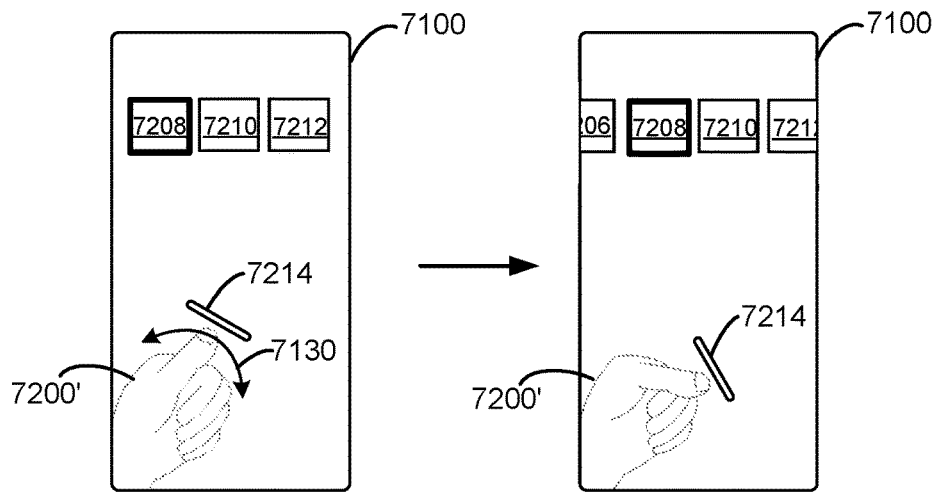
(B)
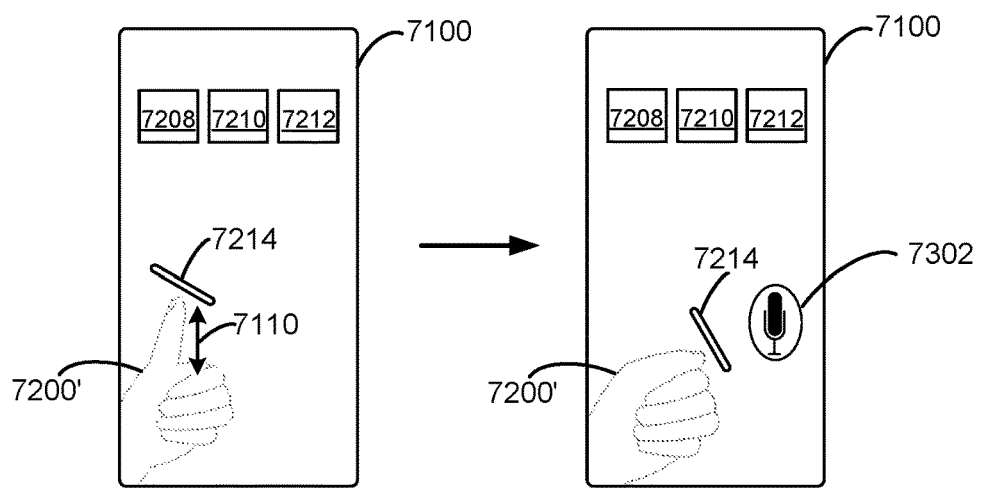
(C)
Figure 7F

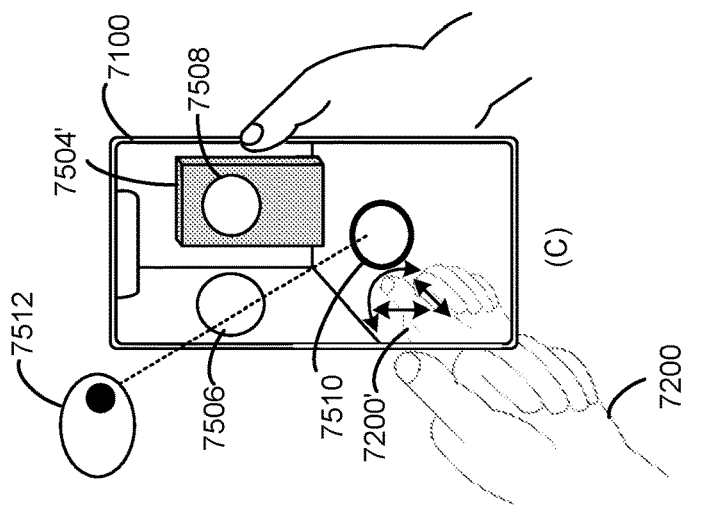
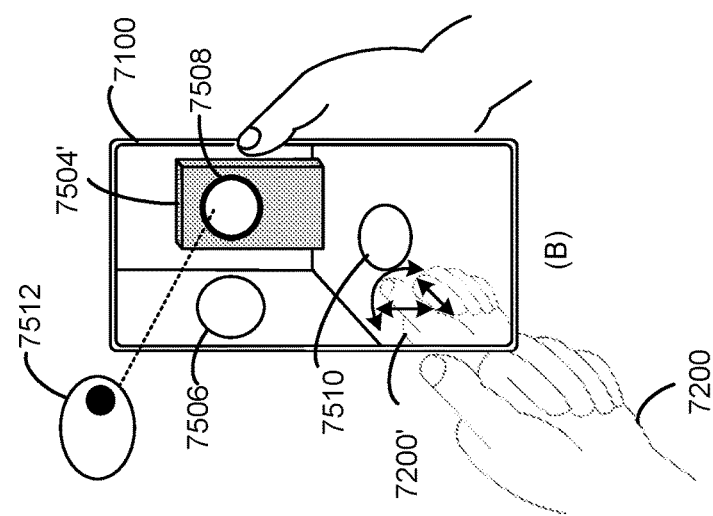
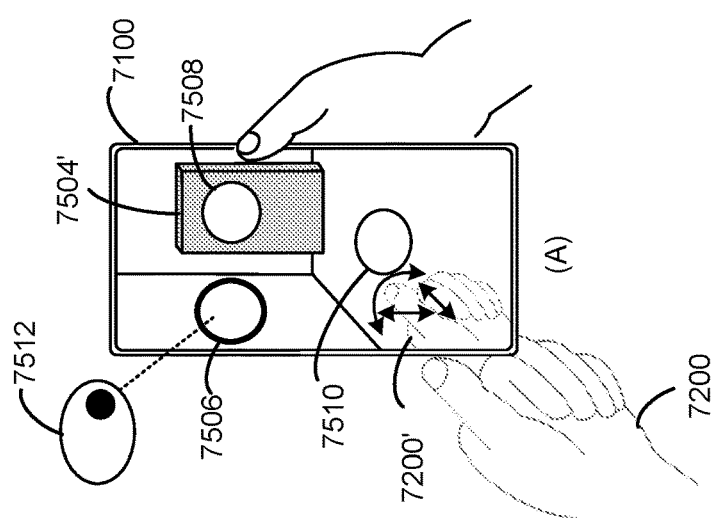
Figure 7J

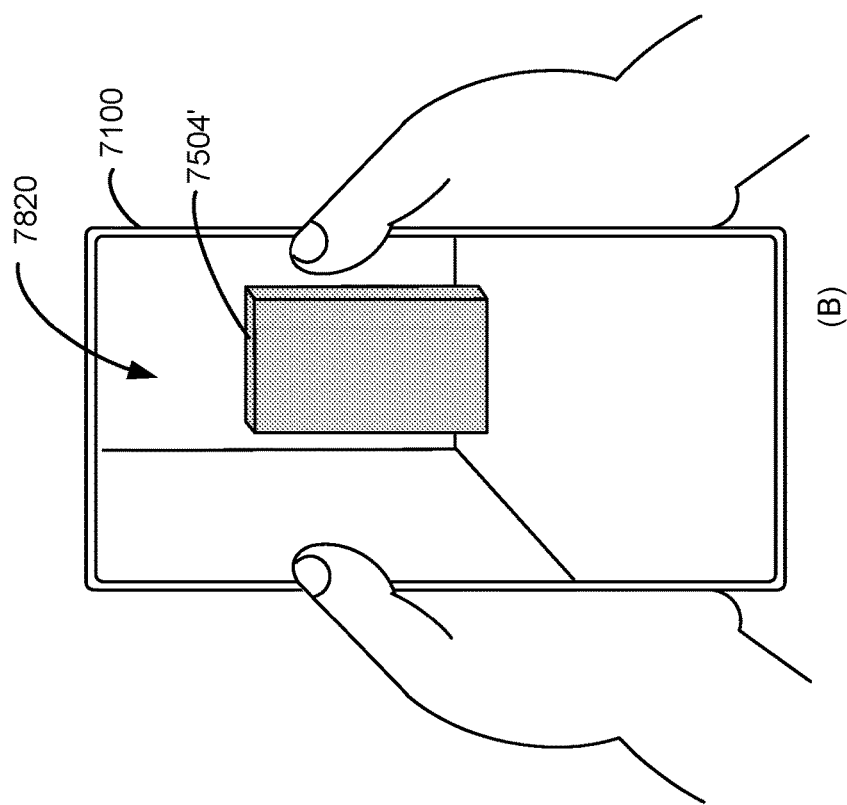
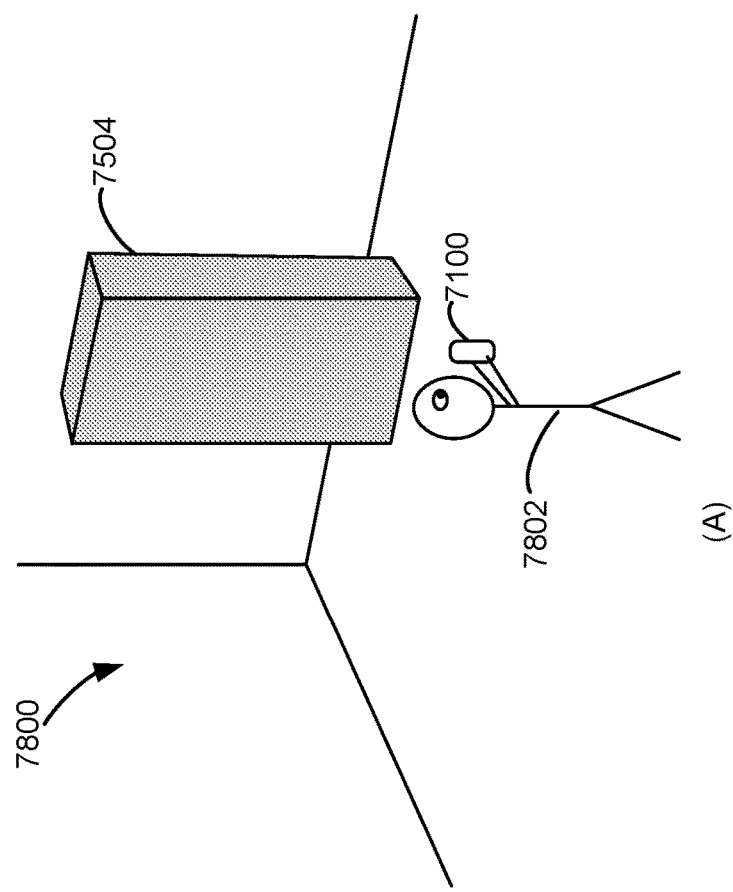
Figure 7K

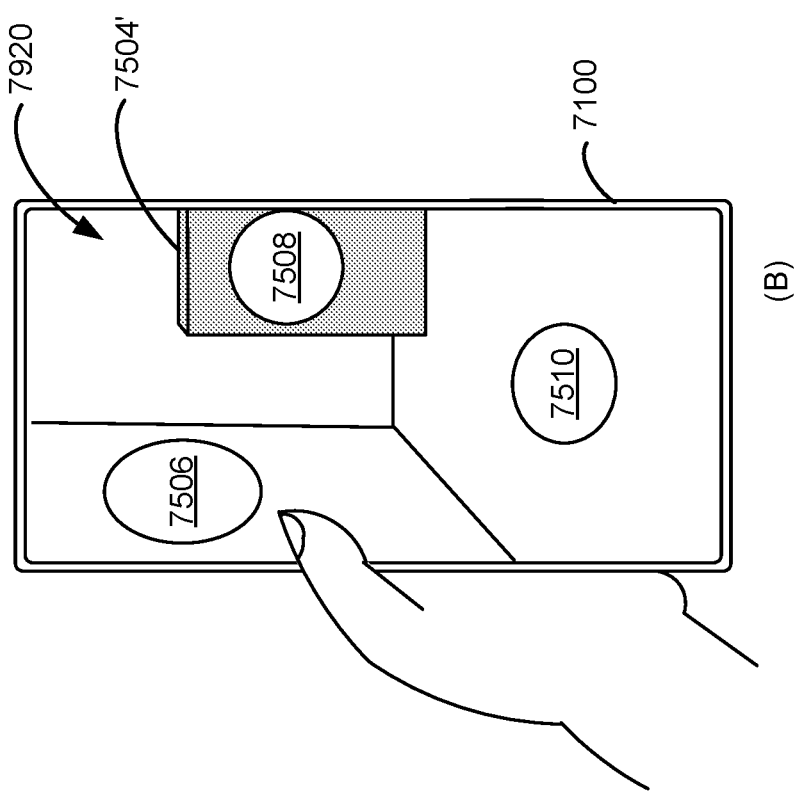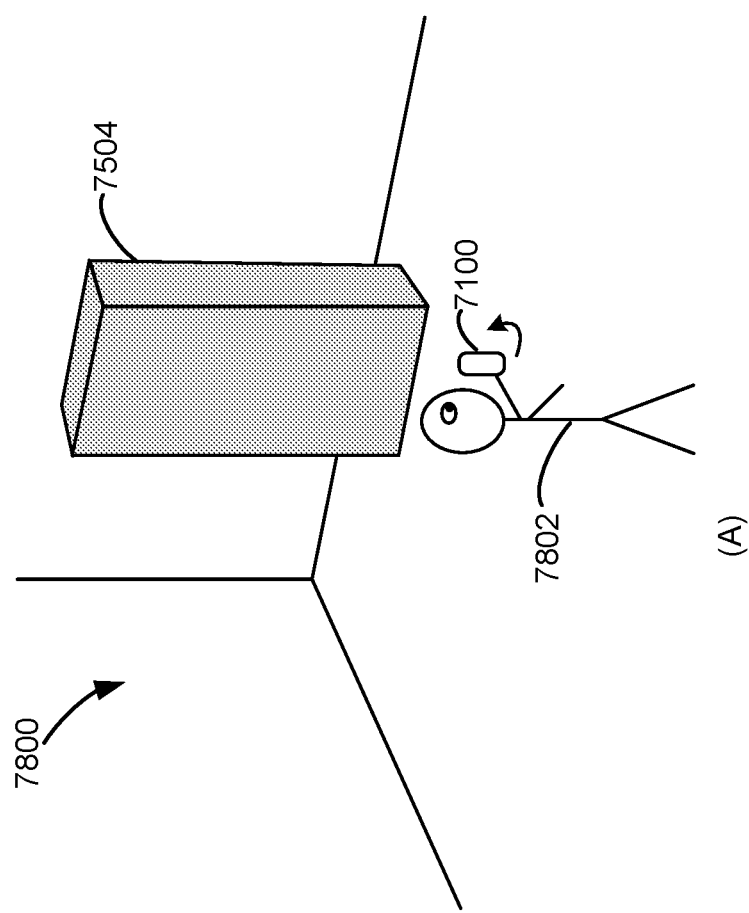
Figure 7L

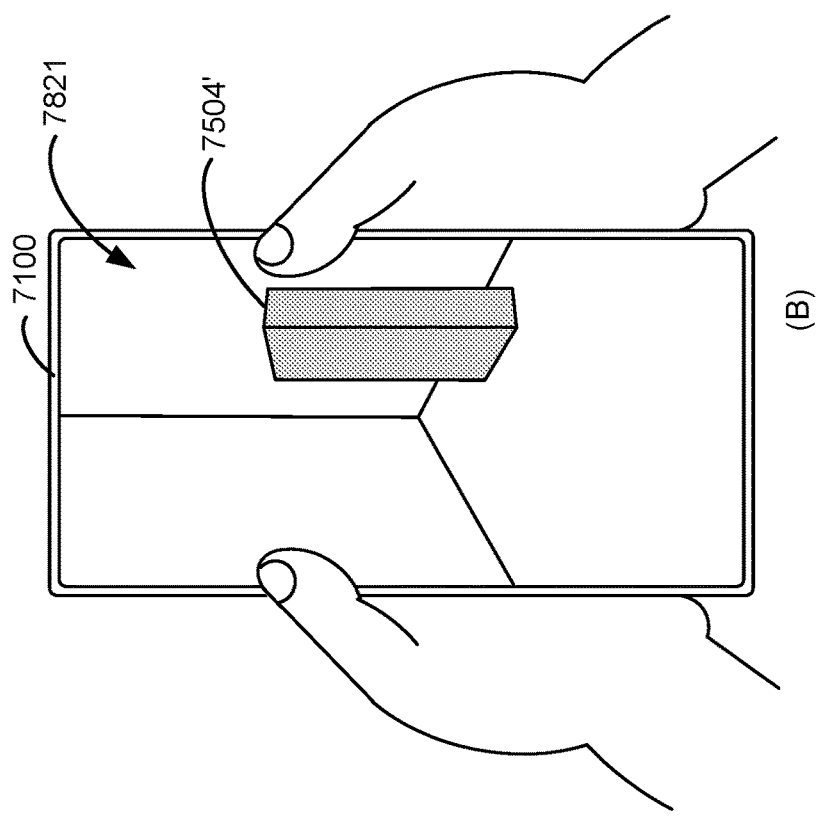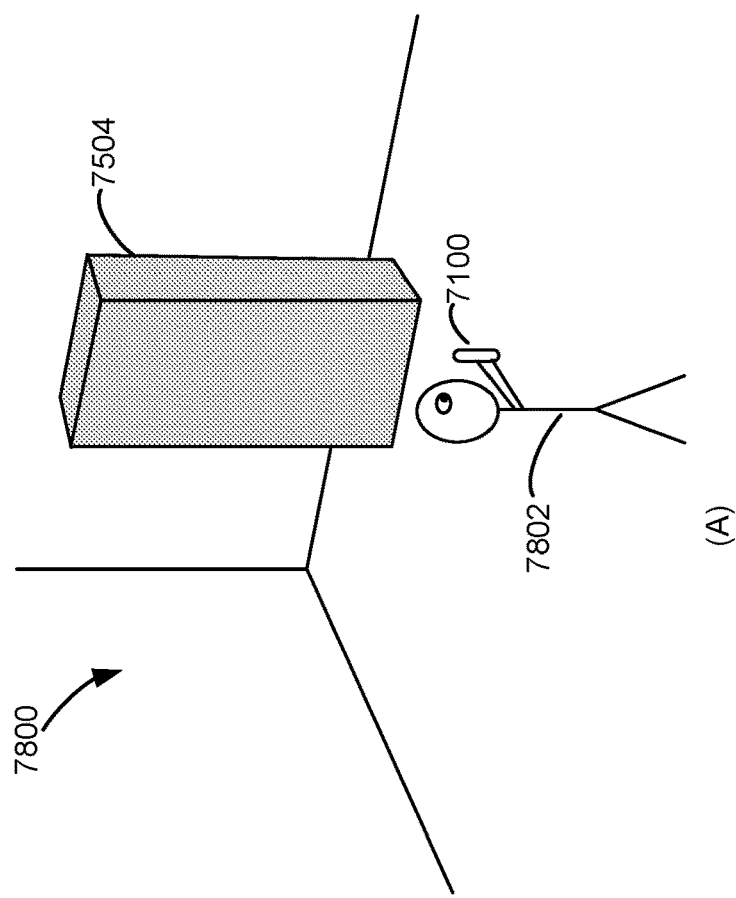
Figure 7M

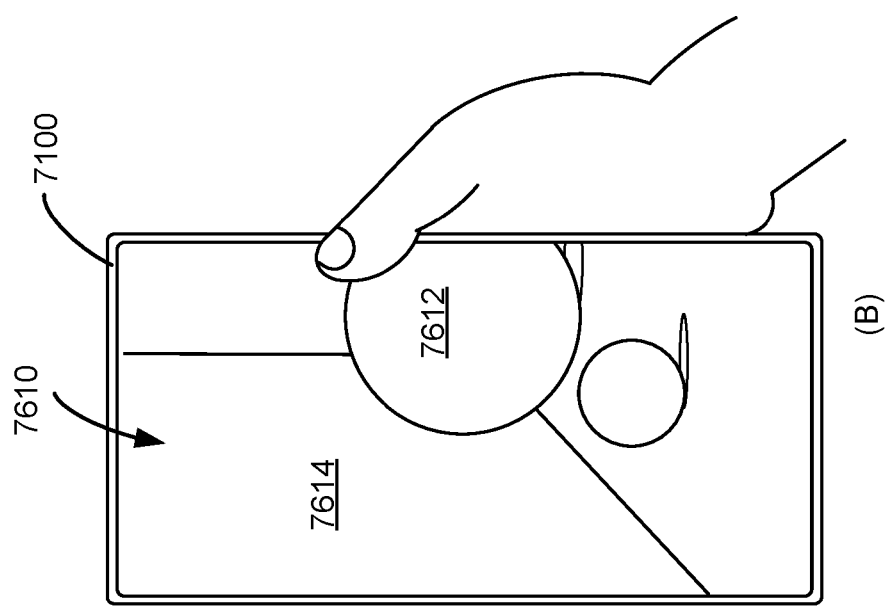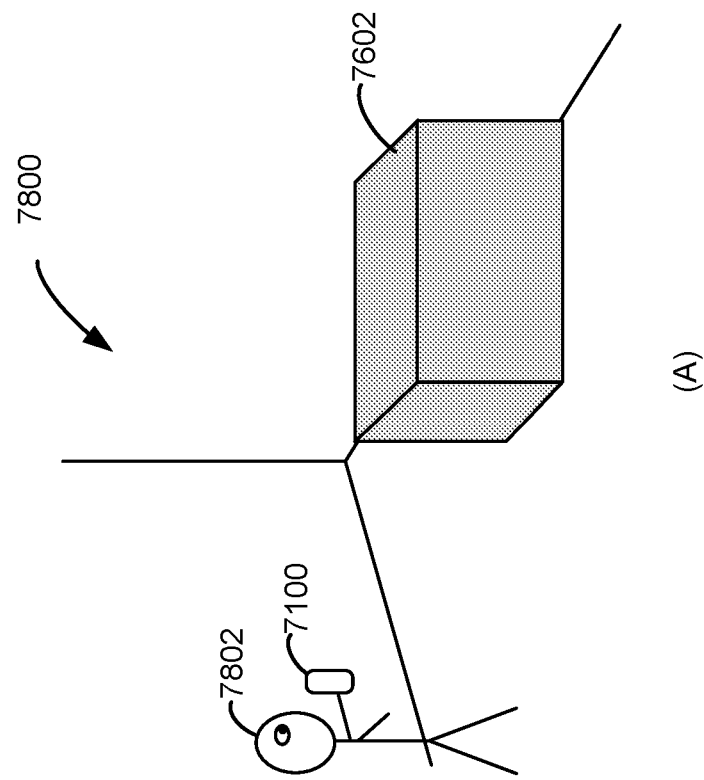
Figure 7N

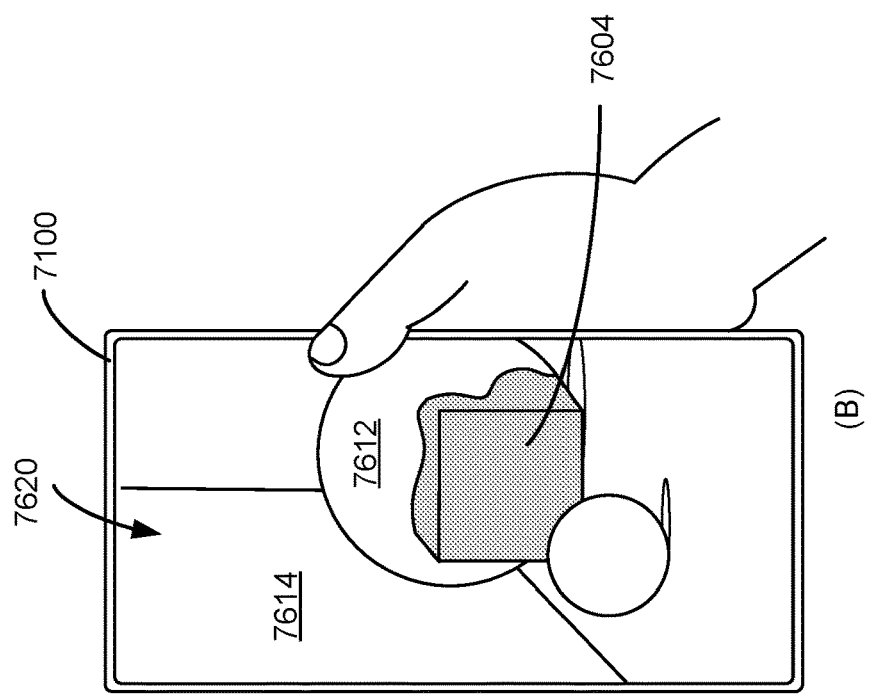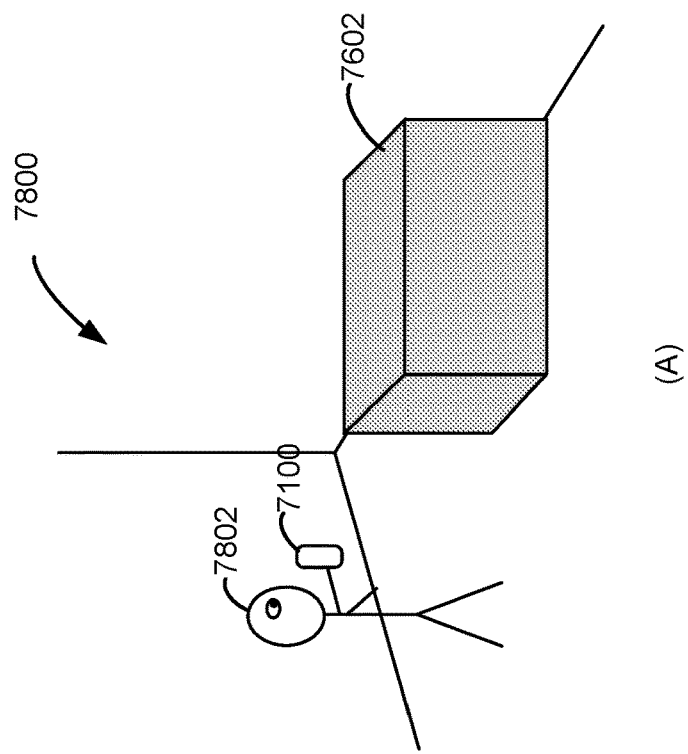
Figure 7O

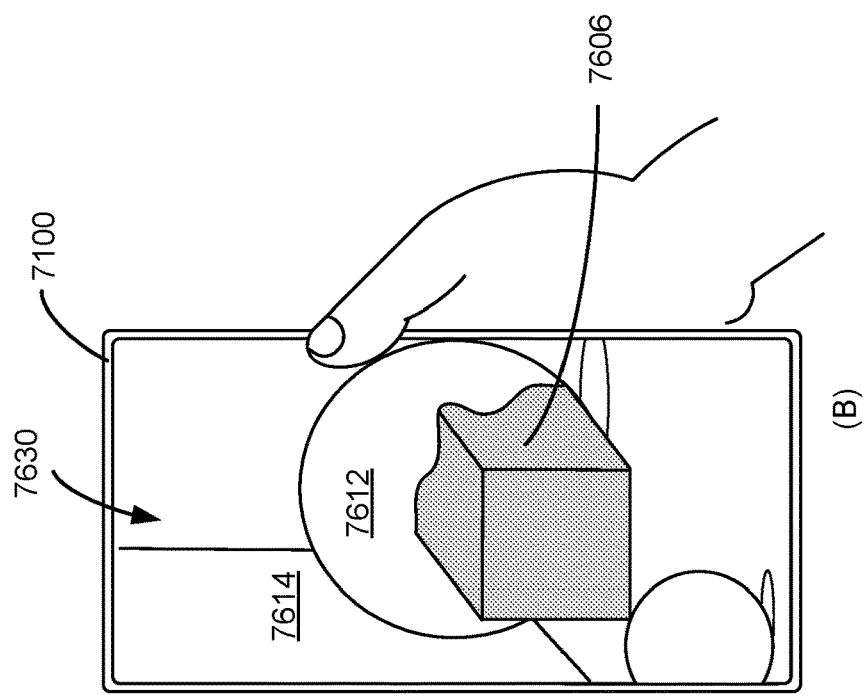
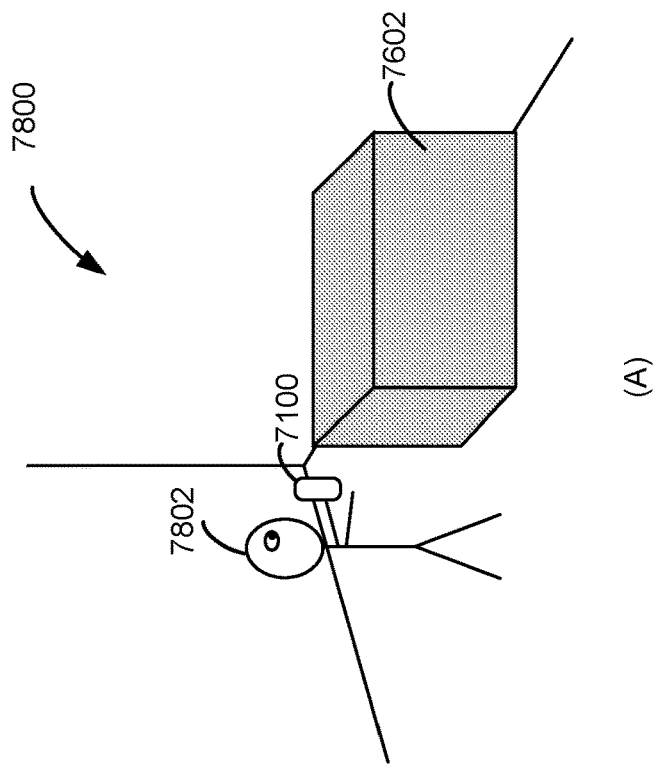
Figure 7P

8000

8002 Display a view of a three-dimensional environment.

8004 While displaying the view of the three-dimensional environment, detect movement of a user's thumb over the user's index finger of a first hand of the user using the one or more cameras.

8006 In response to detecting the movement of the user's thumb over the user's index finger using the one or more cameras, including:

in accordance with a determination that the movement is a swipe of the thumb over the index finger of the first hand in a first direction, perform a first operation; and in accordance with a determination that the movement is a tap of the thumb over the index finger at a first location on the index finger of the first hand, perform a second operation that is different from the first operation.

| 9002 Display a view of a three-dimensional environment. |

| 9004 While displaying the view of the three-dimensional environment, detect a hand at a first position that corresponds to a portion of the three-dimensional environment. |

9006 In response to detecting the hand at the first position that corresponds to the portion of the three-dimensional environment, including:

in accordance with a determination that the hand is being held in a first predefined configuration, display a visual indication of a first operation context for gesture input using hand gestures in the three-dimensional environment; and in accordance with a determination that the hand is not being held in the predefined configuration, forgo display of the visual indication of the first operation context for gesture input using hand gestures in the three-dimensional environment.

10002 Display a three-dimensional environment, including displaying a representation of a physical environment.

10004 While the representation of the physical environment, detect a gesture.

10006 In response to detecting the gesture, including:

in accordance with a determination that a user's gaze is directed to a location that corresponds to a predefined physical location in the physical environment, display a system user interface in the three-dimensional environment; and in accordance with a determination that the user's gaze is not directed to the location that corresponds to the predefined physical location in the physical environment, perform an operation in a current context of the three-dimensional environment without displaying the system user interface.

```
┌─────────────────────────────────────────────────────────────────────────┐
│ 12002 Detect placement of the display generation component in a         │
│ predefined position relative to a user of the computer system.          │
└─────────────────────────────────────────────────────────────────────────┘
                                    │
                                    ▼
┌─────────────────────────────────────────────────────────────────────────┐
│ 12004 In response to detecting the placement of the display generation  │
│ component in the predefined position relative to the user of the        │
│ computer system, display, through the display generation component, a   │
│ first view of a three-dimensional environment including a pass-through  │
│ portion, wherein the pass-through portion includes a representation of  │
│ at least a portion of a real world surrounding the user.                │
└─────────────────────────────────────────────────────────────────────────┘
                                    │
                                    ▼
┌─────────────────────────────────────────────────────────────────────────┐
│ 12006 While displaying the first view of the three-dimensional          │
│ environment including the pass-through portion, detect a change in grip │
│ of the hand on a housing that is physically coupled with the display    │
│ generation component.                                                   │
└─────────────────────────────────────────────────────────────────────────┘
                                    │
                                    ▼
┌─────────────────────────────────────────────────────────────────────────┐
│      12008 In response to detecting the change in grip of the hand on   │
│ the housing that is physically coupled with the display generation      │
│ component, including:                                                   │
│           in accordance with a determination that the change in grip of │
│ the hand on the housing that is physically coupled with the display     │
│ generation component meets first criteria, replace the first view of    │
│ the three-dimensional environment with a second view of the three-      │
│ dimensional environment, wherein the second view replaces at least a    │
│ portion of the pass-through portion with virtual content.               │
└─────────────────────────────────────────────────────────────────────────┘
```

13002 Display, via the display generation component, a view of a virtual environment.

---

13004 While displaying the view of the virtual environment and while the view of the virtual environment does not include a visual representation of a first portion of a first physical object present in a physical environment in which a user is located, detect first movement of the user in the physical environment.

---

13006 In response to detecting the first movement of the user in the physical environment, including:

in accordance with a determination that the user is within a threshold distance of the first portion of the first physical object, wherein the first physical object has an extent that is potentially visible to the user based on a field of view of the user for the virtual environment, change an appearance of the view of the virtual environment in a first manner that indicates a physical characteristic of the first portion of the first physical object, without changing an appearance of the view of the virtual environment to indicate a second portion of the first physical object that is part of the extent of the first physical object that is potentially visible to the user based on the field of view of the user for the virtual environment; and in accordance with a determination that the user is not within the threshold distance of the first physical object present in the physical environment surrounding the user, forgo changing the appearance of the view of the virtual environment in the first manner that indicates the physical characteristic of the first portion of the first physical object.

Figure 13

DEVICES, METHODS, AND GRAPHICAL USER INTERFACES FOR INTERACTING WITH THREE-DIMENSIONAL ENVIRONMENTS

RELATED APPLICATIONS

This application is a continuation of U.S. application Ser. No. 17/727,627, filed Apr. 22, 2022, which is a continuation of U.S. application Ser. No. 17/030,200, filed Sep. 23, 2020, now U.S. Pat. No. 11,340,756, which claims priority to U.S. Provisional Patent Application No. 62/907,480, filed Sep. 27, 2019, which are hereby incorporated by reference in their entirety.

TECHNICAL FIELD

This disclosure relates generally to computer systems with a display generation component and one or more input devices that provide computer generated experiences, including but not limited to electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface.

In accordance with some embodiments, a method is performed at a computer system including a display generation component and one or more cameras, including: displaying a view of a three-dimensional environment; while displaying the view of the three-dimensional environment, detecting movement of a user's thumb over the user's index finger of a first hand of the user using the one or more cameras; in response to detecting the movement of the user's thumb over the user's index finger using the one or more cameras: in accordance with a determination that the movement is a swipe of the thumb over the index finger of the first hand in a first direction, performing a first operation; and in accordance with a determination that the movement is a tap of the thumb over the index finger at a first location on the index finger of the first hand, performing a second operation that is different from the first operation.

In accordance with some embodiments, a method is performed at a computing system including a display generation component and one or more input devices, including displaying a view of a three-dimensional environment; while displaying the three-dimensional environment, detecting a hand at a first position that corresponds to a portion of the three-dimensional environment; in response to detecting the hand at the first position that corresponds to the portion of the three-dimensional environment: in accordance with a determination that the hand is being held in a first predefined configuration, displaying a visual indication of a first operation context for gesture input using hand gestures in the three-dimensional environment; and in accordance with a determination that the hand is not being held in the first predefined configuration, forgoing display of the visual indication of the first operation context for gesture input using hand gestures in the three-dimensional environment.

In accordance with some embodiments, a method is performed at a computer-system including a display generation component and one or more input devices, including: displaying a three-dimensional environment, including displaying a representation of a physical environment; while displaying the representation of the physical environment, detecting a gesture; and in response to detecting the gesture: in accordance with a determination that a user's gaze is directed to a location that corresponds to a predefined physical location in the physical environment, displaying a system user interface in the three-dimensional environment; and in accordance with a determination that the user's gaze is not directed to the location that corresponds to the predefined physical location in the physical environment, performing an operation in a current context of the three-dimensional environment without displaying the system user interface.

In accordance with some embodiments, a method is performed at an electronic device including a display generation component and one or more input devices, including: displaying a three-dimensional environment, including one or more virtual objects; detecting gaze directed toward a first object in the three-dimensional environment, wherein the gaze meets first criteria and the first object is responsive to at least one gesture input; and in response to detecting the gaze that meets the first criteria and that is toward the first object responsive to at least one gesture input: in accordance with a determination that a hand is in a predefined ready state for providing gesture inputs, displaying an indication of one or more interaction options available for the first object in the three-dimensional environment; and in accordance with a determination the hand is not in the predefined ready state for providing gesture inputs, forgoing displaying the indication of one or more interaction options available for the first object.

There is a need for electronic devices with improved methods and interfaces for facilitating the user's use of the electronic devices for interacting with a three-dimensional environment. Such methods and interfaces may complement or replace conventional methods for facilitating the user's user of the electronic devices for interacting with a three-dimensional environment. Such methods and interfaces produce a more efficient human-machine interface and allow the user more control of the device, allow the user to use the device with better safety, reduced cognitive burden, and improved user experience.

In some embodiments, a method is performed at a computer system including a display generation component and one or more input devices, including: detecting placement of the display generation component in a predefined position relative to a user of the electronic device; in response to detecting the placement of the display generation component in the predefined position relative to the user of the computer system, displaying, through the display generation component, a first view of a three-dimensional environment including a pass-through portion, wherein the pass-through portion includes a representation of at least a portion of a real world surrounding the user; while displaying the first view of the three-dimensional environment including the pass-through portion, detecting a change in grip of the hand on a housing that is physically coupled with the display generation component; and in response to detecting the change in grip of the hand on the housing that is physically coupled with the display generation component: in accordance with a determination that the change in grip of the hand on the housing that is physically coupled with the display generation component meets first criteria, replacing the first view of the three-dimensional environment with a second view of the three-dimensional environment, wherein the second view replaces at least a portion of the pass-through portion with virtual content.

In some embodiments, a method is performed at a computer system including a display generation component and one or more input device, including: displaying, via the display generation component, a view of a virtual environment; while displaying the view of the virtual environment and while the view of the virtual environment does not include a visual representation of a first portion of a first physical object present in a physical environment in which a user is located, detecting first movement of the user in the physical environment; and in response to detecting the first movement of the user in the physical environment: in accordance with a determination that the user is within a threshold distance of the first portion of the first physical object, wherein the first physical object has an extent that is potentially visible to the user based on a field of view of the user for the virtual environment, changing an appearance of the view of the virtual environment in a first manner that indicates a physical characteristic of the first portion of the first physical object, without changing an appearance of the view of the virtual environment to indicate a second portion of the first physical object that is part of the extent of the first physical object that is potentially visible to the user based on the field of view of the user for the virtual environment; and in accordance with a determination that the user is not within the threshold distance of the first physical object present in the physical environment surrounding the user, forgoing changing the appearance of the view of the virtual environment in the first manner that indicates the physical characteristic of the first portion of the first physical object.

In accordance with some embodiments, a computer system includes a display generation component (e.g., a display, a projector, a head-mounted display, etc.), one or more input devices (e.g., one or more cameras, a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's user of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 7A-7J are block diagrams illustrating user interactions with a three-dimensional environment, in accordance with some embodiments.

FIGS. 7K-7P are block diagrams illustrating methods for facilitating the user's use of a device in a physical environment for interacting with a computer-generated three-dimensional environment, in accordance with some embodiments.

FIG. 8 is a flowchart of a method of interacting with a three-dimensional environment, in accordance with some embodiments.

FIG. 9 is a flowchart of a method of interacting with a three-dimensional environment, in accordance with some embodiments.

FIG. 10 is a flowchart of a method of interacting with a three-dimensional environment, in accordance with some embodiments.

FIG. 12 is a flowchart of a method of facilitating a user's transition in and out of a three-dimensional environment, in accordance with some embodiments.

FIG. 13 is a flowchart of a method of facilitating a user's transition in and out of a three-dimensional environment, in accordance with some embodiments.

DESCRIPTION OF EMBODIMENTS

Figure 1:
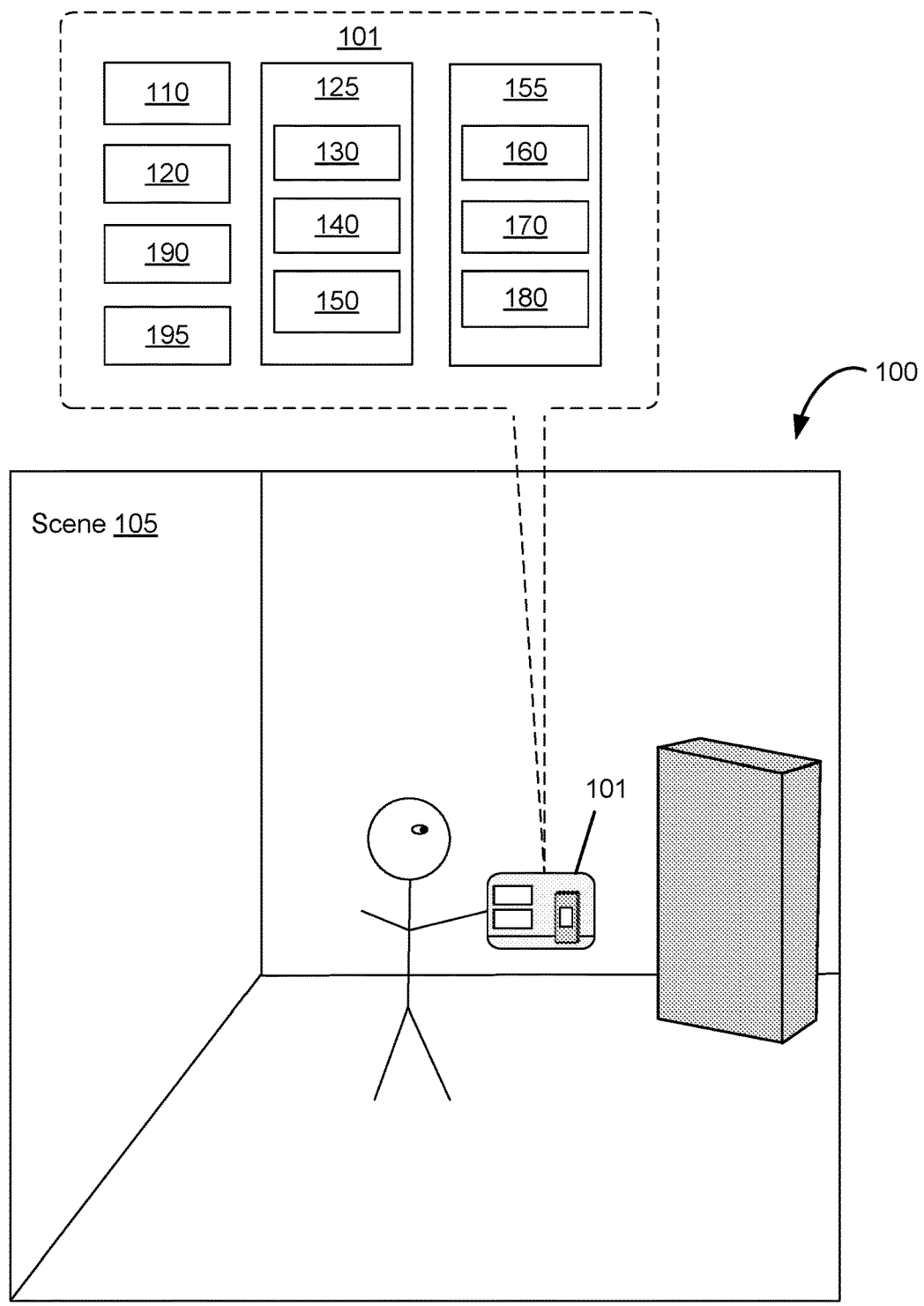
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein improve user interface interactions with virtual/augmented reality environments in multiple ways.

In some embodiments, a computer system allows a user to use micro-gestures performed with small movements of fingers relative to other fingers or parts of the same hand to interact with a three-dimensional environment (e.g., a virtual or mixed reality environment). The micro-gestures are detected using cameras (e.g., cameras integrated with a head-mounted device or installed away from the user (e.g., in a CGR room)), e.g., as opposed to touch-sensitive surfaces or other physical controllers. Different movements and locations of the micro-gestures and various movement parameters are used to determine the operations that are performed in the three-dimensional environment. Using the cameras to capture the micro-gestures to interact with the three-dimensional environment allow the user to freely move about the physical environment without be encumbered by physical input equipment, which allows the user to explore the three-dimensional environment more naturally and efficiently. In addition, micro-gestures are discrete and unobtrusive, and are suitable for interactions that may occur in public and/or require decorum.

In some embodiments, a ready state configuration of the hand is defined. An additional requirement that the hand is detected at a position that corresponds to a portion of the displayed three-dimensional environment ensures that the ready state configuration of the hand is not accidentally recognized by the computer system. The ready state configuration of the hand is used by a computer system as an indication that the user intends to interact with the computer system in a predefined operation context that is different from the currently displayed operation context. For example, the predefined operation context is one or more interactions with the device that is outside of the currently displayed application (e.g., game, communication session, media playback session, navigation etc.). The predefined operation context is optionally system interactions, such as displaying a home or start user interface from which other experiences and/or applications can be started, a multitasking user interface from which recently displayed experiences and/or applications can be selected and restarted, a control user interface for adjusting one or more device parameters of the computer system (e.g., brightness of the display, audio volume, network connection, etc.). Using a special hand gesture to trigger display of a visual indication of a predefined operation context for gesture inputs that is distinct from the currently displayed operation context allow the user to easily access the predefined operation context, without cluttering the three-dimensional environment with visual controls and without accidentally triggering interactions in the predefined operation context.

In some embodiments, a physical object or a portion thereof (e.g., the use's hand or a hardware device) is chosen by the user or the computer system to be associated with a system user interface (e.g., a control user interface for a device) that is not currently displayed in a three-dimensional environment (e.g., a mixed reality environment). When the user's gaze is directed to a location in the three-dimensional environment other than that corresponding to the predefined physical object or portion thereof, a gesture performed by the user's hand causes performance of an operation in a currently displayed context without causing display of the system user interface; and when the user's gaze is directed to a location in the three-dimensional environment that corresponds to the predefined physical object or option thereof, a gesture performed by the user's hand causes display of the system user interface. Selectively performing an operation in a currently displayed operating context or displaying the system user interface in response to an input gesture, based on whether the user's gaze is being directed to a predefined physical object (e.g., the user's hand that performs the gesture or a physical object that the user intends to control using the gesture) allows the user to efficiently interact with the three-dimensional environment in more than one context, without visually cluttering the three-dimensional environment with multiple controls, and improves the interaction efficiency of the user interfaces (e.g., reducing the number of inputs required to achieve a desired outcome).

In some embodiments, the user's gaze directed to a virtual object in a three-dimensional environment that is responsive to gesture inputs causes visual indication of one or more interaction options available for the virtual object to be displayed only if the user's hand is also found to be in a predefined ready state for providing gesture inputs. If the user's hand is not found in the ready state for providing gesture inputs, the user's gaze being directed to the virtual object does not trigger display of the visual indication. Using a combination of the user's gaze and the ready state of the user's hand to determine whether to display visual indication of whether a virtual object has associated interaction options for gesture inputs provide useful feedback to the user when the user explores the three-dimensional environment using his/her eyes, without unnecessarily bombarding the user with constant changes in the displayed environment when the user shifts her gaze around the three-dimensional environment, reducing confusion to the user when exploring the three-dimensional environment.

In some embodiments, when a user places a display generation component of the computer system in a predefined position relative to the user (e.g., putting a display in front of his/her eyes, or putting a head-mounted device on his/her head), the user's view of the real world is blocked by the display generation component, and the content presented by the display generation component dominates the user's view. Sometimes, the user benefits from a more gradual and controlled process for transitioning from the real world into the computer generated experiences. As such, when displaying content to the user through the display generation component, the computer system displays a pass-through portion that includes a representation of at least a portion of the real world surrounding the user, and display virtual content that replaces at least a portion of the pass-through portion only in response to detecting a change in grip of the user's hand on the housing of the display generation component. The change in grip of the user's hand is used as an indication that the user is ready to transition into a more immersive experience than that currently presented through the display generation component. The staged transition in and out of the immersive environment as controlled by the user's change in hand grip on the housing of the display generation component is intuitive and natural to the user, and improves the user's experience and comfort when using the computer system for computer-generated immersive experiences.

In some embodiments, when a computer system displays a virtual three-dimensional environment, the computer system applies visual changes to a portion of the virtual environment at locations that correspond to locations of portions of a physical object that has come within a threshold distance of the user and that are potentially within the field of view of the user for the virtual environment (e.g., the portions of the physical object would be visible to the user but for the presence of the display generation component blocking the user's view of the real world around the user). In addition, instead of simply presenting all portions of the physical object that are potentially within the field, the portions of the physical object that are not within the threshold distance of the user are not visually represented to the user (e.g., by altering the appearance of portions of the virtual environment at locations corresponding to these portions of the physical object not within the threshold distance of the user). In some embodiments, the visual changes applied to portions of the virtual environment are such that one or more physical characteristics of the portions of the physical object that are within the threshold distance of the user are represented in the virtual environment without completely ceasing to display those portions of the virtual environment or completely ceasing to provide the immersive virtual experience to the user. This technique allows the user to be alerted of physical obstacles that are close to the user as the user moves about in the physical environment while exploring an immersive virtual environment, without being overly intrusive and disruptive to the immersive virtual experience of the user. Thus, a safer and smoother immersive virtual experience can be provided to the user.

FIGS. 1-6 provide a description of example computer systems for providing CGR experiences to users. FIGS.

Figure 7A:
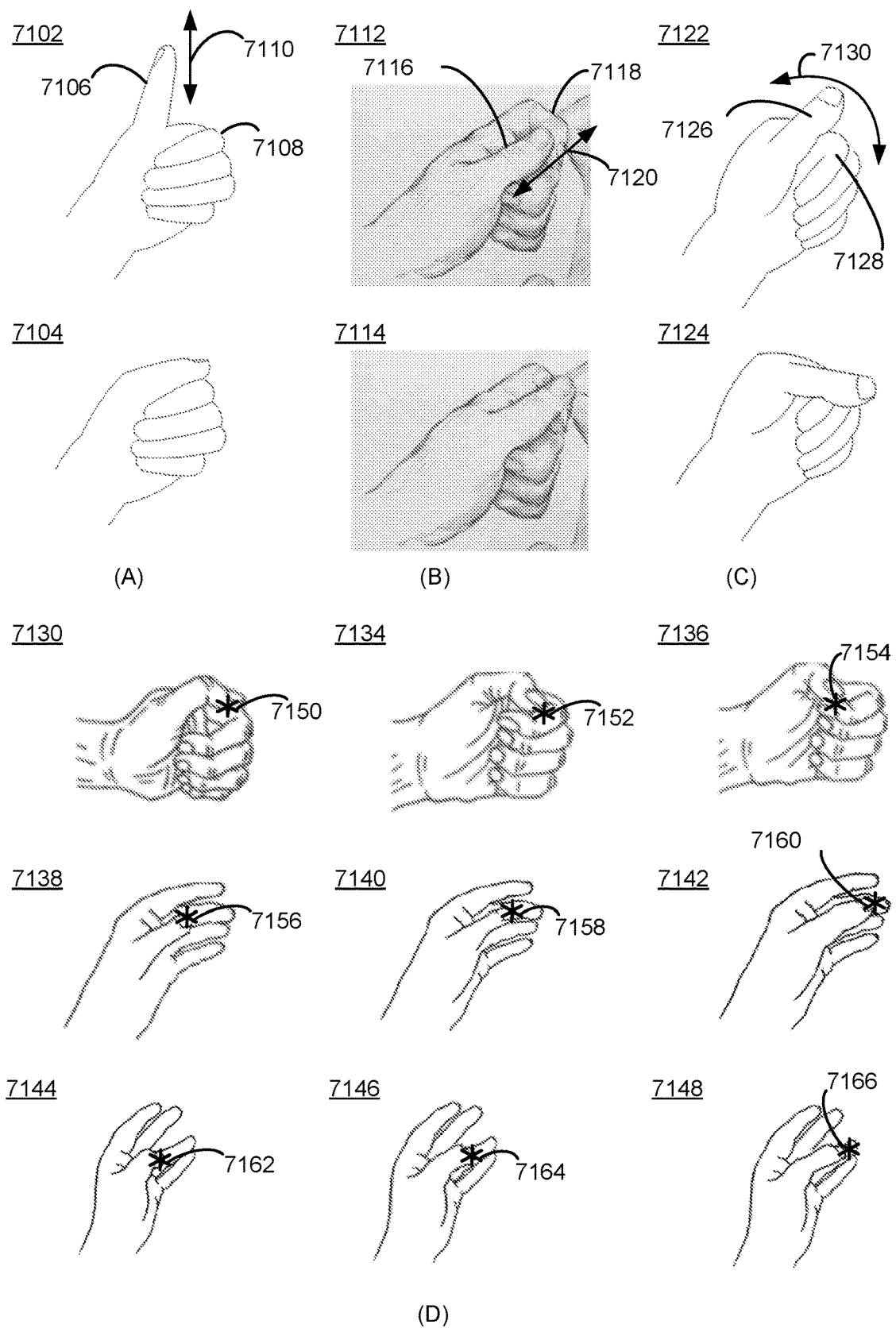

7A-7G illustrate example interactions with a three-dimensional environment using gestures inputs and/or gaze inputs, in accordance with some embodiments. FIGS. 7K-7M illustrate example user interfaces displayed when the user transitions in and out of interactions with a three-dimensional environment, in accordance with some embodiments. FIGS. 7N-7P illustrate example user interfaces displayed when the user moves around a physical environment while interacting with a virtual environment, in accordance with some embodiments. FIGS. 8-11 are flow diagrams of methods of interacting with a three-dimensional environment, in accordance with various embodiments. The user interfaces in FIGS. 7A-7G are used to illustrate the processes in FIGS. 8-11, respectively. FIG. 12 is a flow diagram of methods of facilitating the user's use of a computer system for interacting with a three-dimensional environment, in accordance with various embodiments. The user interfaces in FIGS. 7K-7M are used to illustrate the processes in FIGS. 12-13, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CGR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
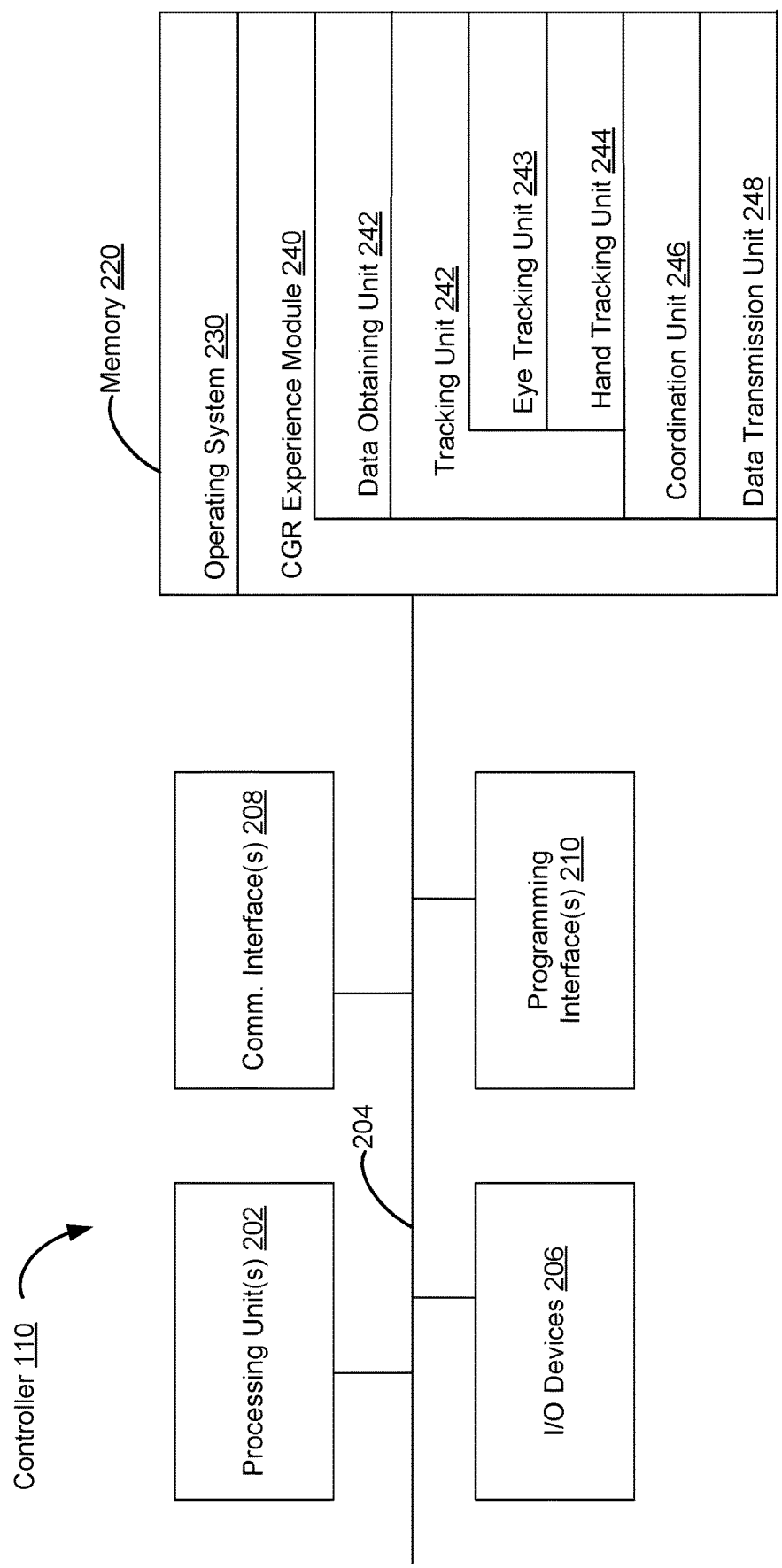
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
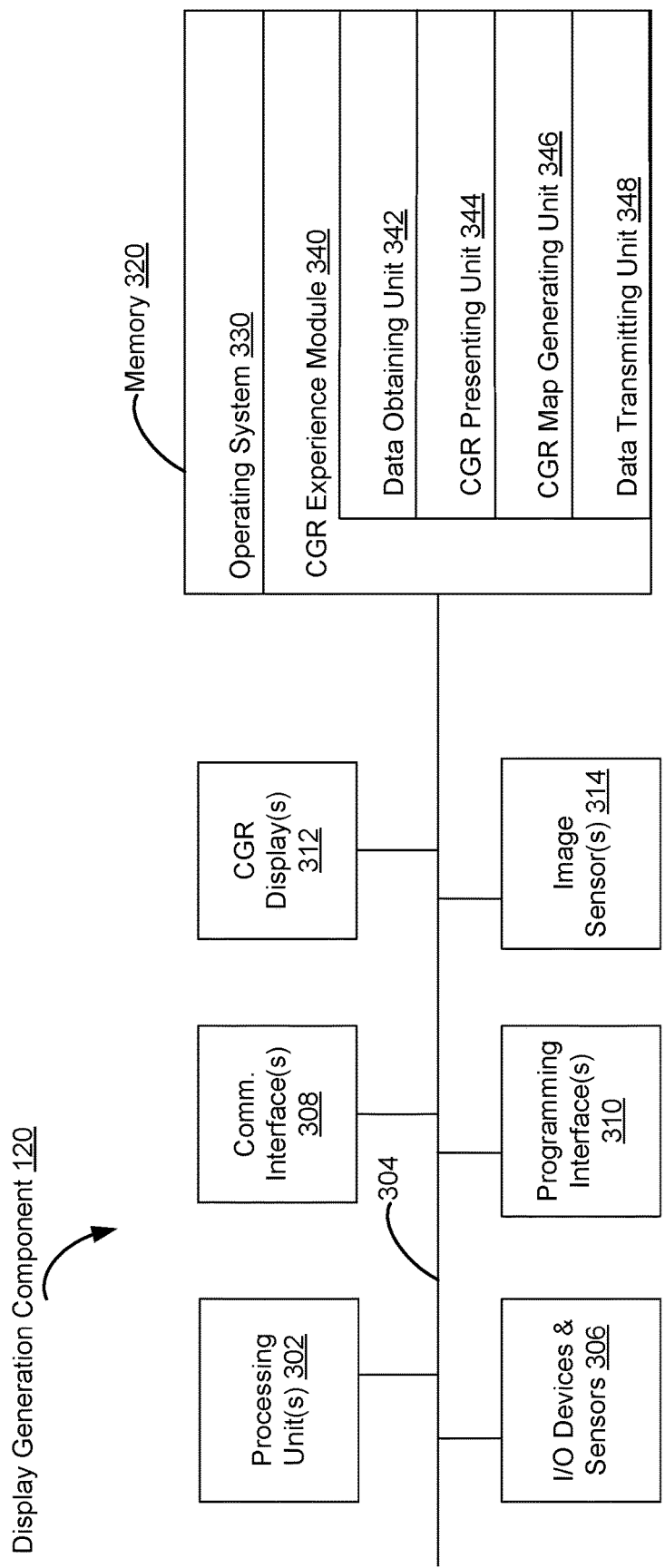
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
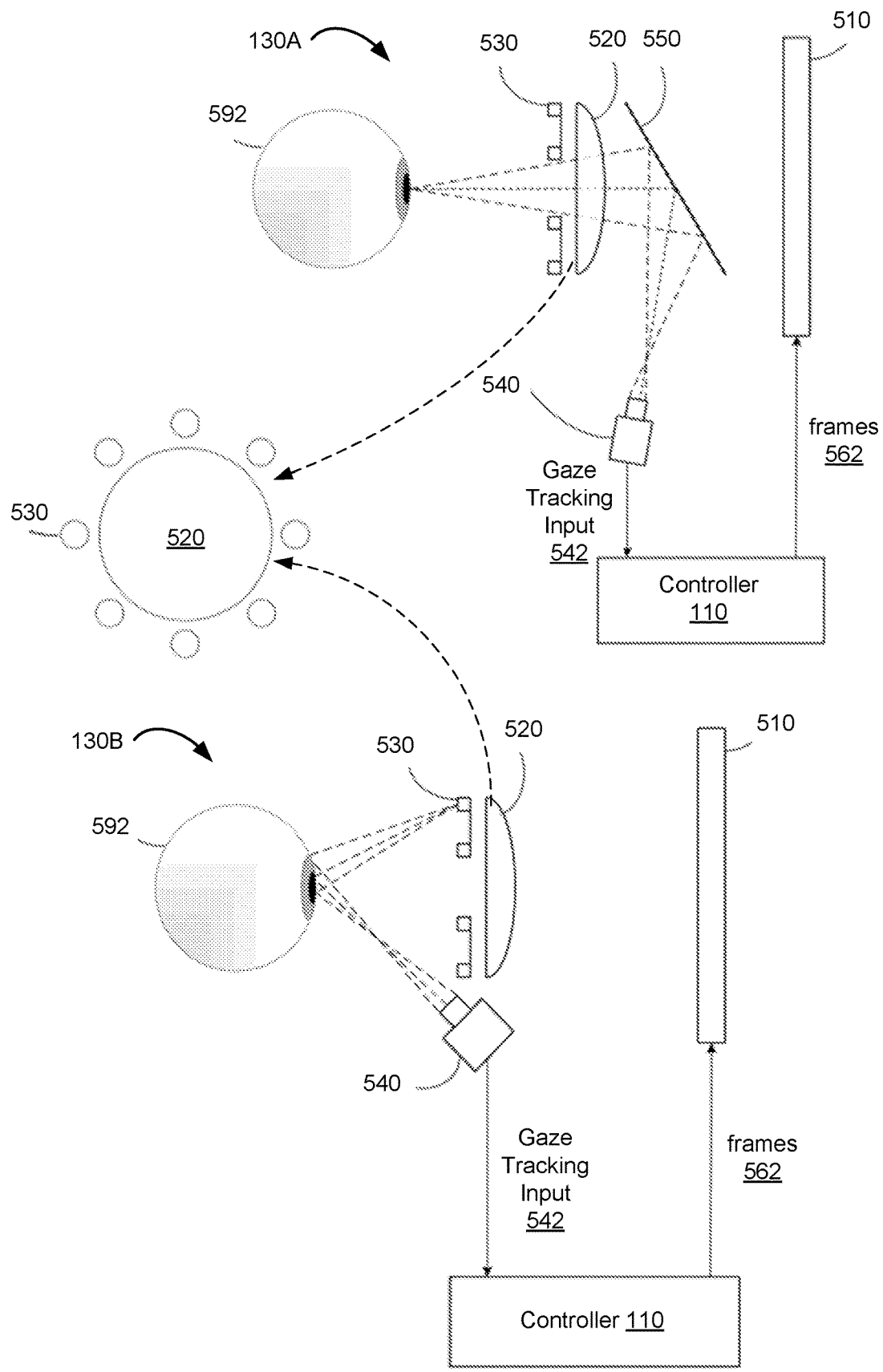
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality (e.g., including virtual reality, and/or mixed reality) applications to provide computer-generated reality (e.g., including virtual reality, augmented reality, and/or augmented virtuality) experiences to the user.

Figure 6:
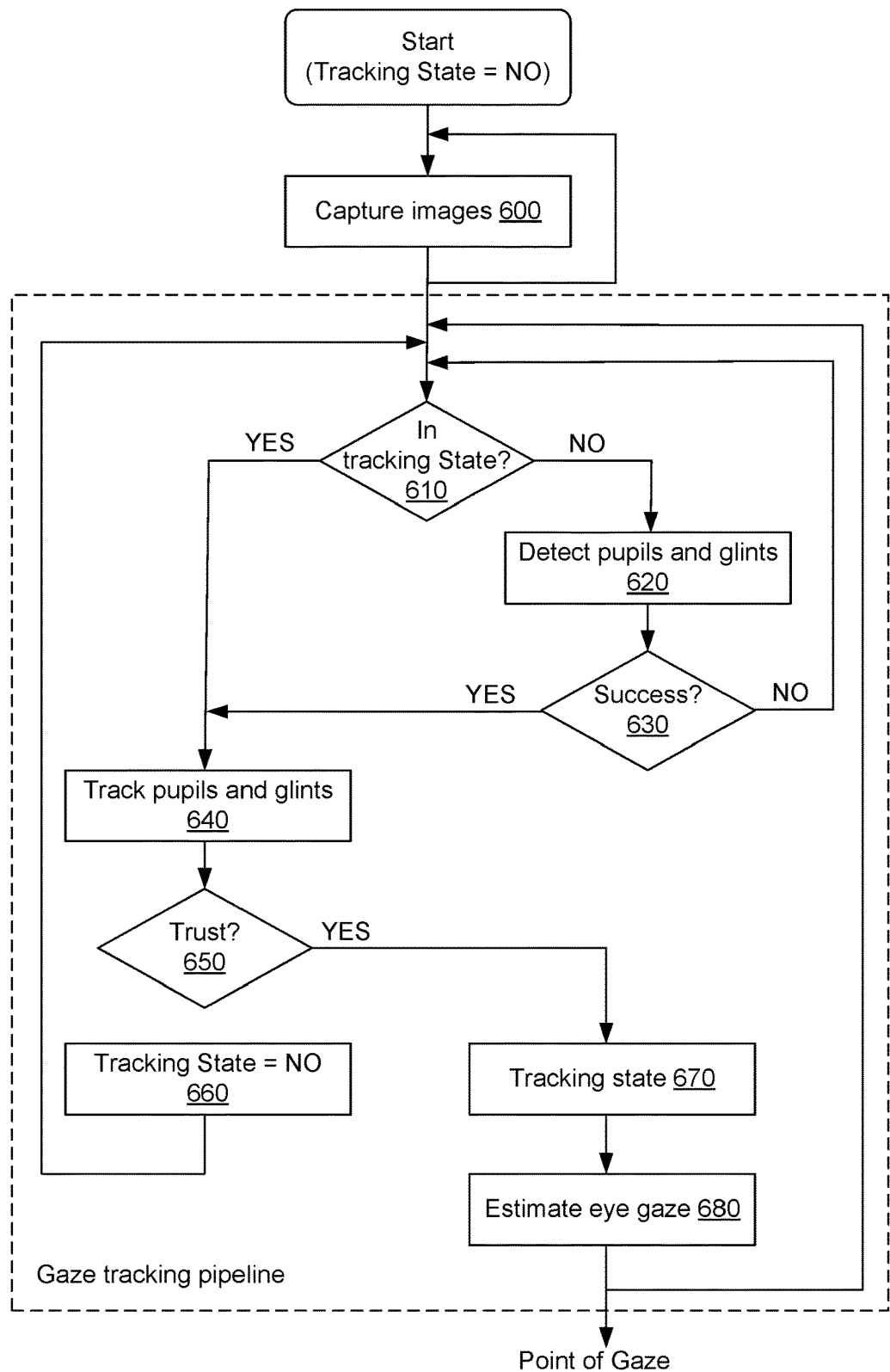
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or more cameras.

Figure 7B:
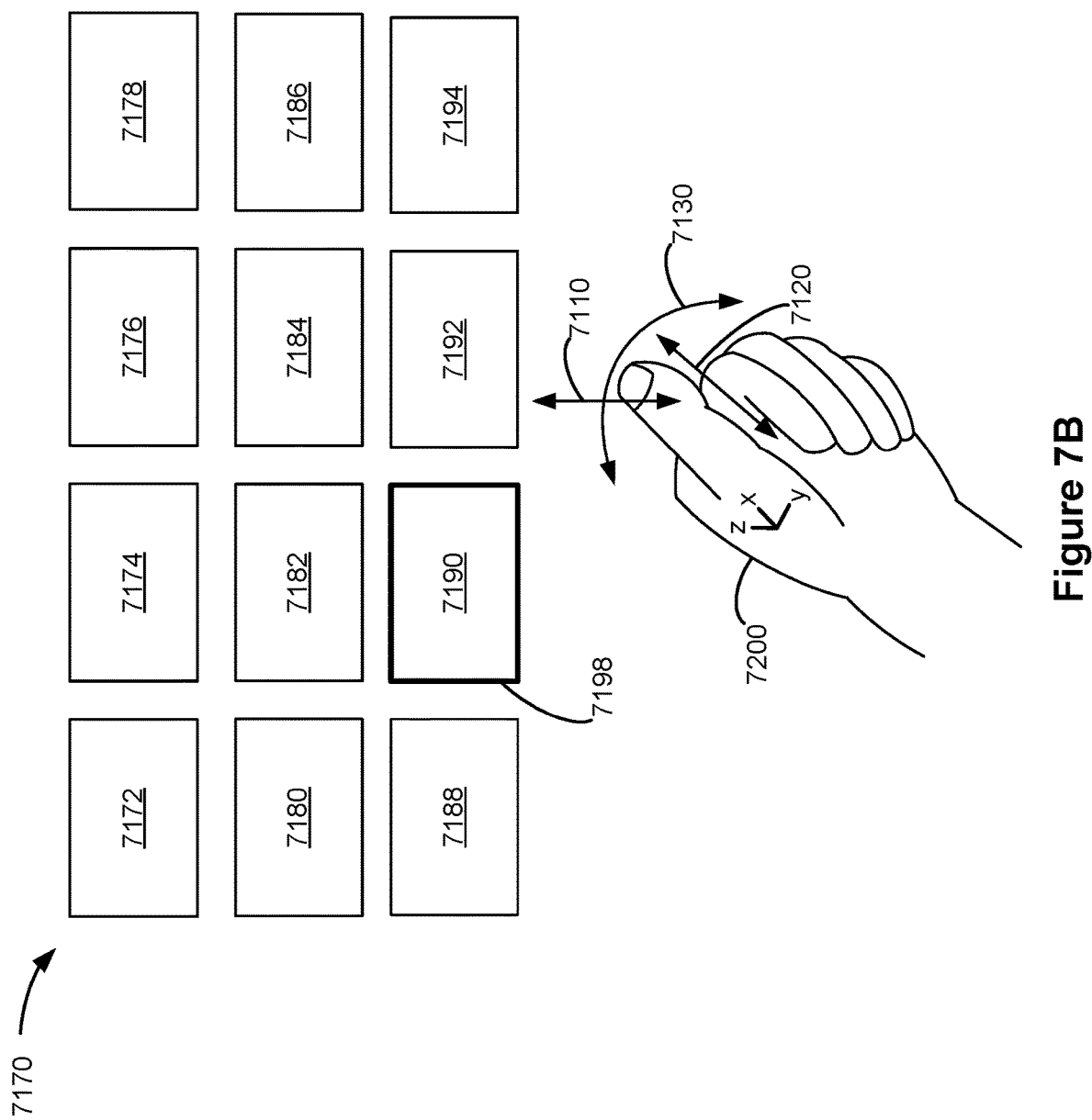
Figure 7C:
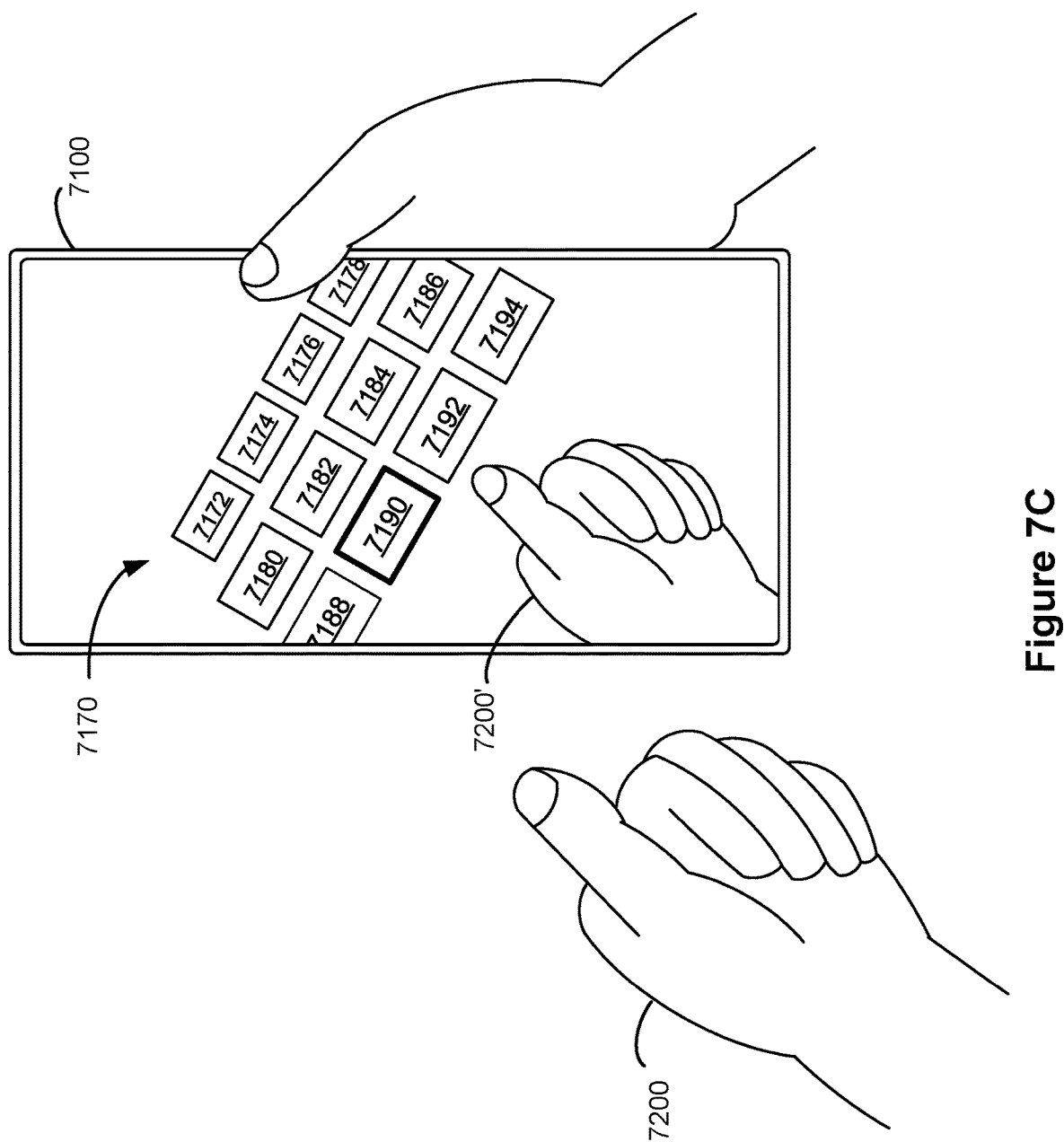

FIGS. 7A-7C illustrate examples of input gestures (e.g., discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments. The input gestures described with regard to FIGS. 7A-7C are used to illustrate the processes described below, including the processes in FIG. 8.

In some embodiments, the input gestures described with regard to FIGS. 7A-7C are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, depth cameras, etc.). For example, the one or more imaging sensors are components of or provide data to a computer system (e.g., computer system 101 in FIG. 1 (e.g., a portable electronic device 7100 as illustrated in FIG. 7C or an HMD)) that includes a display generation component (e.g., display generation component 120 in FIGS. 1, 3, and 4 (e.g., a touch-screen display that serves as a display and a touch-sensitive surface, a stereoscopic display, a display with a pass-through portion, etc.). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7200, as described with regard to FIG. 7C), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

Part (A) of FIG. 7A illustrates a tap input of thumb 7106 over index finger 7108 (e.g., over a side of the index finger 7108 adjacent to the thumb 7106) of a user's hand. Thumb 7106 moves along an axis illustrated by arrow 7110, including moving from raised position 7102 to touch-down position 7104 (e.g., in which thumb 7106 has come into contact with index finger 7108 and remains rested on index finger 7108) and, optionally, moving from touch-down position 7104 to raised position 7102 again within a threshold amount of time (e.g., a tap time threshold) after the thumb 7106 comes into contact with the index finger 7108. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position 7102 to the touch-down position 7104 and remains in the touch-down position 7104 for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

Part (B) of FIG. 7A illustrates a push or flick input by a movement of thumb 7116 across index finger 7118 (e.g., from the palm side to the back side of the index finger). Thumb 7116 moves across index finger 7118 (e.g., across a middle phalanx of index finger 7118) along an axis illustrated by arrow 7120 from retracted position 7112 to extended position 7114. In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from extended position 7114 to retracted position 7112. In some embodiments, the index finger moves in the opposite direction from that of the thumb during the backward and downward movement of the thumb.

Part (C) of FIG. 7A illustrates a swipe input by a movement of thumb 7126 along index finger 7128 (e.g., along a side of the index finger 7128 adjacent to the thumb 7126 or on the side of the palm). Thumb 7126 moves along the length of index finger 7128 along an axis illustrated by arrow 7130 from proximal position 7122 (e.g., at or near the proximal phalanx of index finger 7118) of index finger 7128 to distal position 7124 (e.g., at or near the distal phalanx of index finger 7118) and/or from distal position 7124 to proximal position 7122. In some embodiments, the index finger is optionally in an extended state (e.g., substantially straight) or a curled up state. In some embodiments, the index finger moves between the extended state and the curled up state during the movement of the thumb in a swipe input gesture.

Part (D) of FIG. 7A illustrates a tap input of thumb 7106 over various phalanges of various fingers (e.g., index finger, middle finger, ring finger, and, optionally, pinky finger). For example, thumb 7106 as illustrated in part (A) moves from raised position 7102 to a touch-down position as illustrated at any of 7130-7148 illustrated in part (D). In touch-down position 7130, thumb 7106 is shown contacting a position 7150 on a proximal phalanx of index finger 7108. In touch-down position 7134, thumb 7106 contacts a position 7152 on a middle phalanx of index finger 7108. In touch-down position 7136, thumb 7106 contacts a position 7154 on a distal phalanx of index finger 7108.

In touch-down positions illustrated at 7138, 7140, and 7142, thumb 7106 contacts positions 7156, 7158, and 7160 corresponding to a proximal phalanx of a middle finger, a middle phalanx of a middle finger, and a distal phalanx of a middle finger, respectively.

In touch-down positions illustrated at 7144, 7146, and 7150, thumb 7106 contacts positions 7162, 7164, and 7166 corresponding to a proximal phalanx of a ring finger, a middle phalanx of a ring finger, and a distal phalanx of a ring finger, respectively.

In various embodiments, tap inputs by thumb 7106 on different parts of another finger, or different parts of two side-by-side fingers correspond to different inputs and trigger different operations in a respective user interface context. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, a swipe input type, etc.). In some embodiments, the amount of movement performed by the moving finger (e.g., thumb) and or other movement metrics associated with the movement of the finger (e.g., speed, initial speed, ending speed, duration, direction, movement pattern, etc.) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), a double tap input (e.g., two consecutive taps on the side of a finger at about the same location), etc.

In some embodiments, the gesture inputs are performed by an index finger instead of the thumb (e.g., index finger performs the tap or swipe on the thumb, or the thumb and the index finger move toward each other to perform a pinch gesture, etc.). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

FIG. 7B illustrates an example user interface context showing menu 7170 that includes user interface objects 7172-7194, in some embodiments.

In some embodiments, menu 7170 is displayed in a mixed reality environment (e.g., floating in the air or overlaying a physical object in a three-dimensional environment, and corresponding to operations associated with the mixed reality environment or operations associated with the physical object). For example, menu 7170 is displayed by a display of a device (e.g., device 7100 (FIG. 7C) or an HMD) with (e.g., overlaying) at least a portion of a view of a physical environment captured by one or more rear-facing cameras of device 7100. In some embodiments, menu 7170 is displayed on a transparent or semi-transparent display of a device (e.g., a heads up display, or an HMD) through which the physical environment is visible. In some embodiments, menu 7170 is displayed in a user interface that includes a pass-through portion (e.g., a transparent or semi-transparent portion through which the physical surrounding is visible, or a portion that displays a camera view of the surrounding physical environment) surrounded by virtual content. In some embodiments, the hand of the user that performs a gesture input that causes an operation to be performed in the mixed reality environment is visible to the user on the display of the device. In some embodiments, the hand of the user that performs a gesture input that causes an operation to be performed in the mixed reality environment is not visible to the user on the display of the device (e.g., the camera that provides the view of the physical world to the user have a different field of view from the camera that captures the user's finger inputs).

In some embodiments, menu 7170 is displayed in a virtual reality environment (e.g., hovering in virtual space, or overlaying a virtual surface). In some embodiments, hand 7200 is visible in the virtual reality environment (e.g., an image of hand 7200 captured by one or more cameras is rendered in the virtual reality setting). In some embodiments, a representation of hand 7200 (e.g., a cartoon version of hand 7200) is rendered in the virtual reality setting. In some embodiments, hand 7200 is not visible in (e.g., is omitted from) the virtual reality environment. In some embodiments, device 7100 (FIG. 7C) is not visible in the virtual reality environment (e.g., when the device 7100 is an HMD). In some embodiments, an image of device 7100 or a representation of device 7100 is visible in the virtual reality environment.

In some embodiments, one or more of user interface objects 7172-7194 are application launch icons (e.g., for performing an operation to launch corresponding applications). In some embodiments, one or more of user interface objects 7172-7194 are controls for performing respective operations within an application (e.g., increase volume, decrease volume, play, pause, fast-forward, rewind, initiate communication with a remote device, terminate communication with a remote device, transmit communication to a remote device, start game, etc.). In some embodiments, one or more of user interface objects 7172-7194 are respective representations (e.g., avatars) of users of remote devices (e.g., for performing an operation to initiate communication with the respective users of the remote devices). In some embodiments, one or more of user interface objects 7172-7194 are representations (e.g., thumbnails, two-dimensional images, or album covers) of media (e.g., images, virtual objects, audio files, and/or video files). For example, activating a user interface object that is a representation of an image causes the image to be displayed (e.g., at a location that corresponds to a surface detected by one or more cameras and displayed in a computer-generated reality view (e.g., at a location that corresponds to a surface in a physical environment or at a location that corresponds to a surface displayed in virtual space).

As the thumb of hand 7200 performs the input gestures described with regard to FIG. 7A, operations corresponding to menu 7170 are performed depending on a location and/or type of the input gesture that is detected. For example, in response to an input that includes movement of the thumb along the y-axis (e.g., movement from a proximal position on the index finger to a distal position on the index finger, as described with regard to part (C) of FIG. 7A), current selection indicator 7198 (e.g., a selector object or a movable visual effect such as highlighting of the object by an outline or change in appearance of the object) is iterated rightward from item 7190 to subsequent user interface object 7192. In some embodiments, in response to an input that includes movement of the thumb along the y-axis from a distal position on the index finger to a proximal position on the index finger, current selection indicator 7198 is iterated leftward from item 7190 to previous user interface object 7188. In some embodiments, in response to an input that includes a tap input of the thumb over the index finger (e.g., movement of the thumb along the z-axis as described with regard to part (A) of FIG. 7A), currently selected user interface object 7190 is activated and an operation corresponding to currently selected user interface object 7190 is performed. For example, user interface object 7190 is an application launch icon and, in response to a tap input while user interface object 7190 is selected, an application corresponding to user interface object 7190 is launched and displayed on the display. In some embodiments, in response to an input that includes movement of the thumb along the x-axis from a retracted position to an extended position, current selection indicator 7198 is moved upward from item 7190 to upward user interface object 7182. Other types of finger inputs provided with respect to one or more of the user interface objects 7172-7194 are possible, and optionally cause performance of other types of operations corresponding to the user interface object(s) subject to the inputs.

FIG. 7C illustrates a visual indication of menu 7170 that is visible in a mixed reality view (e.g., an augmented-reality view of a physical environment) displayed by a computer system (e.g., device 7100 or an HMD). In some embodiments, hand 7200 in the physical environment is visible in the displayed augmented-reality view (e.g., as part of the view of the physical environment captured by a camera), as illustrated at 7200'. In some embodiments, hand 7200 is visible through a transparent or semi-transparent display surface on which menu 7170 is displayed (e.g., device 7100 is a heads up display or an HMD with a pass-through portion).

In some embodiments, as shown in FIG. 7C, menu 7170 is displayed at a location in the mixed reality environment that corresponds to a predefined portion of the user's hand (e.g., the tip of the thumb) and having an orientation that corresponds to the orientation of the user's hand. In some embodiments, when the user's hand moves (e.g., laterally moves or rotates) relative to the physical environment (e.g., the camera that captures the user's hand, or the user's eyes, or a physical object or wall surrounding the user), menu 7170 is shown to move in the mixed reality environment with the user's hand. In some embodiments, the menu 7170 moves in accordance with movement of the user's gaze directed to the mixed reality environment. In some embodiments, menu 7170 is displayed at a fixed location on the display, irrespective of the view of the physical environment shown on the display.

In some embodiments, menu 7170 is displayed on the display in response to detecting a ready posture (e.g., thumb resting on the side of the index finger) of the user hand. In some embodiments, the user interface objects that are displayed in response to detecting the hand in the ready posture are different depending on the current user interface context and/or the location of the user's gaze in the mixed reality environment.

Figure 7D:
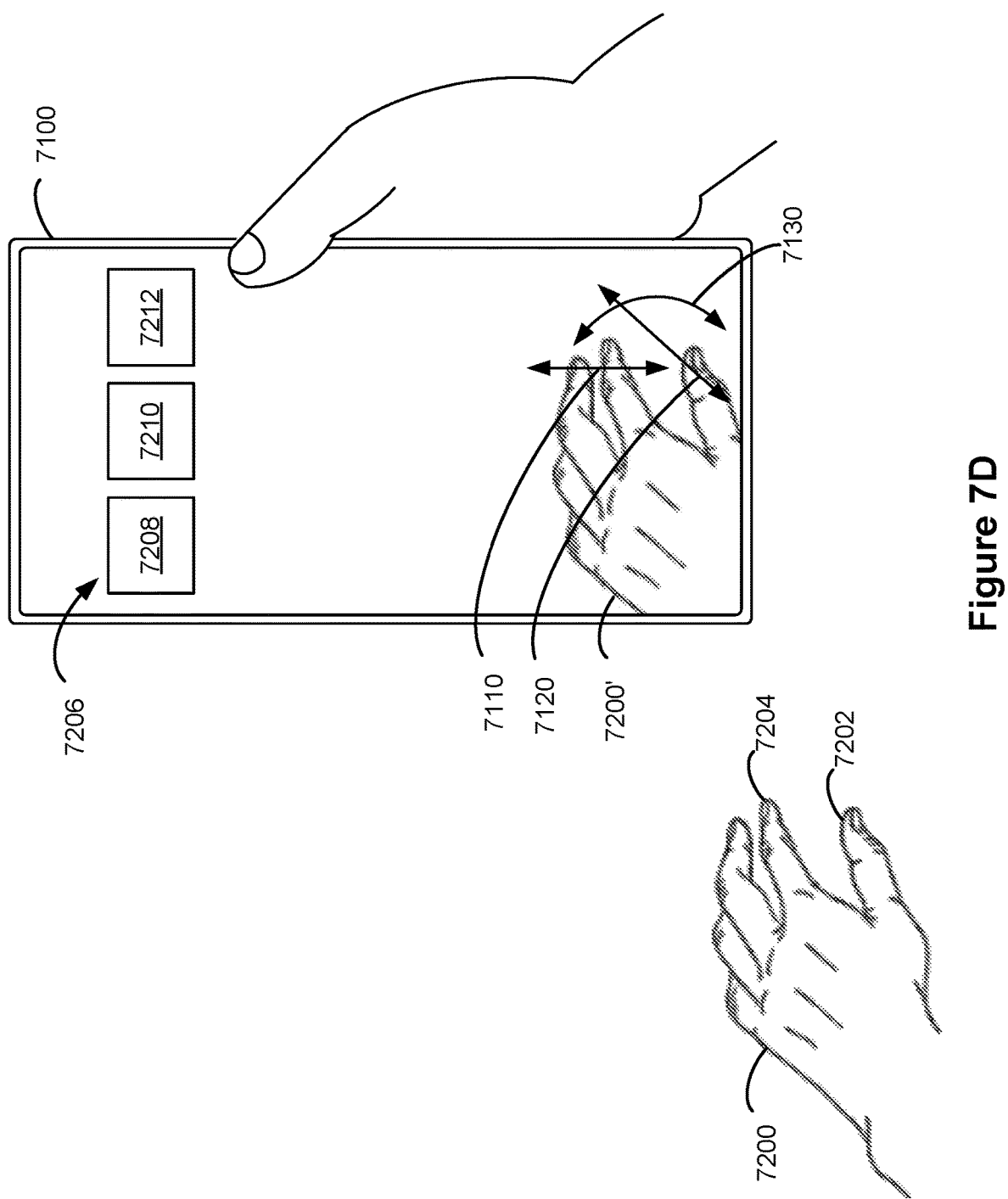
Figure 7E:
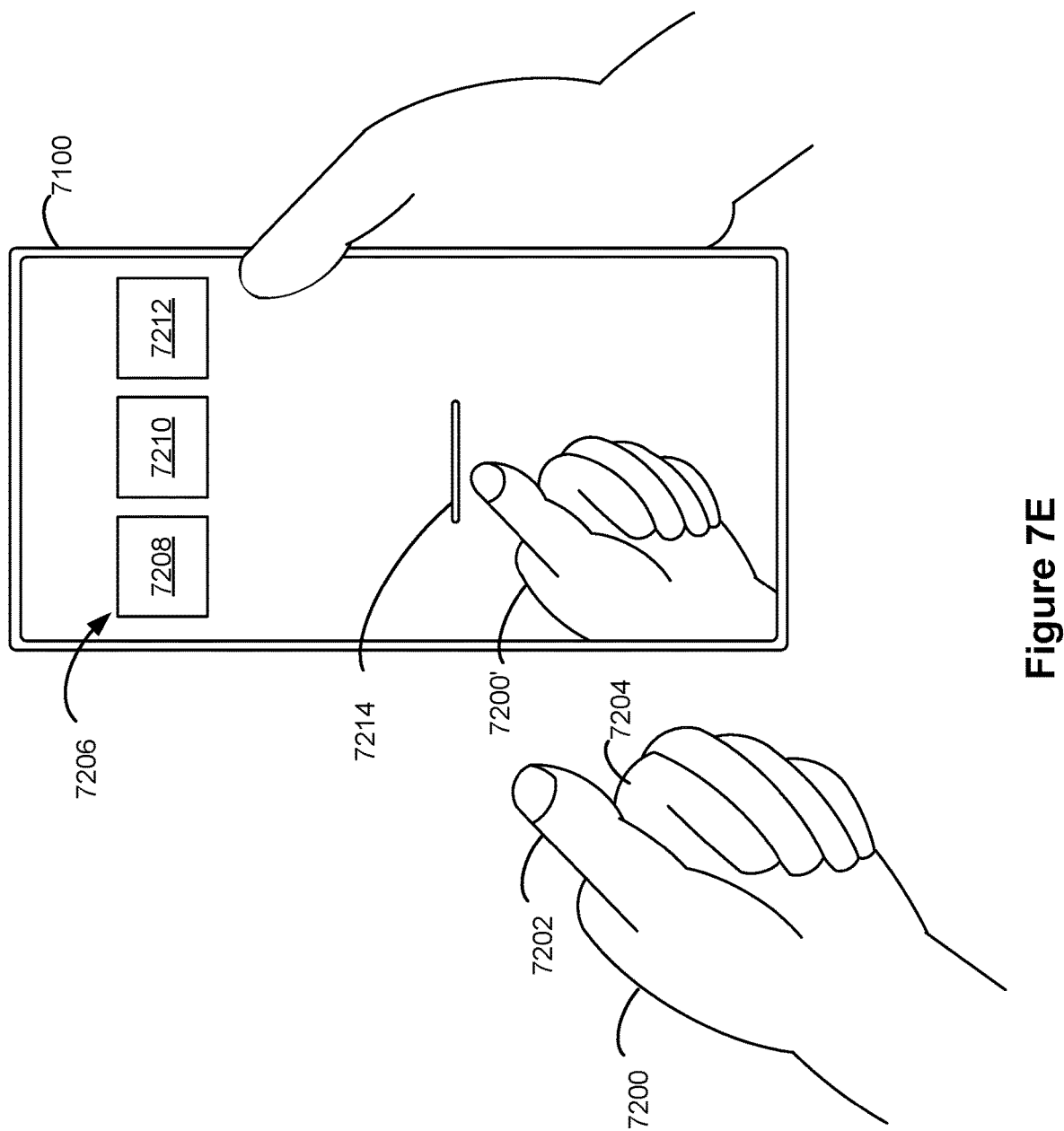

FIGS. 7D-7E illustrate hand 7200 in an exemplary non-ready state configuration (e.g., a resting configuration) (FIG. 7D) and in an exemplary ready state configuration (FIG. 7E), in accordance with some embodiments. The input gestures described with regard to FIGS. 7D-7E are used to illustrate the processes described below, including the processes in FIG. 9.

In FIG. 7D, hand 7200 is shown in an exemplary non-ready state configuration (e.g., a resting configuration (e.g., hand is in a relaxed or arbitrary state and thumb 7202 is not resting on index finger 7204)). In an example user interface context, container object 7206 (e.g., application dock, folder, control panel, menu, platter, preview, etc.) that includes user interface object 7208, 7210, and 7212 (e.g., application icons, media objects, controls, menu items, etc.) is displayed in a three-dimensional environment (e.g., virtual environment or mixed reality environment) by a display-generation component (e.g., display generation component 120 in FIGS. 1, 2, and 4 (e.g., a touch-screen display, a stereoscopic projector, a heads-up display, an HMD, etc.)) of a computer system (e.g., a computer system 101 in FIG. 1 (e.g., device 7100, an HMD, or a system comprising the above among other devices)). In some embodiments, the resting configuration of the hand is one example of a hand configuration that is not a ready state configuration. For example, other hand configurations which are not necessarily relaxed and resting, but do not meet the criteria for detecting the ready state gesture (e.g., with thumb resting on the index finger (e.g., the middle phalanx of the index finger)), are also categorically recognized as being in the non-ready state configuration. For example, when the user waves his hand in the air, or holds an object, or clenches his fist, etc. the computer system determines that the user's hand does not meet the criteria for detecting the ready state of the hand, and determines that the user's hand is in a non-ready state configuration, in accordance with some embodiments. In some embodiments, the criteria for detecting a ready state configuration of the hand includes detecting that the user has changed his/her hand configuration and the change resulted in the user's thumb resting on a predefined portion of the user's index finger (e.g., the middle phalanx of the index finger). In some embodiments, the criteria for detecting a ready state configuration require that the change in hand gesture resulted in the user's thumb resting on a predefined portion of the user's index finger for at least a first threshold amount of time in order for the computer system to recognize that that the hand is in the ready state configuration. In some embodiments, if the user has not changed his/her hand configuration and has not provided any valid input gestures for at least a second threshold amount of time after entering the ready state configuration, the computer system treats the current hand configuration to be a non-ready state configuration. The computer system requires the user to change his/her current hand configuration and then return to the ready state configuration in order for the ready state configuration to be recognized again. In some embodiments, the ready state configuration is user-configurable and user self-definable, e.g., by the user demonstrating the intended ready state configuration of the hand and optionally a range of acceptable variations of the ready state configuration, to the computer system in a gesture setup environment provided by the computer system.

In some embodiments, container 7206 is displayed in a mixed reality environment (e.g., as shown in FIGS. 7D and 7E). For example, container 7206 is displayed by a display of device 7100 with at least a portion of a view of a physical environment captured by one or more rear-facing cameras of device 7100. In some embodiments, hand 7200 in the physical environment is also visible in the displayed mixed reality environment, e.g., with actual spatial relationship between the hand and the physical environment represented in the displayed view of the mixed reality environment, as illustrated at 7200b. In some embodiments, container 7206 and hand 7200 are displayed in relation to a physical environment that is remotely located from the user and displayed via a live feed of camera collocated with the remote physical environment. In some embodiments, container 7206 is displayed on a transparent or semi-transparent display of a device through which the physical environment surrounding the user (e.g., including hand 7200 as illustrated at 7200b) is visible.

In some embodiments, container 7206 is displayed in a virtual reality environment (e.g., hovering in virtual space). In some embodiments, hand 7200 is visible in the virtual reality setting (e.g., an image of hand 7200 captured by one or more cameras is rendered in the virtual reality environment). In some embodiments, a representation of hand 7200 is visible in the virtual reality environment. In some embodiments, hand 7200 is not visible in (e.g., is omitted from) the virtual reality environment. In some embodiments, device 7100 is not visible in the virtual reality environment. In some embodiments, an image of device 7100 or a representation of device 7100 is visible in the virtual reality environment.

In some embodiments, while hand 7200 is not in the ready state configuration (e.g., in any non-ready state configuration or ceases to remain in the ready state configuration (e.g., due to change in hand posture or failure to provide valid input gesture within a threshold amount of time of entering the ready state configuration)), the computer system does not perform input gesture recognition (other than the determination for whether hand has entered into the ready state configuration) for performing operations within the current user interface context, and as a result, no operations are performed in response to input gestures that are performed by the hand (e.g., a tap of the thumb over the index finger that includes movement of the thumb along an axis illustrated by arrow 7110, as described with regard to part (A) of FIG. 7A; movement of the thumb across the index finger along an axis indicated by arrow 7120, as described with regard to part (B) of FIG. 7A; and/or movement of the thumb over the index finger along an axis indicated by arrow 7130, as described with regard to part (C) of FIG. 7A) performed by hand 7200. In other words, the computer system require the user to put the hand in the ready state configuration (e.g., changing into the ready state configuration from a non-ready state configuration) and then provide a valid input gesture for the current user interface context (e.g., within a threshold amount of time of the hand entering the ready state configuration), in order to recognized the input gesture as valid and perform a corresponding operation in the current user interface context. In some embodiments, the computer system performs certain types of operations (e.g., interacting with (e.g., scrolling or activating) currently displayed user interface objects) and prohibits other types of operations (e.g., invoking new user interfaces, triggering system-level operations (e.g., navigating to a multitasking user interface or application launching user interface, activating a device function control panel, etc.)), if valid input gestures are detected without first detecting the hand in the ready state configuration. These safeguards help to prevent and reduce inadvertent and unintended triggering of operations and avoid unnecessarily constraining the user's free hand movement when the user does not wish to perform an operation or certain types of operations within the current user interface context. In addition, imposing the small and discrete motion requirement for the ready state configuration does not impose undue physical burden on the user (e.g., for moving the user's arm or hand excessively), and tends to cause less awkwardness for the user when interacting with the user interface in a social setting.

User interface objects 7208-7212 of container 7206 include, for example, one or more application launch icons, one or more controls for performing operations within an application, one or more representations of users of remote devices, and/or one or more representations of media (e.g., as described above with regard to user interface objects 7172-7194). In some embodiments, when a user interface object is selected and an input gesture is detected without the hand being first found in the read state configuration by the computer system, the computer system performs a first operation with respective to the selected user interface object (e.g., launch an application corresponding to a selected application icon, changes a control value of a selected control, initiating a communication with a user of a selected representation of the user, and/or initiating playback of a media item corresponding to a selected representation of the media item) in accordance with the input gesture; and when a user interface object is selected and the same input gesture is detected with the hand being first found in the ready state configuration by the computer system, the computer system performs a second operation that is distinct from the first operation (e.g., the second operation is a system operation that is not specific to the currently selected user interface object (e.g., the system operation includes displaying a system affordance in response to the hand being found in the ready state configuration and launching a system menu in response to the input gesture)). In some embodiments, putting the hand in the ready state configuration enables certain input gestures (e.g., a thumb flick gesture) that are not paired with any functions in the current user interface context, and detection of the newly enabled input gestures after the hand is found in the ready state configuration causes the computer system to perform additional functions associated with the newly enabled input gestures. In some embodiments, the computer system optionally displays a user interface indication (e.g., additional options, a system affordance or system menu) in response to detecting the hand in the ready state configuration, and allows the user to interact with the user interface indication or trigger the additional functions using the newly enabled input gestures (e.g., a thumb flick gesture detected when the system affordance is displayed causes a system menu to be displayed, a thumb flick gesture detected when the system menu is displayed causes navigation through the system menu or expansion of the system menu).

In FIG. 7E, hand 7200 is shown in the ready state configuration (e.g., thumb 7202 is resting on index finger 7204). In accordance with a determination that hand 7200 has moved into the ready state configuration, the computer system displays system affordance icon 7214 (e.g., in a region of the mixed reality environment that corresponds to the tip of the thumb). System affordance icon 7214 indicates a region from which one or more user interface objects (e.g., a menu of application icons corresponding to different applications, a menu of currently open applications, a device control user interface, etc.) may be displayed and/or accessed (e.g., in response to a thumb flick gesture or other predefined input gestures). In some embodiments, while system affordance icon 7214 is displayed, the computer system performs operations in response to input gestures performed by hand 7200 (e.g., as described below with regard to FIG. 7F).

In some embodiments, movement of hand 7200 from the non-ready state configuration to the ready state configuration is detected by analyzing data captured by a sensor system (e.g., image sensors, or other sensors (e.g., motion sensors, touch sensors, vibration sensors, etc.)) as described above with regard to FIGS. 7A-7C. In some embodiments, the sensor system includes one or more imaging sensors (e.g., one or more cameras associated with a portable device or a head mounted system), one or more depth sensors, and/or one or more light emitters.

In some embodiments, system affordance icon 7214 is displayed in a mixed reality environment. For example, system affordance icon 7214 is displayed by a display generation component (e.g., a display of device 7100 or an HMD) with at least a portion of a view of a physical environment captured by one or more cameras of the computer system (e.g., one or more rear-facing cameras of device 7100, or forward or downward facing cameras of the HMD). In some embodiments, system affordance icon 7214 is displayed on a transparent or semi-transparent display of a device (e.g., a heads up display, or an HMD with a pass-through portion) through which the physical environment is visible. In some embodiments, system affordance icon 7214 is displayed in a virtual reality environment (e.g., hovering in virtual space).

In some embodiments, the computer-system ceases to display the system affordance icon 7214 in response to detecting that the hand changes its posture without providing a valid input gesture for the current user interface context, and is no longer in the ready state configuration. In some embodiments, the computer-system ceases to display the system affordance icon 7214 and determines that the criteria for detecting the ready state configuration are no longer satisfied, in response to detecting that the hand has remained in the ready state posture without providing a valid input gesture for more than a threshold amount of time. In some embodiments, after ceasing to display the system affordance icon 7214, in accordance with a determination that a change in the user's hand postures causes the criteria for detecting the ready state configuration to be met again, the computer system redisplays the system affordance icon (e.g., at the tip of the thumb at the new hand position).

In some embodiments, more than one ready state configurations of the hand are optionally defined and recognized by the computer system, and each ready state configuration of hand causes the computer system to display a different kind of affordance and enables a different set of input gestures and/or operations to be performed in the current user interface context. For example, a second ready state configuration is optionally all fingers pulling together into a first with the thumb resting on fingers other than the index finger. When the computer system detects this second ready state configuration, the computer system displays a different system affordance icon from icon 7214, and a subsequent input gesture (e.g., a thumb swipe across the index finger) causes the computer system to initiate a system shutdown operation, or display a menu of power options (e.g., shutdown, sleep, suspend, etc.).

In some embodiments, the system affordance icon that is displayed in response to the computer detecting the hand in the ready state configuration is a home affordance that indicates a selection user interface including a plurality of currently installed applications will be displayed in response to detection of a predefined input gesture (e.g., a thumb flick input, a thrum push input, or other input as described with respect to FIGS. 7A-7C). In some embodiments, an application dock including multiple application icons for launching respective applications are displayed in response to the computer detecting the hand in the ready state configuration, and a subsequent activation or selection input gesture by the hand causes the computer system to launch the corresponding application.

Figure 7G:
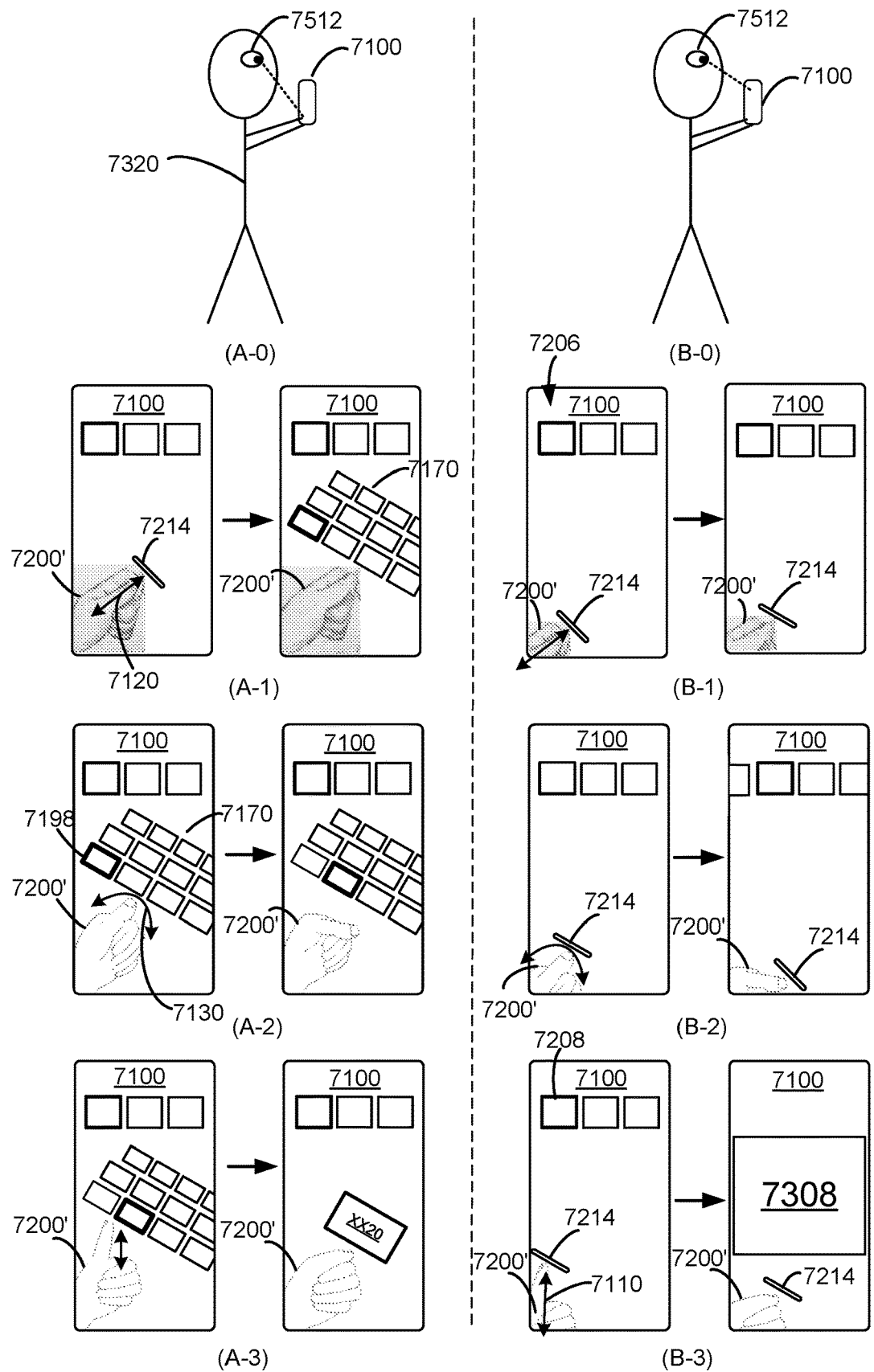

FIGS. 7F-7G provides various examples of operations that are performed in response to input gestures detected with a hand found in the ready state configuration, in accordance with various embodiments. Although FIGS. 7F-7G describes different operations being performed depending on the user's gaze, it is to be understood that, in some embodiments, gaze is not a necessary component in the detection of the ready state gesture and/or input gestures to trigger performance of those various operations. In some embodiments, the combinations of the user's gaze and the hand's configuration are used in conjunction with the current user interface context by the computer system to determine which operation will be performed.

FIG. 7F illustrates example input gestures performed with a hand found in a ready state configuration and example responses of a displayed three-dimensional environment (e.g., a virtual reality environment or a mixed reality environment), in accordance with some embodiments. In some embodiments, the computer system (e.g., device 7100 or an HMD) displays a system affordance (e.g., system affordance icon 7214) at the tip of the thumb to indicate that the ready state configuration of the hand has been detected and that input of a system gesture (e.g., a thumb flick gesture to display a dock or system menu, a thumb tap gesture to activate a voice-based assistant) is enabled to trigger predefined system operations, e.g., in addition to other input gestures that are already available in the current user interface context (e.g., thumb swipe input for scrolling user interface objects, etc.). In some embodiments, the system affordance moves in accordance with the movement of the hand as a whole in space and/or movement of the thumb when providing gesture inputs, such that the location of the system affordance remains fixed relative to a predefined portion of the hand (e.g., the tip of the thumb of the hand 7200).

In accordance with some embodiments, FIG. 7F parts (A)-(C) illustrate a three-dimensional environment 7300 (e.g., a virtual reality environment or mixed reality environment) displayed by a display generation component of a computer system (e.g., a touch-screen display of device 7100 or a stereoscope projector or display of an HMD). In some embodiments, device 7100 is a handheld device (e.g., a cell phone, tablet, or other mobile electronic device) that includes a display, a touch-sensitive display, or the like. In some embodiments, device 7100 represents a wearable headset that includes a heads-up display, a head-mounted display, or the like.

In some embodiments, three-dimensional environment 7300 is a virtual reality environment that includes virtual objects (e.g., user interface objects 7208, 7210, and 7212). In some embodiments, the virtual reality environment does not correspond to the physical environment in which device 7100 is located. In some embodiments, the virtual reality environment corresponds to the physical environment (e.g., at least some of the virtual objects are displayed at locations in the virtual reality environment that correspond to locations of physical objects in the corresponding physical environment, based on the locations of physical objects in the physical environment as determined using one or more cameras of device 7100). In some embodiments, three-dimensional environment 7300 is a mixed reality environment. In some embodiments, device 7100 includes one or more cameras configured to continuously provide a live view of at least a portion of the surrounding physical environment that is within the field of view of the one or more cameras of device 7100, and the mixed reality environment corresponds to the portion of the surrounding physical environment that is within the field of view of the one or more cameras of device 7100. In some embodiments, the mixed reality environment at least partially includes the live view of the one or more cameras of device 7100. In some embodiments, the mixed reality environment includes one or more virtual objects that are displayed in place of (e.g., superimposed over, overlaying, or replacing) the live camera view (e.g., at locations in three-dimensional environment 7300 that correspond to locations of physical objects in the physical environment, based on the locations of physical objects in the physical environment as determined using the one or more cameras, or using the live view of the one or more cameras, of device 7100). In some embodiments, the display of device 7100 includes a heads-up display that is at least partially transparent (e.g., having less than a threshold degree of opacity, such as less than 25%, 20%, 15%, 10%, or 5%, or having a pass-through portion), such that the user can see at least a portion of the surrounding physical environment through the at least partially transparent region of the display. In some embodiments, three-dimensional environment 7300 includes one or more virtual objects displayed on the display (e.g., container 7206 including user interface objects 7208, 7210, and 7212). In some embodiments, three-dimensional environment 7300 includes one or more virtual objects displayed on the transparent region of the display so as to appear superimposed over the portion of the surrounding physical environment that is visible through the transparent region of the display. In some embodiments, one or more respective virtual objects are displayed at locations in three-dimensional environment 7300 that correspond to locations of physical objects in the physical environment (e.g., based on the locations of physical objects in the physical environment as determined using one or more cameras of device 7100 that monitor the portion of the physical environment that is visible through the transparent region of the display), so that a respective virtual object is displayed in place of (e.g., obscures and replaces the view of) a respective physical object.

In some embodiments, a sensor system of the computer system (e.g., the one or more cameras of device 7100 or HMD) tracks the position and/or movement of one or more features of a user, such as the user's hands. In some embodiments, the position and/or movement of the user's hand(s) (e.g., fingers) serve as inputs to the computer system (e.g., device 7100 or HMD). In some embodiments, although the user's hand(s) are in the field of view of the one or more cameras of the computer system (e.g., device 7100 or HMD), and the position and/or movement of the user's hand(s) are tracked by a sensor system of the computer system (e.g., device 7100 or HMD) as inputs to the computer-system (e.g., device 7100 or a control unit of the HMD), the user's hand(s) are not shown in three-dimensional environment 7300 (e.g., three-dimensional environment 7300 does not include a live view from the one or more cameras, the hand is edited out of the live view of the one or more cameras, or the user's hands are in the field of view of the one or more cameras outside of the portion of the field of view that is displayed in a live view in three-dimensional environment 7300). In some embodiments, as in the example shown in FIG. 7F, hand 7200 (e.g., a representation of a user's hand, or a representation of a portion of a hand, that is within the field of view of one or more cameras of device 7100) is visible (e.g., displayed as a rendered representation, displayed as part of the live camera view, or visible through a pass-through portion of the display) in the three-dimensional environment 7300. In FIG. 7F, hand 7200 is detected to be in a ready state configuration (e.g., thumb resting on middle of index finger) for providing gesture inputs (e.g., hand gesture inputs). In some embodiments, computer system (e.g., device 7100 or an HMD) determines that hand 7200 is in the ready state configuration by performing image analysis on the live view of the one or more cameras. More details regarding the ready state configuration of the hand and input gestures are provided at least in FIGS. 7A-7E and accompanying descriptions, and are not repeated here in the interest of brevity.

In accordance with some embodiments, FIG. 7F part (A) illustrates a first type of input gesture (e.g., a thumb flick gesture, or thumb push gesture) that includes movement of the thumb of hand 7200 across a portion of the index finger of hand 7200, along an axis illustrated by arrow 7120 (e.g., across the middle phalanx from palm side to back side of the index finger) (e.g., as shown by the transition of hand configuration from A(1) to A(2) of FIG. 7F. As noted above, in some embodiments, the movement of hand 7200 (e.g., including movement of the hand as a whole and relative movement of the individual fingers) while performing gestures, such as those shown in FIG. 7F, and the positions of hand 7200 (e.g., including positions of the hand as a whole and relative positions of the fingers) during gestures, are tracked by the one or more cameras of device 7100. In some embodiments, device 7100 detects a gesture performed by hand 7200 by performing image analysis on the live view of the one or more cameras. In some embodiments, in accordance with determination that a thumb flick gesture has been provided by a hand starting from a ready state configuration of the hand, the computer system performs a first operation corresponding to the thumb flick gesture (e.g., a system operation such as displaying a menu 7170 that includes a plurality of application launch icons, or an operation corresponding to a current user interface context that would not be enabled if the hand had not been found in the ready state configuration first). In some embodiments, additional gestures are provided by hand 7200 to interact with the menu. For example, a subsequent thumb flick gesture following the display of menu 7170 causes the menu 7170 to be pushed into the three-dimensional environment and displayed in an enhanced state (e.g., with larger and animated representations of the menu items) in virtual space. In some embodiments, a subsequent thumb swipe gesture scrolls a selection indicator horizontally within a currently selected row of the menu, and a subsequent thumb push or thumb pull gesture scrolls the selection indicator up and down the different rows of the menu. In some embodiments, a subsequent thumb tap gesture causes activation of a currently selected menu item (e.g., application icon) to be launched in the three-dimensional environment.

In accordance with some embodiments, FIG. 7F part (B) illustrates a second type of gesture (e.g., a thumb swipe gesture) that includes movement of the thumb of hand 7200 along the length of the index finger of hand 7200, along an axis illustrated by arrow 7130 (e.g., as shown by the transition of hand configuration from B(1) to B(2) of FIG. 7F. In some embodiments, the gesture is enabled for interaction with virtual objects in the current user interface context (e.g., virtual objects 7208, 7210, and 7212 in container object 7206) irrespective of whether the hand was found in the ready state configuration first. In some embodiments, different type of interactions with respect to the container object 7206 is enabled depending on whether the thumb swipe gesture started from the ready state configuration. In some embodiments, in accordance with determination that a thumb swipe gesture has been provided by a hand starting from a ready state configuration of the hand, the computer system performs a second operation corresponding to the thumb swipe gesture (e.g., scrolling the view of the container object 7206 to reveal one or more virtual objects in the container object 7206 that were initially not visible to the user, or another operation corresponding to a current user interface context that would not be enabled if the hand had not been found in the ready state configuration first). In some embodiments, additional gestures are provided by hand 7200 to interact with the container object or perform a system operation. For example, a subsequent thumb flick gesture causes menu 7170 to be displayed (e.g., as shown in FIG. 7F, part (A)). In some embodiments, a subsequent thumb swipe gesture in a different direction scrolls the view of the container object 7206 in the opposite direction. In some embodiments, a subsequent thumb tap gesture causes activation of a currently selected virtual object in the container 7206. In some embodiments, if the thumb swipe gesture were not started from the ready state configuration, in response to the thumb swipe gesture a selection indicator is shifted through the virtual objects in container 7206 in the direction of movement of the thumb of hand 7200.

In accordance with some embodiments, FIG. 7F part (C) illustrates a third type of gesture input (e.g., a thumb tap gesture) (e.g., a tap of the thumb of hand 7200 on a predefined portion (e.g., the middle phalanx) of the index finger of hand 7200 (e.g., by the thumb moving from a raised position, downward along an axis illustrated by arrow 7110 (e.g., as shown by the transition of hand configuration from C(1) to C(2) of FIG. 7F. In some embodiments, lift-off of thumb from the index finger is required for the completion of the thumb tap gesture. In some embodiments, the gesture is enabled for interaction with virtual objects in the current user interface context (e.g., virtual objects 7208, 7210, and 7212 in container object 7206) irrespective of whether the hand was found in the ready state configuration first. In some embodiments, different type of interactions with respect to the container object 7206 is enabled depending on whether the thumb tap gesture started from the ready state configuration. In some embodiments, in accordance with determination that a thumb tap gesture has been provided by a hand starting from a ready state configuration of the hand (e.g., the gesture includes upward movement of the thumb away from the index finger before the tap of the thumb on the index finger), the computer system performs a third operation corresponding to the thumb tap gesture (e.g., activation of a voice-based assistant 7302 or communication channel (e.g., a voice communication application), or another operation corresponding to a current user interface context that would not be enabled if the hand had not been found in the ready state configuration first). In some embodiments, additional gestures are provided by hand 7200 to interact with the voice-based assistant or communication channel. For example, a subsequent thumb flick gesture causes the voice-based assistant or voice communication user interface to be pushed from a location next to the user's hand to a farther location in space in the three-dimensional environment. In some embodiments, a subsequent thumb swipe gesture scrolls through different preset functions of the voice-based assistant or scrolls through a list of potential recipients of the voice communication channel. In some embodiments, a subsequent thumb tap gesture causes dismissal of the voice-based assistant or voice communication channel. In some embodiments, if the thumb tap gesture were not started from the ready state configuration, in response to the thumb tap gesture in FIG. 7E part (C), an operation available in the current user interface context would be activated (e.g., a currently selected virtual object would be activated).

Examples shown in FIG. 7F are merely illustrative. Providing additional and/or different operations in response to detection of input gestures that start from a ready state configuration of the hand allow the user to perform additional functions without cluttering the user interface with controls and reduce the number of user inputs in order to perform those functions, thus making the user interface more efficient and saves time during the interactions between the user and the device.

The user interface interactions illustrated in FIGS. 7A-7F are described without regard to the location of the user's gaze. In some embodiments, the interactions are agnostic with respect to the location of the user's gaze or the precise location of the user's gaze within portions of the three-dimensional environment. In some embodiments, however, gaze is utilized to modify the response behavior of the system, and the operations and user interface feedback are altered depending on the different locations of the user's gave when the user inputs are detected. FIG. 7G illustrates example gestures performed with a hand in a ready state and example responses of a displayed three-dimensional environment that are dependent on a user's gaze, in accordance with some embodiments. For example, the left column of figures (e.g., parts A-0, A-1, A-2, and A-3) illustrate example scenarios in which one or more gesture inputs (e.g., a thumb flick gesture, a thumb swipe gesture, a thumb tap gesture, or a sequence of two or more of the above) are provided by a hand that started from a ready state configuration (e.g., thumb resting on index finger) (e.g., a ready state configuration described with respect to FIGS. 7E and 7F) while a gaze of the user is focused on the user's hand (e.g., as shown in FIG. 7G, part A-0). The right column of figures (e.g., parts B-0, B-1, B-2, and B-3) illustrate example scenarios in which one or more gesture inputs (e.g., a thumb flick gesture, a thumb swipe gesture, a thumb tap gesture, or a sequence of two or more of the above) are provided by a hand that optionally also started from a ready state configuration (e.g., thumb resting on index finger) (e.g., a ready state configuration described with respect to FIGS. 7E and 7F) while a gaze of the user is focused on the user interface environment (e.g., a user interface object or physical object in the three-dimensional environment) other than the user's hand in the ready state configuration (e.g., as shown in FIG. 7G, part A-0). In some embodiments, the user interface responses and interactions described with respect to FIG. 7G are implemented for other physical object or a predefined portion thereof (e.g., a top or front surface of a housing of a physical media player device, a physical window on a wall in a room, a physical controller device, etc., as opposed to the user's hand that provides the input gestures), such that special interactions are enabled for input gestures are provided by a hand that start from a ready state configuration while the user's gaze is focused on said other physical object or predefined portion thereof. The left column figures and the right column figures in the same row of FIG. 7G (e.g., A-1 and B-1, A-2 and B-2, A-3 and B-3) illustrate different user interface responses for the same input gesture provided in the same user interface context depending on whether or not the user's gaze is focused on the user's hand (or other physical object that is defined by the computer system as the controlling or controlled physical object), in accordance with some embodiments. The input gestures described with regard to FIG. 7G are used to illustrate the processes described below, including the processes in FIG. 10.

In some embodiments, as shown in FIG. 7G, a system affordance (e.g., affordance 7214) is optionally displayed at a predefined location in the three-dimensional corresponding to the hand in the ready state configuration. In some embodiments, the system affordance is always displayed at the predefined location (e.g., a static location or a dynamically determined location) whenever the hand is determined to be in the steady state configuration. In some embodiments, the dynamically determined location of the system affordance is fixed relative to the user's hand in the ready state configuration, e.g., as the user's hand moves as a whole while remaining in the ready state configuration. In some embodiments, the system affordance is displayed (e.g., at a static location or near the tip of the thumb) in response to the user's gaze being directed to the predefined physical object (e.g., the user's hand in the ready state configuration, or other predefined physical object in the environment) while the user's hand is held in the ready state configuration, and cease to be displayed in response to the user's hand exiting the ready state configuration and/or the user's gaze moving away from the predefined physical object. In some embodiments, the computer system displays the system affordance with a first appearance (e.g., an enlarged and conspicuous appearance) in response to the user's gaze being directed to the predefined physical object (e.g., the user's hand in the ready state configuration, or other predefined physical object in the environment) while the user's hand is held in the ready state configuration, and displays the system affordance with a second appearance (e.g., a small and inconspicuous appearance) in response to the user's hand exiting the ready state configuration and/or the user's gaze moving away from the predefined physical object. In some embodiments, the system affordance is only displayed (e.g., at a static location or near the tip of the thumb) in response to indications that the user is ready to provide input (e.g., the user's hand is raise from a previous level relative to the body while the user's hand is held in the ready state configuration) (e.g., irrespective of whether the user's gaze is on the user's hand), and cease to be displayed in response to the user's hand is lowered from the raised state. In some embodiments, In some embodiments, the system affordance changes the appearance of the system affordance (e.g., from a simple indicator to a menu of objects) in response to indications that the user is ready to provide input (e.g., the user's hand is raise from a previous level relative to the body while the user's hand is held in the ready state configuration and/or the user's gaze is focused on the user's hand in the ready state configuration or the predefined physical object), and restores the appearance of the system affordance (e.g., back to the simple indicator) in response to cessation of the indications that the user is ready to provide input (e.g., the user's hand is lowered from the raised state and/or the user's gaze moves away from the user's hand or the predefined physical object). In some embodiments, the indications that the user is ready to provide input includes one or more of the user's finger is touching a physical controller or the user's hand (e.g., index finger resting on controller, or thumb resting on index finger), the user's hand is raised up from a lower level to a higher level relative to the user's body (e.g., there is upward wrist rotation of the hand in ready state configuration, or bending movement of the elbow with the hand in ready state configuration), changing hand configuration into the ready state configuration, and so on. In some embodiments, the physical location of the predefined physical object that is compared with the location of the user's gaze in these embodiments is static relative to the three-dimensional environment (e.g., also referred to as "being fixed to the world"). For example, the system affordance is displayed on a wall in the three-dimensional environment. In some embodiments, the physical location of the predefined physical object that is compared with the location of the user's gaze in these embodiments is static relative to the display (e.g., the display generation component) (e.g., also referred to as being "fixed to the user"). For example, the system affordance is displayed at the bottom of the display or field of the view of the user. In some embodiments, the physical location of the predefined physical object that is compared with the location of the user's gaze in these embodiments is static relative to a moving part of the user (e.g., the user's hand) or a moving part of the physical environment (e.g., a moving car on the highway).

In accordance with some embodiments, FIG. 7G part A-0 illustrates a user 7320 directing his/her gaze toward a predefined physical object (e.g., his/her hand in the ready state configuration) in the three-dimensional environment (e.g., user's hand 7200 or a representation thereof is visible within the field of view of one or more cameras of device 7100, or through a pass-through or transparent portion of a HMD or heads up display). In some embodiments, device 7100 uses one or more cameras that face toward the user (e.g., front-facing cameras) to track the movement of the user's eye (or to track the movement of both of user's eyes), in order to determine the direction and/or object of user's gaze. More details of exemplary gaze tracking techniques are provided with respect to FIGS. 1-6, in particular, with respect to FIGS. 5 and 6, in accordance with some embodiments. In FIG. 7G part A-0, because user's gaze is directed toward hand 7200 (e.g., as indicated by dotted line linking the user's eyeball 7512 with the user's hand 7200 or representation of the user's hand 7200' (e.g., the actual hand or a representation of the hand as presented via the display generation component)) while hand 7200 is in the ready state configuration, system user interface operations (e.g., user interface operations associated with the system affordance 7214 or with a system menu associated with the system affordance (e.g., menu 7170), rather than user interface operations associated with other regions or elements of the user interface or associated with individual software applications executing on device 7100) are performed in response to gestures performed using hand 7200. FIG. 7G part B-0 illustrates a user is directing his/her gaze away from the predefined physical object (e.g., his/her hand in the ready state configuration or another predefined physical object) in the three-dimensional environment (e.g., user's hand 7200 or said other predefined physical object, or a representation thereof that is visible within the field of view of one or more cameras of device 7100 or through a pass-through or transparent portion of a HMD or heads up display) while the user's hand is in the ready state configuration. In some embodiments, the computer system requires that the user's gaze to remain on the predefined physical object (e.g., the user's hand or another predefined physical object) while the input gestures of the hand are processed in order to provide the system responses corresponding to the input gestures. In some embodiments, the computer system requires the user's gaze to remain on the predefined physical object for more than a threshold amount of time and with preset amount of stability (e.g., kept substantially stationary or with less than a threshold amount of movement for the threshold amount of time) in order to provide the system responses corresponding to the input gestures, e.g., optionally the gaze can move away from the predefined input gestures after the time and stability requirements are met and before the input gestures are fully completed.

In an example, FIG. 7G part A-1 illustrates a thumb flick gesture that starts from a ready station configuration of the hand and includes forward movement of the thumb across the index finger of hand 7200, along an axis illustrated by arrow 7120. In response to the thumb flick gesture that started from the ready state configuration in FIG. 7G part A-1, and in accordance with a determination that the user's gaze is being directed toward the predefined physical object (e.g., the hand 7200, as seen in the real world, or through the display generation component of the computer system), the computer system displays system menu 7170 (e.g., a menu of application icons) in the three-dimensional environment (e.g., replacing the system affordance 7214 at the tip of the user's thumb).

In another example, FIG. 7G part A-2 illustrates a thumb swipe gesture that started from the ready state configuration and that includes movement of the thumb of hand 7200 along the length of the index finger of hand 7200, along an axis illustrated by arrow 7130. In this example, the hand gesture in FIG. 7G part A-2 is performed while the computer system is displaying the system menu (e.g., menu 7170) (e.g., system menu 7170 was displayed in response to the thumb flick gesture described herein with reference to FIG. 7G part A-1). In response to the thumb swipe gesture in FIG.

7G part A-2 that started from the ready state configuration, and in accordance with a determination that the user's gaze being directed toward the predefined physical object (e.g., hand 7200) (e.g., the gaze meet predefined location, duration, and stability requirements), the computer system moves current selection indicator 7198 on the system menu (e.g., menu 7170) in the direction of movement of the thumb of hand 7200 (e.g., to an adjacent user interface object on menu 7170). In some embodiments, the thumb swipe gesture is one of a sequence of two or more input gestures that started from the hand in the ready state configuration and represent a continuous series of user interactions with system user interface elements (e.g., system menu, or system control objects, etc.). As such, in some embodiments, the requirement for the gaze to remain on the predefined physical object (e.g., the user's hand) is optionally only applied for the start of the first input gesture (e.g., the thumb flick gesture in part A-1 of FIG. 7G), and not imposed on subsequent input gestures as long as the user's gaze are directed to the system user interface elements during the subsequent input gestures. For example, in accordance with a determination that the user's gaze is on the user's hand or a determination that the user's gaze is on the system menu placed at a location fixed relative to the user's hand (e.g., the tip of the thumb), the computer system performs a system operation (e.g., navigating within the system menu) in response to the thumb swipe gesture.

In yet another example, FIG. 7G part A-3 illustrates a thumb tap gesture that starts from a ready state configuration of the hand and includes movement of the thumb of hand 7200 tapping on the index finger of hand 7200 (e.g., by the thumb moving up from the index finger to a raised position and then moving from the raised position downward along an axis illustrated by arrow 7110, to the hand position in which the thumb is in contact with the index finger again. In this example, the thumb tap gesture in FIG. 7G part A-3 is performed while the computer system is displaying the system menu (e.g., menu 7170) with the current selection indicator displayed on a respective user interface object (e.g., in response to the thumb swipe gesture described herein with reference to FIG. 7G part A-2). In response to the thumb tap gesture in FIG. 7G part A-3, and in accordance with user's gaze being directed toward the predefined physical object (e.g., hand 7200), currently-selected user interface object 7190 is activated and an operation corresponding to user interface object 7190 is performed (e.g., menu 7170 ceases to be displayed, a user interface object 7306 (e.g., a preview or control panel, etc.) associated with user interface object 7190 is displayed, and/or an application corresponding to user interface object 7190 is launched). In some embodiments, user interface object 7306 is displayed at a location in the three-dimensional environment that corresponds to the location of the hand 7200. In some embodiments, the thumb tap gesture is one of a sequence of two or more input gestures that started from the hand in the ready state configuration and represent a continuous series of user interactions with system user interface elements (e.g., system menu, or system control objects, etc.). As such, in some embodiments, the requirement for the gaze to remain on the predefined physical object (e.g., the user's hand) is optionally only applied for the start of the first input gesture (e.g., the thumb flick gesture in part A-1 of FIG. 7G), and not imposed on subsequent input gestures (e.g., the thumb swipe gesture in part A-2 and the thumb tap gesture in part A-3 of FIG. 7G) as long as the user's gaze are directed to the system user interface elements during the subsequent input gestures. For example, in accordance with a determination that the user's gaze is on the user's hand or a determination that the user's gaze is on the system menu placed at a location fixed relative to the user's hand (e.g., the tip of the thumb), the computer system performs a system operation (e.g., activating a currently selected user interface object within the system menu) in response to the thumb tap gesture.

In contrast to FIG. 7G part A-0, FIG. 7G part B-0 illustrates a user directing his/her gaze away from the predefined physical object (e.g., his/her hand in the ready state configuration) in the three-dimensional environment (e.g., user's hand 7200 or a representation thereof is within the field of view of one or more cameras of device 7100, but the gaze of the user is not on the hand 7200 (e.g., neither directly, nor through a pass-through or transparent portion of a HMD or heads up display, nor through the camera view)). Instead, the user's gaze is directed toward container 7206 (e.g., a menu row) of user interface objects (e.g., as described herein with reference to container 7206, FIGS. 7D-7E) or the displayed user interface in general (e.g., the user's gaze does not meet the stability and duration requirements for a specific location or object in the three-dimensional environment). In accordance with a determination that the user's gaze is directed away from the predefined physical object (e.g., hand 7200), the computer system forgoes performing system user interface operations (e.g., user interface operations associated with the system affordance 7214 or with a function of displaying the system menu (e.g., a menu of application icons) associated with the system affordance (e.g., as illustrated in FIG. 7G part A-1)) in response to the thumb flick gesture performed using hand 7200. Optionally, instead of system user interface operations, user interface operations associated with other regions or elements of the user interface or associated with individual software applications executing on the computer system (e.g., device 101 or the HMD) are performed in response to the thumb flick gesture performed using hand 7200 while user's gaze is directed away from the predefined physical object (e.g., hand 7200 in ready state). In one example, as shown in FIG. 7G, the entire user interface including the container 7206 is scrolled upward in accordance with the upward thumb flick gesture. In another example, user interface operations associated with container 7206 are performed in response to gestures performed using hand 7200 while user's gaze is directed away from the hand 7200 and toward container 7206, instead of system user interface operations (e.g., displaying a system menu).

Similar to FIG. 7G part A-1, FIG. 7G part B-1 also illustrates a thumb flick gesture by hand 7200 that started from the ready state configuration. In contrast to the behavior shown in FIG. 7G part A-1, in FIG. 7G part B-1, in accordance with a determination that the user's gaze is not directed to the predefined physical object (e.g., the user's hand in the ready state configuration), the computer system forgoes displaying the system menu in response to the thumb flick gesture. Instead, the user interface is scrolled upward in accordance with the thumb flick gesture, e.g., container 7206 is moved upward in the three-dimensional environment, in accordance with the movement of the thumb of hand 7200 across the index finger of hand 7200, and in accordance with user's gaze being directed away from hand 7200 and toward container 7206. In this example, although a system operation is not performed, system affordance 7214 remains displayed next to the user's thumb indicating that system operation is available (e.g., because the user's hand is in the ready state configuration), and the system affordance 7214 moves with the user's thumb during the input gesture and while the user interface is scrolled upward in response to the input gesture.

Similar to FIG. 7G part A-2, FIG. 7G part B-2 also illustrates a thumb swipe gesture by hand 7200 that started from the ready state configuration. In contrast to FIG. 7G part A-2, the thumb swipe gesture in FIG. 7G part B-2 is performed while the system menu (e.g., menu 7170) is not displayed and while the user's gaze is not focused on the predefined physical object (e.g., the user's hand) (e.g., because menu 7170 was not displayed in response to the thumb flick gesture described herein with reference to FIG. 7G part B-1). In response to the thumb swipe gesture in FIG. 7G part B-2, and in accordance with a determination that the user's gaze is being directed away from the predefined physical object (e.g., hand 7200) and toward container 7206, a current selection indicator in container 7206 is scrolled in the direction of movement of the thumb of hand 7200).

Similar to FIG. 7G part A-3, FIG. 7G part B-3 also illustrates a thumb tap gesture by hand 7200 that started from the ready state configuration. In contrast to FIG. 7G part A-3, the thumb tap gesture in FIG. 7G part B-3 is performed while the system menu (e.g., menu 7170) is not displayed and while the user's gaze is not focused on the predefined physical object (e.g., the user's hand) (e.g., because menu 7170 was not displayed in response to the thumb flick gesture described herein with reference to FIG. 7G part B-1). In response to the thumb tap gesture in FIG. 7G part A-3, and in accordance with user's gaze being directed away from the predefined physical object (e.g., hand 7200 and in the absence of any system user interface element displayed in response to previously received input gestures), the computer-system forgoes performing a system operation. In accordance with a determination that the user's gaze is directed toward container 7206, a currently-selected user interface object in container 7206 is activated and an operation corresponding to the currently selected user interface objects performed (e.g., container 7206 ceases to be displayed, a user interface 7308 corresponding to the activated user interface object is displayed. In this example, although a system operation is not performed, system affordance 7214 remains displayed next to the user's thumb indicating that system operation is available (e.g., because the user's hand is in the ready state configuration), and the system affordance 7214 moves with the user's thumb during the input gesture and while the user interface is scrolled upward in response to the input gesture. In some embodiments, because user interface object 7308 was activated from container 7206, user interface object 7308, in contrast to user interface object 7306 in FIG. 7G part A-3, is displayed at a location in the three-dimensional environment that does not correspond to the location of hand 7200.

It is to be understood that, in the examples shown in FIG. 7G, the computer system treats the user's hand 7200 as the predefined physical object whose location is used (e.g., compared with the user's gaze) for determining whether a system operation should be performed in response to a predefined gesture input. Although the location of hand 7200 appears to be different on the display in the examples shown in the left and right columns of FIG. 7G, this is merely to indicate that the location of the user's gaze has changed relative to the three-dimensional environment, and does not necessarily impose a limitation on the location of the user's hand relative to the three-dimensional environment. In fact, in most circumstances, the user's hand as a whole is often not fixed in location during the input gestures, and the gaze is compared to the moving physical location of the user's hand to determine if the gaze is focused on the user's hand. In some embodiments, if another physical object in the user's environment other than the user's hand is used as the predefined physical object for determining whether a system operation should be performed in response to a predefined gesture input, the gaze is compared to the physical location of that physical object, even when the physical object may be moving relative to the environment or the user, and/or when the user is moving relative to the physical object.

Figure 7H:
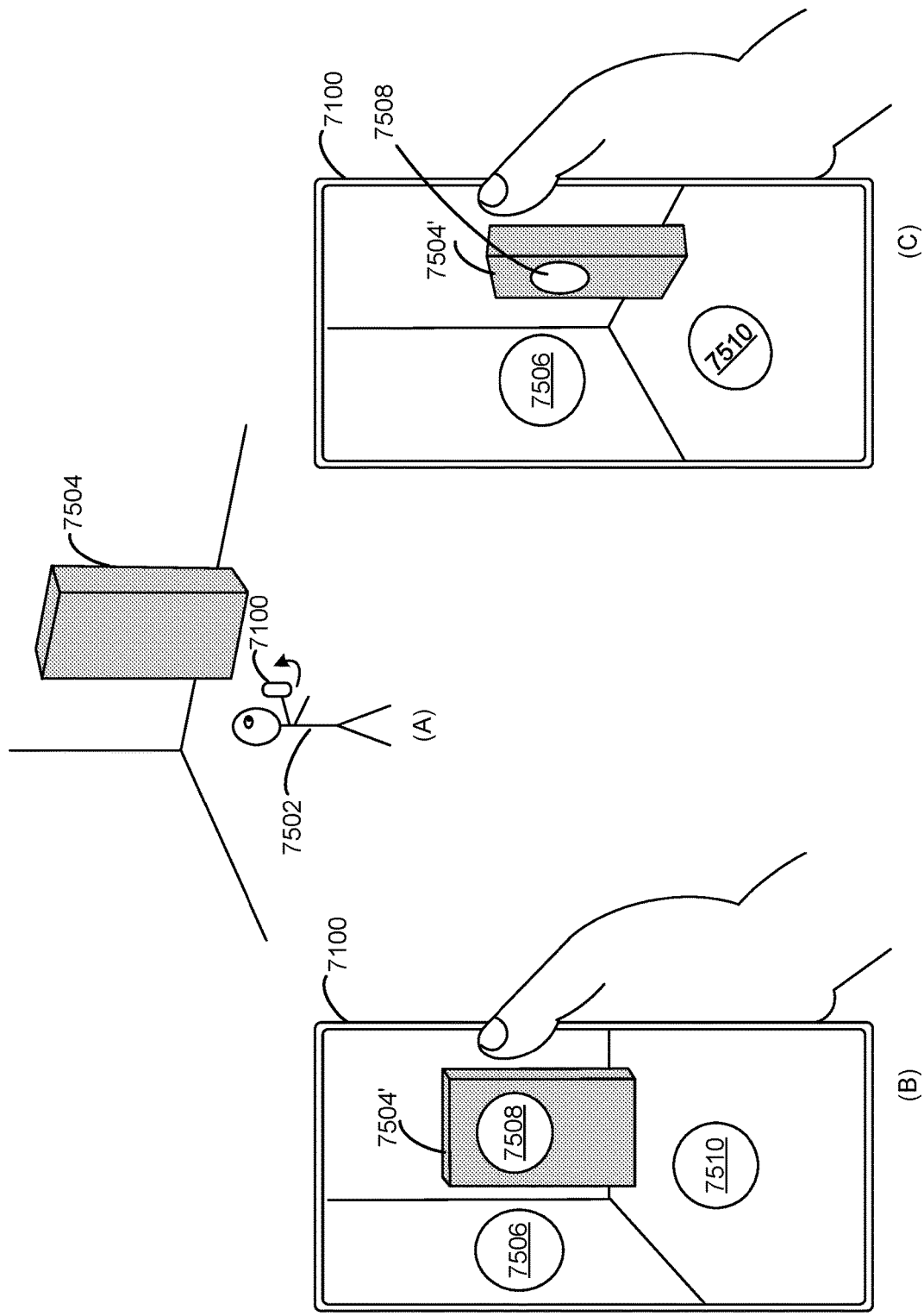
Figure 7I:
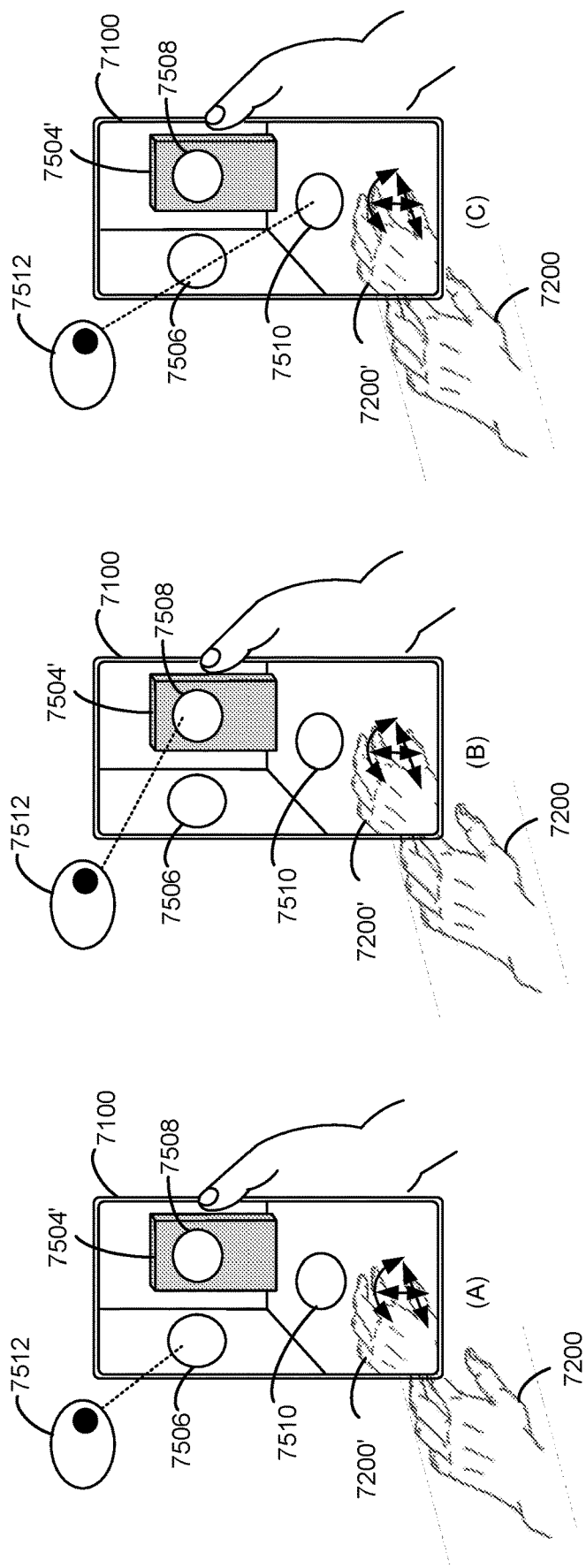

In the examples shown in FIG. 7G, whether the user's gaze directed to a predefined physical location (e.g., focused on a predefined physical object (e.g., a user's hand in a ready state configuration, or a system user interface object displayed at a fixed location relative to the predefined physical object) is used in conjunction with whether an input gesture is started from a hand in a ready state configuration to determine whether to perform a system operation (e.g., displaying a system user interface or system user interface object) or to perform an operation in a current context of the three-dimensional environment, without performing the system operation, in accordance with some embodiments. FIGS. 7H-7J illustrate example behavior of a displayed three-dimensional environment (e.g., virtual reality or mixed reality environment) that is dependent on whether a user is prepared to provide a gesture input (e.g., whether the user's hand meet predefined requirements (e.g., raised to a predefined level and poised in the ready state configuration for at least a threshold amount of time) in conjunction with the user's gaze meeting predefined requirement (e.g., gazed focused on an activatable virtual object and meets stability and duration requirements)), in accordance with some embodiments. The input gestures described with regard to FIGS. 7H-7J are used to illustrate the processes described below, including the processes in FIG. 11.

FIG. 7H illustrates an example computer-generated environment corresponding to a physical environment. As described herein with reference to FIG. 7H, the computer-generated environment may be a virtual reality environment, an augmented reality environment, or a computer-generated environment that is displayed on a display such that the computer-generated environment is superimposed over a view of the physical environment that is visible through a transparent portion of the display. As shown in FIG. 7H, a user 7502 is standing in a physical environment (e.g., scene 105) operating a computer system (e.g., computer system 101) (e.g., holding device 7100 or wearing an HMD). In some embodiments, as in the example shown in FIG. 7H, the device 7100 is a handheld device (e.g., a cell phone, tablet, or other mobile electronic device) that includes a display, a touch-sensitive display, or the like. In some embodiments, the device 7100 represents and is optionally replaced with a wearable headset that includes a heads-up display, a head-mounted display, or the like. In some embodiments, the physical environment includes one or more physical surfaces and physical objects (e.g., walls of a room, furniture (e.g., represented by shaded 3D boxes 7504)) surrounding the user 7502.

In the example shown in FIG. 7H part (B), the computer-generated three-dimensional environment that corresponds to the physical environment (e.g., the portion of physical environment that is within the field of view of one or more cameras of device 7100, or visible through a transparent portion of the display of device 7100), is displayed on device 7100. The physical environment includes physical object 7504, which is represented by object 7504' in the computer-generated environment shown on the display (e.g., the computer-generated environment is a virtual reality environment that includes a virtual representation of the physical object 7504, the computer-generated environment is an augmented reality environment that includes a representation 7504' of physical object 7504 as part of a live view of one or more cameras of device 7100, or physical object 7504 is visible through a transparent portion of the display of device 7100). In addition, the computer-generated environment shown on the display includes virtual objects 7506, 7508, and 7510. Virtual object 7508 is displayed to appear affixed to object 7504' (e.g., overlaying a flat front surface of the physical object 7504). Virtual object 7506 is displayed to appear affixed to a wall of computer-generated environment (e.g., overlaying a portion of a wall, or representation of a wall of the physical environment). Virtual object 7510 is displayed to appear affixed to the floor of the computer-generated environment (e.g., overlaying a portion of the floor or a representation of the floor of the physical environment). In some embodiments, virtual objects 7506, 7508, and 7510 are activatable user interface objects that causes performance of object-specific operations when activated by a user input. In some embodiments, the computer-generated environment also includes virtual objects that are not activatable by user input, and are displayed to improve aesthetic qualities of the computer-generated environment and provides information to the user. FIG. 7H part (C) illustrates that the computer-generated environment shown on device 7100 is a three-dimensional environment: as the viewing perspective of device 7100 relative to the physical environment changes (e.g., as the viewing angle of device 7100 or one or more cameras of device 7100 relative to the physical environment changes in response to movement and/or rotation of the device 7100 in the physical environment), the viewing perspective of the computer-generated environment as displayed on device 7100 is changed accordingly (e.g., including changing the viewing perspective of the physical surfaces and objects (e.g., wall, floor, physical object 7504) and the virtual objects 7506, 7508, and 7510), in accordance with some embodiments.

FIG. 7I illustrates example behavior of the computer-generated environment in response to the user directing his/her gaze toward respective virtual objects in the computer-generated environment, while user 7502 is not prepared to provide a gesture input (e.g., the user's hand is not in the ready state configuration). As shown in FIG. 7I parts (A)-(C), the user is holding his/her left hand 7200 in a state other than a ready state (e.g., a position other than a first predefined ready state configuration) for providing gesture inputs. In some embodiments, the computer system determines that the user's hand is in the predefined ready state for providing gesture inputs in accordance with detecting that a predefined portion of the user's finger is touching a physical control element (e.g., thumb touching middle of the index finger, or index finger touching a physical controller, etc.). In some embodiments, the computer system determines that the user's hand is in the predefined ready state for providing gesture inputs in accordance with detecting that the user's hand is raised above a predefined level relative to the user (e.g., hand is lifted in response to arm rotation around the elbow joint, or wrist rotation around the wrist, or finger lifted relative to hand, etc.). In some embodiments, the computer system determines that the user's hand is in the predefined ready state for providing gesture inputs in accordance with detecting that the posture of the user's hand is changed to a predefined configuration (e.g., thumb resting on middle of the index finger, fingers are closed to form a fist, etc.). In some embodiments, multiple of the requirements above are combined to determine whether the user's hand is in a ready state to provide gesture inputs. In some embodiments, the computer system also requires that the user's hand as a whole is stationary (e.g., less than a threshold amount of movement without a threshold amount of time) in order to determine that the hand is ready to provide gesture inputs. When the user's hand is not found to be in the ready state for providing gesture inputs and the user's gaze is focused on an activatable virtual object, subsequent movements of the user's hand (e.g., free movement or movement mimicking predefined gestures) are not recognized and/or treated as user inputs directed to the virtual objects that are the focus of the user's gaze, in accordance with some embodiments.

In this example, a representation of hand 7200 is displayed in the computer-generated environment. The computer-generated environment does not include a representation of user's right hand (e.g., because the right hand is not within the field of view of the one or more cameras of device 7100). In addition, in some embodiments, e.g., in the example shown in FIG. 7I, where device 7100 is a handheld device, the user is able to see portions of the surrounding physical environment separately from any representations of the physical environment displayed on device 7100. For example, portions of the user's hands are visible to the user outside of the display of device 7100. In some embodiments, device 7100 in these examples represents and can be replaced by a headset having a display (e.g., a head-mounted display) that entirely blocks the user's view of the surrounding physical environment. In some such embodiments, no portions of the physical environment are directly visible to the user; instead, the physical environment is visible to the user through representations of portions of the physical environment that are displayed by the device. In some embodiments, the user's hand(s) are not visible to the user, either directly or via the display of the device 7100, while the current state of the user's hand(s) is continuously or periodically monitored by the device to determine if the user's hand(s) have entered a ready state for providing gesture inputs. In some embodiments, the device displays an indicator of whether the user's hand is in the ready state for providing input gestures, to provide feedback to the user and alert the user to adjust his/her hand positions if he/she wishes to provide an input gesture.

In FIG. 7I part (A), the user's gaze is directed toward virtual object 7506 (e.g., as indicated by the dotted line linking a representation of the user's eyeball 7512 and virtual object 7506). In some embodiments, device 7100 uses one or more cameras that face toward the user (e.g., front-facing cameras) to track the movement of user's eye (or to track the movement of both of the user's eyes), in order to determine the direction and/or object of user's gaze. More details of eye tracking or gaze tracking technologies are provided in FIGS. 1-6, in particular FIGS. 5-6, and accompanying descriptions. In FIG. 7I part (A), in accordance with a determination that the user's hand is not in a ready state for providing gesture inputs (e.g., the left hand is not stationary and is not held in a first predefined ready state configuration for more than a threshold amount of time), no operation is performed with respect to virtual object 7506 in response to the user directing his/her gaze toward virtual object 7506. Similarly, in FIG. 7I part (B), the user's gaze has left virtual object 7506 and is now directed toward virtual object 7508 (e.g., as indicated by the dotted line linking the representation of the user's eyeball 7512 and virtual object 7508). in accordance with a determination that the user's hand is not in a ready state for providing gesture inputs, no operation is performed with respect to virtual object 7508 in response to user directing his/her gaze toward virtual object 7508. Likewise, in FIG. 7I part (C), the user's gaze is directed toward virtual object 7510 (e.g., as indicated by the dotted line linking the representation of the user's eyeball 7512 and virtual object 7510). In accordance with a determination that the user's hand is not in a ready state for providing gesture inputs, no operation is performed with respect to virtual object 7510 in response to user directing his/her gaze toward virtual object 7510. In some embodiments, it is advantageous to require that the user's hand be in the ready state to provide gesture inputs in order to trigger visual changes indicating that a virtual object under the user's gaze is activatable by gesture inputs, because it would tend to prevent unnecessarily visual changes in the displayed environment when the user merely wishes to inspect the environment (e.g., gazing at various virtual objects briefly or intently for a period of time) rather than interact with any particular virtual object in the environment. This reduces user's visual fatigue and distractions, and hence reducing user mistakes, when using the computer system to experience the computer-generated three-dimensional environment.

In contrast to the example scenarios shown in FIG. 7I, FIG. 7J illustrates example behavior of the computer-generated environment in response to the user directing his/her gaze toward respective virtual objects in the computer-generated environment, while the user is prepared to provide a gesture input, in accordance with some embodiments. As shown in FIG. 7J parts (A)-(C), the user is holding his/her left hand in a first ready state configuration for providing gesture inputs (e.g., with thumb resting on index finger, and hand raised above a preset level relative to the user's body), while virtual objects 7506, 7608, and 7510 are displayed in the three-dimensional environment.

In FIG. 7J part (A), the user's gaze is directed toward virtual object 7506 (e.g., as indicated by the dotted line linking the representation of the user's eyeball 7512 and virtual object 7506). In accordance with a determination that the user's left hand is in the ready state for providing gesture inputs, in response to the user directing his/her gaze toward virtual object 7506 (e.g., the gaze meets duration and stability requirements at virtual object 7506), the computer system provides visual feedback indicating that virtual object 7506 is activatable by gesture inputs (e.g., virtual object 7506 is highlighted, expanded, or augmented with additional information or user interface details, to indicate that virtual object 7506 is interactive (e.g., one or more operations associated with virtual object 7506 are available to be performed in response to the user's gesture inputs). Similarly, in FIG. 7J part (B), the user's gaze has moved away from virtual object 7506, and is now directed toward virtual object 7508 (e.g., as indicated by the dotted line linking the representation of the user's eyeball 7512 and virtual object 7508). In accordance with a determination that the user's hand is in a ready state for providing gesture inputs, the computer system, in response to the user directing his/her gaze toward virtual object 7508 (e.g., the gaze meets stability and duration requirements at virtual object 7508), provides visual feedback indicating that virtual object 7506 is activatable by gesture inputs (e.g., virtual object 7508 is highlighted, expanded, or augmented with additional information or user interface details, to indicate that virtual object 7508 is interactive (e.g., one or more operations associated with virtual object 7508 are available to be performed in response to the user's gesture inputs). Likewise, in FIG. 7J part (C), the user's gaze has moved away from virtual object 7508 and is now directed toward virtual object 7510 (e.g., as indicated by the dotted line linking the representation of the user's eyeball 7512 and virtual object 7510). In accordance with a determination that the user's hand is in a ready state for providing gesture inputs, the computer system, in response to detecting the user directing his/her gaze toward virtual object 7510, provides visual feedback indicating that virtual object 7506 is activatable by gesture inputs (e.g., virtual object 7510 is highlighted, expanded, or augmented with additional information or user interface details, to indicate that virtual object 7510 is interactive (e.g., one or more operations associated with virtual object 7510 are available to be performed in response to gesture inputs).

In some embodiments, while the visual feedback indicating that a virtual object is activatable by gesture inputs is displayed, and in response to detecting a gesture input that is started from the user's hand in the ready state, the computer system performs an operation that corresponds to the virtual object that is the subject of the user's gaze in accordance with the user's gesture input. In some embodiments, the visual feedback indicating that a respective virtual object is activatable by gesture inputs ceases to be displayed in response to the user's gaze moving away from the respective virtual object and/or the user's hand ceases to be in the ready state for providing gesture inputs without providing a valid gesture input.

In some embodiments, a respective virtual object (e.g., virtual object 7506, 7508, or 7510) corresponds to an application (e.g., the respective virtual object is an application icon), and the operations associated with the respective virtual object that are available to be performed include launching the corresponding application, performing one or more operations within the application, or displaying a menu of operations to be performed with respect to or within the application. For example, where the respective virtual object corresponds to a media player application, the one or more operations include increasing an output volume of the media (e.g., in response to a thumb swipe gesture or pinch and twist gesture in a first direction), decreasing the output volume (e.g., in response to a thumb swipe gesture or pinch and twist gesture in a second direction opposite the first direction), toggling playback of (e.g., playing or pausing) the media (e.g., in response to a thumb tap gesture), fast-forwarding, rewinding, browsing through media for playback (e.g., in response to multiple consecutive thumb swipe gestures in the same direction), or otherwise controlling media playback (e.g., menu navigation in response to thumb flick gesture followed by thumb swipe gestures). In some embodiments, the respective virtual object is a simplified user interface (e.g., showing only on/off buttons) for controlling a physical object (e.g., an electronic appliance, smart speaker, smart lamp, etc.) underlying the respective virtual object, and a wrist flick gesture or thumb flick gesture detected while the visual indication that the respective virtual object is interactive is displayed causes the computer system to display an augmented user interface for controlling the physical object (e.g., showing the on/off button and a currently played media album, and additional playback controls and output adjustment controls, etc.).

In some embodiments, visual feedback indicating that a virtual object is interactive (e.g., responsive to user inputs, including gesture inputs and other types of inputs such as audio inputs and touch-inputs, etc.) includes displaying one or more user interface objects or information, prompts that were not displayed prior to the user's gaze input on the virtual object. In one example, where the respective virtual object is a virtual window overlaid on a physical wall represented in the three-dimensional environment, in response to the user directing his/her gaze toward the virtual window while the user's hand is in a ready state for providing gesture inputs, the computer system displays a location and/or time of day associated with the virtual scenery visible through the virtual window is displayed, to indicate that the scenery can be changed (e.g., through change in location, time of day, season, etc. made in accordance with subsequent gesture inputs by the user). In another example, where the respective virtual object includes a displayed still photo (e.g., the respective virtual object is a picture frame), in response to the user directing his/her gaze toward the displayed photo while the user's hand is in a ready state for providing gesture inputs, the computer system displays a multi-frame photo or a video clip associated with the displayed still photo to indicate that the photo is interactive, and optionally to indicate that the photo can be changed (e.g., through browsing a photo album in accordance with subsequent gesture inputs by the user).

FIGS. 7K-7M illustrate example views of a three-dimensional environment (e.g., a virtual reality environment or a mixed reality environment) that change in response to detection of changes in a user's hand grip on a housing of a display generation component of a computer system (e.g., computer system 101 in FIG. 1 (e.g., a handheld device or an HMD)), while the display generation component (e.g., display generation component 120 in FIGS. 1, 3, and 4) of the computer system is placed in a predefined position relative to a user of the device (e.g., when the user initially enters the computer-generated reality experience (e.g., when the user holds the device in front of his/her eyes, or when the user puts an HMD on his head)). The changes in the view of the three-dimensional environment forms an initial transition into the computer-generated reality experience that is controlled by the user (e.g., by changing his/her grip on the housing of the device or display generation component), rather than completely determined by the computer-system without user input. The input gestures described with regard to FIG. 7G are used to illustrate the processes described below, including the processes in FIG. 12.

FIG. 7K part (A) illustrates a physical environment 7800 in which the user (e.g., user 7802) is using the computer system. The physical environment 7800 includes one or more physical surfaces (e.g., walls, floors, surfaces of physical objects, etc.) and physical objects (e.g., physical object 7504, the user's hands, body, etc.). FIG. 7K part (B) illustrates an example view 7820 of a three-dimensional environment (also referred to as "first view 7820 of the three-dimensional environment" or "first view 7820") displayed by the display generation component of the computer system (e.g., device 7100 or an HMD). In some embodiments, first view 7820 is displayed when the display generation component (e.g., the display of device 7100 or the HMD) is placed in a predefined position relative to the user 7802. For example, in FIG. 7K, the display of device 7100 is placed in front of the user's eyes. In another example, the computer system determines that the display generation component is placed in the predefined position relative to the user in accordance with a determination that the display generation component (e.g., an HMD) is placed on the user's head, such that the user's view of the physical environment is only possible through the display generation component. In some embodiments, the computer system determines that the display generation component is placed in the predefined position relative to the user in accordance with a determination that the user has been seated in front of a heads-up display of the computer system. In some embodiments, placing the display generation component in the predefined position relative to the user, or placing the user in the predefined position relative to the display generation component allow the user to view content (e.g., real or virtual content) through the display generation component. In some embodiments, once the display generation component and the user are in the predefined relative position, the user's view of the physical environment can be blocked at least partially (or completely) by the display generation component.

In some embodiments, placement of the display generation component of the computer system is determined based on analysis of data captured by a sensor system. In some embodiments, the sensor system includes one or more sensors that are components of the computer system (e.g., internal components that are enclosed in the same housing as the display generation component of device 7100 or the HMD). In some embodiments, the sensor system is an external system and not enclosed in the same housing as the display generation component of the computer system (e.g., the sensors are external cameras that provide captured image data to the computer system for data analysis.

In some embodiments, the sensor system includes one or more imaging sensors (e.g., one or more cameras) that track movement of the user and/or the display generation component of the computer system. In some embodiments, the one or more imaging sensors track position and/or movement of one or more features of the user, such as the user's hand(s) and/or the user's head to detect placement of the display generation component relative to the user or a predefined part of the user (e.g., head, eyes, etc.). For example, the image data is analyzed in real time to determine whether the user is holding the display of the device 7100 in front of the user's eyes or whether the user is putting the head-mounted display on the user's head. In some embodiments, the one or more imaging sensors track the user's eye gaze to determine where the user is looking at (e.g., whether the user is looking at the display). In some embodiments, the sensor system includes one or more touch-based sensors (e.g., mounted on the display) to detect the user's hand grip of the display, such as holding the device 7100 with one or two hands and/or on the edges of the device, or holding the head-mounted display using two hands to put the head-mounted display on the user's head. In some embodiments, the sensor system includes one or more motion sensors (e.g., accelerometer) and/or position sensors (e.g., gyroscope, GPS sensors, and/or proximity sensors) that detect motion and/or positional information (e.g., location, height, and/or orientation) of the display of the electronic device to determine the placement of the display relative to the user. For example, the motion and/or positional data is analyzed to determine whether the mobile device is being raised and facing toward the user's eyes, or whether the head-mounted display is being lifted and put onto the user's head. In some embodiments, the sensor system includes one or more infrared sensors that detect positioning of the head-mounted display on the user's head. In some embodiments, the sensor system includes a combination of different types of sensors to provide data for determining the placement of the display generation component relative to the user. For example, the user's hand grip on the housing of the display generation component, the motion and/or orientation information of the display generation component, and the user's eye gaze information are analyzed in combination to determine the placement of the display generation component relative to the user.

In some embodiments, based on the analysis of the data captured by the sensor system, it is determined that the display of the electronic device is placed in a predefined position relative to the user. In some embodiments, the predefined position of the display relative to the user indicates that the user is about to initiate a virtual and immersive experience using the computer system (e.g., starting a three-dimensional movie, entering a three-dimensional virtual world, etc.). For example, the sensor data indicates that the user is holding the mobile device in the user's two palms (e.g., hand configuration shown in FIG. 7K) while the user's eye gaze is directed toward the display screen, or the user is holding and lifting the head-mounted display using two hands to put it on the user's head. In some embodiments, the computer system allows a period of time for the user to adjust the position of the display generation component relative to the user (e.g., to shift the HMD such that the fit is comfortable and the displays are aligned well with the eyes), and the change in hand grip and position during this time does not trigger any changes in the displayed first view. In some embodiments, the initial hand grip that is monitored for change is not the grip for holding the display generation component, but a touch of the hand or finger on a specific part of the display generation component (e.g., a switch or control for turning on the HMD or starting the display of virtual content). In some embodiments, the combination of hand grip placing the HMD on the user's head and activating a control to start the immersive experience is the initial hand grip that is monitored for change.

In some embodiments as shown in FIG. 7K part (B), in response to detecting that the display is in the predefined position relative to the user, first view 7820 of the three-dimensional environment is displayed by the display generation component of the computer system. In some embodiments, first view 7820 of the three-dimensional environment is a welcome/introductory user interface. In some embodiments, first view 7820 includes the pass-through portion including a representation of at least a portion of physical environment 7800 surrounding user 7802.

In some embodiments, the pass-through portion is a transparent or semi-transparent (e.g., a see-through) portion of the display generation component revealing at least a portion of physical environment 7800 surrounding and within the field of view of user 7802. For example, the pass-through portion is a portion of the head-mounted display that is made semi-transparent (e.g., less than 50%, 40%, 30%, 20%, 15%, 10%, or 5% of opacity) or transparent, such that the user can see through it to view the real world surrounding the user without removing the display generation component. In some embodiments, the pass-through portion gradually transitions from semi-transparent or transparent to fully opaque as the welcome/introductory user interface changes to immersive virtual or mixed reality environment, for example, in response to a subsequent change in the user's hand grip that indicates that the user's is ready to go into the fully immersive environment.

In some embodiments, the pass-through portion of the first view 7820 displays a live feed of images or video of at least a portion of physical environment 7800 captured by one or more cameras (e.g., rear facing camera(s) of the mobile device or associated with the head-mounted display, or other cameras that feed image data to the electronic device). For example, the pass through portion includes all or a portion of the display screen that displays the live images or video of physical environment 7800. In some embodiments, the one or more cameras point at a portion of the physical environment that is directly in front of the user's eyes (e.g., behind the display generation component). In some embodiments, the one or more cameras point at a portion of the physical environment that is not directly in front of the user's eyes (e.g., in a different physical environment, or to the side or behind the user).

In some embodiments, first view 7820 of the three-dimensional environment includes three-dimensional virtual reality (VR) content. In some embodiments, the VR content includes one or more virtual objects that correspond to one or more physical objects (e.g., a shelf, and/or walls) in physical environment 7800. For example, at least some of the virtual objects are displayed at locations in the virtual reality environment that correspond to locations of physical objects in the corresponding physical environment 7800 (e.g., the locations of the physical objects in the physical environment are determined using one or more cameras). In some embodiments, the VR content does not correspond to the physical environment 7800 viewed through the pass-through portion and/or are independently displayed from the physical objects in the pass-through portion. For example, the VR content includes virtual user interface elements (e.g., a virtual dock including user interface objects, or a virtual menu), or other virtual objects that are unrelated to physical environment 7800.

In some embodiments, first view 7820 of the three-dimensional environment includes three-dimensional augmented reality (AR) content. In some embodiments, one or more cameras (e.g., rear facing camera(s) of the mobile device or associated with the head-mounted display, or other cameras that feed image data to computer system) continuously provide a live view of at least a portion of surrounding physical environment 7800 that is within the field of view of the one or more cameras, and the AR content corresponds to the portion of surrounding physical environment 7800 that is within the field of view of the one or more cameras. In some embodiments, the AR content at least partially includes the live view of the one or more cameras. In some embodiments, the AR content includes one or more virtual objects displayed in placed of a portion of the live view (e.g., appearing superimposed over or blocking a portion of the live view). In some embodiment, the virtual objects are displayed at locations in the virtual environment 7820 corresponding to locations of the corresponding objects in physical environment 7800. For example, a respective virtual object is displayed in place of (e.g., superimposed over, obscures, and/or replaces the view of) a corresponding physical object in physical environment 7800.

In some embodiments, in first view 7820 of the three-dimensional environment, the pass-through portion (e.g., representing at least a portion of physical environment 7800) is surrounded by virtual content (e.g., VR and/or AR content). For example, the pass-through portion does not overlap with the virtual content on the display. In some embodiments, in first view 7820 of the three-dimensional virtual environment, the VR and/or AR virtual content is displayed in place of (e.g., superimposed over or replaces content displayed in) the pass-through portion. For example, the virtual content (e.g., a virtual dock listing a plurality of virtual user interface elements or a virtual start menu) is superimposed over or blocking a portion of physical environment 7800 that is revealed through the semi-transparent or transparent pass-through portion. In some embodiments, first view 7820 of the three-dimensional environment initially includes only the pass-through portion without any virtual content. For example, when the user initially holds the device in the user's palms (e.g., as shown in FIG. 7L) or when the user initially puts the head-mounted display on the user's head, the user sees a portion of the physical environment within the field of view of the user's eyes or within the field of view of the live feed cameras through the see-through portion. Then the virtual content (e.g., the welcome/introductory user interface with virtual menu/icons) gradually fades in to superimpose over or block the pass-through portion over a period of time while the user's hand grip remains unchanged. The welcome/introductory user interface remains displayed (e.g., in a stable state with both virtual content and pass-through portion showing the physical world) as long as the user's hand grip does not change, in some embodiments.

In some embodiments, enabling the user's virtual immersive experience causes the user's current view of the surrounding real world to be temporarily blocked by the display generation component (e.g., by the presence of the display close in front of the user's eyes and the sound muffling cancelation functions of the head-mounted display). This occurs at a point in time that is before the start of virtual immersive experience for the user. By having the pass-through portion within the welcome/introductory user interface, the transition from seeing the physical environment surrounding the user into the user's virtual immersive experience benefits from a better controlled and more smooth transition (e.g., a cognitively gentle transition). This allows the user more control over how much time as he/she needs to get ready for the fully immersive experience after seeing the welcome/introductory user interface, as opposed to letting the computer system or the content provider dictate the timing for transitioning into the fully immersive experience for all users.

FIG. 7M illustrates another example view 7920 of the three-dimensional environment (also referred to as "second view 7920 of the three-dimensional environment" or "second view 7920") displayed by the display generation component of the computer system (e.g., on the display of device 7100). In some embodiments, second view 7920 of the three-dimensional environment replaces first view 7820 of the three-dimensional environment in response to detection of a change in grip of the user's hand (e.g., change from hand configuration (e.g., two-handed grip) in FIG. 7K part (B) to hand configuration in FIG. 7L part (B) (e.g., one-handed grip)) on the housing of the display generation component of the computer system that satisfies first predetermined criteria (e.g., criteria corresponding to detection of a sufficient reduction of user's control or guardedness).

In some embodiments, the change in grip of the user's hand(s) is detected by the sensor system as discussed above with reference to FIG. 7K. For example, one or more imaging sensors track movement and/or position of the user's hand to detect the change in grip of the user's hand. In another example, one or more touch-based sensors on the display detect the change in grip of the user's hand.

In some embodiments, the first predetermined criteria of the change in grip of the user's hand require a change of a total number of hands detected on the display (e.g., from two hands to one hand, or from one hand to no hands, or from two hands to no hands), a change of a total number of fingers in contact with the display generation components (e.g., from eight fingers to six fingers, from four fingers to two fingers, from two fingers to no fingers, etc.), a change from hand contact to no hand contact on the display generation component, a change in contact position(s) (e.g., from palm to finger(s)), and/or contact intensities on the display (e.g., resulted from a change in hand posture, orientation, relative grip forces of different fingers on the display generation component, etc.). In some embodiments, the change in grip of the hand on the display does not cause a change in the predefined position of the display relative to the user (e.g., the head-mounted display is still on the user's head covering the user's eyes). In some embodiments, the change in grip of the hand represents the user letting go of the display (e.g., gradually or resolutely) and is ready to be immersed in the virtual immersive experience.

In some embodiments, the initial hand grip that is monitored for change is not the grip for holding the display generation component, but a touch of the hand or finger on a specific part of the display generation component (e.g., a switch or control for turning on the HMD or starting the display of virtual content), and the first predetermined criteria of the change in grip of the user's hand require the finger(s) that touched the specific part of the display generation component (e.g., the fingers that activate the switch or control for turning on the HMD or starting the display of virtual content) to cease to touch the specific part of the display generation component.

In some embodiments, second view 7920 of the three-dimensional environment replaces at least a portion of the pass-through portion in first view 7820 with virtual content. In some embodiments, the virtual content in second view 7920 of the three-dimensional environment includes VR content (e.g., virtual object 7510 (e.g., a virtual user interface element, or system affordance)), AR content (e.g., a virtual object 7506 (e.g., a virtual window overlaid on live view of the wall captured by one or more cameras), and/or a virtual object 7508 (e.g., a photo or virtual controls displayed in place of or superimposed over a portion or entirety of the representation 7504' of a physical object 7504 in the physical environment)).

In some embodiments, replacing first view 7820 with second view 7920 includes increasing the opacity of the pass-through portion (e.g., when the pass-through portion is implemented with a semi-transparent or transparent state of the display), such that the virtual content superimposed over the semi-transparent or transparent portion of the display becomes more visible and color saturated. In some embodiments, the virtual content in second view 7920 provides a more immersive experience to the user than the virtual content in first view 7820. For example, the virtual content in first view 7820 is displayed in front of the user, whereas the virtual content in second view 7920 includes a three-dimensional world represented in a panorama or 360-degree view viewable by the user when the user turns his/her head and/or walks around. In some embodiments, second view 7920 includes a smaller pass-through portion that reveals fewer portions or a smaller portion of physical environment 7800 surrounding the user as compared to first view 7820. For example, the pass-through portion of first view 7820 shows a real window on one of the walls of a room in which the user is located, and the pass-through portion of second view 7920 shows the window on one of the walls replaced with a virtual window, so that the area of the pass-through portion is reduced in second view 7920.

FIG. 7M illustrates yet another example third view 7821 (e.g., first view 7820 of the three-dimensional environment or a modified version thereof, or a different view)) is displayed by the display generation component of the computer system in response to detecting the initial hand grip configuration on the housing of the display generation component again (e.g., after the second view 7920 was displayed in response to detecting the required change in hand grip, as shown in FIG. 7L). In some embodiments, the third view 7821 reestablishes a pass-through portion in response to detection of another change in grip of the user's hand (e.g., change from the hand configuration in FIG. 7L, or from no hand grip, to the hand configuration in FIG. 7M) on the display generation component of the computer system. In some embodiments, the change in grip of the user's hand represents reestablishment of the user's hand grip on the housing of the display generation component and indicates that the user wants to exit the virtual immersive experience (e.g., partially or completely, gradually or immediately).

In some embodiments, the sensor system detects a change of a total number of hands detected on the housing of the display generation component (e.g., from one hand to two hands, or from no hands to two hands), an increased number of a total number of fingers in contact with the housing of the display generation component, a change from no hand contact to hand contact on the housing of the display generation component, a change in contact position (e.g., from finger(s) to palm), and/or a change in contact intensity on the housing of the display generation component. In some embodiments, the reestablishment of the user's hand grip causes a change of the position and/or orientation of the display generation component (e.g., a change in location and angle of the device 7100 relative to the environment in FIG. 7M part (A) compared to the angle in FIG. 7L part (A)). In some embodiments, the change in grip of the user's hand causes a change in the viewing perspective of user relative to physical environment 7800 (e.g., the viewing angle of device 7100 or one or more cameras of device 7100 relative to physical environment 7800 change). As a result, the viewing perspective of third view 7821 as displayed is changed accordingly (e.g., including changing the viewing perspective of the pass-through portion and/or virtual objects on the display).

In some embodiments, the pass-through portion in the third view 7821 is identical to the pass-through portion in first view 7820, or at least increased relative to the pass-through portion, if any, in the second view 7920. In some embodiments, the pass-through portion in third view 7821 shows a different viewing perspective of the physical object 7504 in physical environment 7800 compared to the pass-through portion in first view 7820. In some embodiments, the pass-through portion in third view 7821 is a see-through portion of the display generation component that is transparent or semi-transparent. In some embodiments, the pass-through portion in third view 7821 displays live feed from one or more cameras configured to capture image data of at least a portion of physical environment 7800. In some embodiments, there are no virtual content displayed with the pass-through portion in the third view 7821. In some embodiments, the virtual content is paused or made semi-transparent or less color saturated in the third view 7821 and displayed concurrently with the pass-through portion in the third view 7821. When the third view is displayed, the user can resume the fully immersive experience by changing the hand grip again, as described with respect to FIGS. 7K-7L.

FIGS. 7N-7P illustrate example views of a three-dimensional virtual environment that change in response to detection of changes in a user's position relative to an object (e.g., an obstacle, or a target) in a physical environment surrounding the user, in accordance with some embodiments. The input gestures described with regard to FIGS. 7N-7P are used to illustrate the processes described below, including the processes in FIG. 13.

In FIG. 7N part (A), the user 7802 is holding device 7100 in a physical environment 7800. The physical environment includes one or more physical surfaces and physical objects (e.g., walls, floors, physical object 7602). The device 7100 displays a virtual three-dimensional environment 7610, without displaying a pass-through portion showing the physical environment surrounding the user. In some embodiments, device 7100 represents and can be replaced by an HMD or other computer system that includes a display generation component that blocks the user's view of the physical environment when displaying the virtual environment 7610. In some embodiments, the HMD or display generation component of the computer system encloses at least the user's eyes, and the user's view of the physical environment is partially or completely blocked by the virtual content displayed by the display generation component and other physical barriers formed by the display generation component or its housing.

FIG. 7N part (B) illustrates a first view 7610 of a three-dimensional environment displayed by the display generation component (also referred to as "display") of the computer system (e.g., device 7100 or an HMD).

In some embodiments, first view 7610 is a three-dimensional virtual environment providing an immersive virtual experience (e.g., a three-dimensional movie or game). In some embodiments, first view 7610 includes three-dimensional virtual reality (VR) content. In some embodiments, the VR content includes one or more virtual objects that correspond to one or more physical objects in a physical environment that does not correspond to physical environment 7800 surrounding the user. For example, at least some of the virtual objects are displayed at locations in the virtual reality environment that correspond to locations of physical objects in a physical environment that is remote from the physical environment 7800. In some embodiments, the first view includes virtual user interface elements (e.g., a virtual dock including user interface objects, or a virtual menu), or other virtual objects that are unrelated to physical environment 7800.

In some embodiments, first view 7610 includes 100% virtual content (e.g., virtual objects 7612 and virtual surfaces 7614 (e.g., virtual walls and floors)) that does not include and is distinct from any representation of physical environment 7800 surrounding the user 7802. In some embodiments, the virtual content (e.g., virtual objects 7612 and virtual surfaces 7614) in first view 7610 does not correspond to or visually convey presence, locations, and/or physical structures of any physical object in physical environment 7800. In some embodiments, first view 7610 optionally includes a virtual representation that indicates presence and location of a first physical object in physical environment 7800, but does not visually convey presence, locations, and/or physical structures of a second physical object in physical environment 7800 that would both be within the field of view of the user if the user's view were not blocked by the display generation component. In other words, first view 7610 includes virtual content that replaces the display of at least some physical objects or portions thereof that would be present in the user's normal field of view (e.g., the field of view of the user without the display generation component placed in front of the user's eyes).

FIG. 7O illustrates another example view 7620 of the three-dimensional virtual environment (also referred to as "second view 7620 of the three-dimensional environment", "second view 7620 of the virtual environment," or "second view 7620) displayed by the display generation component of the computer system. In some embodiments, a sensor system detects that user 7802 moves toward a physical object 7602 in physical environment 7800 and sensor data obtained by the sensor system is analyzed to determine whether a distance between user 7802 and physical object 7602 is within a predefined threshold distance (e.g., within an arm's length, or a normal gait length of the user). In some embodiments, when it is determined that a part of physical object 7602 is within the threshold distance to user 7802, an appearance of the view of the virtual environment is changed to indicate a physical characteristic of a portion of physical object 7602 (e.g., showing a portion 7604 of the physical object 7602 in second view 7620 in FIG. 7O part (B) that is within the threshold distance from the user 7802, without showing other portions of the physical object 7602 that are also within the same field of view of the user as the portion 7604 but not within the threshold distance of the user). In some embodiments, instead of replacing a portion of the virtual content with a direct view or camera view of the portion 7604 of the physical object, the visual characteristics (e.g., opacity, color, texture, virtual material, etc.) of a portion of the virtual content at the location corresponding to the portion 7604 of the physical object is altered to indicate the physical characteristics (e.g., size, color, pattern, structure, outline, shape, surface, etc.) of the portion 7604 of the physical object. The change to the virtual content at the location corresponding to the portion 7604 of the physical object 7602 is not applied to other portions of the virtual content, including the portion of virtual content at locations corresponding to portions of the physical object 7602 that are outside of the portion 7604. In some embodiments, the computer system provides blending (e.g., smoothing the visual transitions) between the portion of virtual content at locations corresponding to the portion 7604 of the physical object and the portion of virtual content that is immediately outside the locations corresponding to the portion 7604 of the physical object.

In some embodiments, physical object 7602 is a static object in physical environment 7800, such as a wall, a chair, or a table. In some embodiments, physical object 7602 is a moving object in physical environment 7800, such as another person or a dog in physical environment 7800 that moves relative to user 7802 while user 7802 is static relative to physical environment 7800 (e.g., user's pet moves around while the user is sitting on the sofa watching a movie).

In some embodiments, while user 7802 is enjoying a three-dimensional immersive virtual experience (e.g., including panoramic three-dimensional displays with surround sound effects, and other virtual perceptional senses), and real-time analysis of sensor data from a sensor system coupled with the computer system indicates that user 7802 gets close enough to physical object 7602 (e.g., either by movement of the user toward the physical object, or movement of the physical object toward the user), user 7802 can benefit from receiving an alert that blends in with the virtual environment in a smooth and less disruptive way. This allows the user to make a more informed decision regarding whether to modify his/her movement and/or to cease/continue the immersive experience, without losing the immersive quality of the experience.

In some embodiments, second view 7620 is displayed when analysis of sensor data shows that user 7802 is within a threshold distance of at least a portion of physical object 7602 in physical environment 7800 (e.g., physical object 7602 has an extent that is potentially visible to the user based on a field of view of the user for the virtual environment). In some embodiments, the computer system requires that, given the location of a part of the physical object relative to the user in physical environment 7800, the part of the physical object would have been visible in the field of view of the user if the display had a pass-through portion or the display generation component were not present in front of the user's eyes.

In some embodiments, portion 7604 in second view 7620 of the virtual environment includes a translucent visual representation of the corresponding portion of physical object 7602. For example, the translucent representation overlays the virtual content. In some embodiments, portion 7604 in second view 7620 of the virtual environment includes a glassy appearance of the corresponding portion of physical object 7602. For example, as user 7802 gets closer to a table placed in the room while enjoying an immersive virtual experience, a portion of the table that is closest to the user is shown with a glossy, semi-transparent, see-through appearance overlaying the virtual content (e.g., a virtual ball or virtual meadow in the virtual view), and virtual content behind the portion of the table is visible through the portion of the glassy-looking table. In some embodiments, second view 7620 of the virtual environment shows a predefined distortion or other visual effects (e.g., a shimmering, rippling, glowing, darkening, blurring, swirling visual effect, or different textual effect) applied to portion 7604 that corresponds to the portion of physical object 7602 closest to user 7802.

In some embodiments, second view 7620 of the virtual environment replaces first view 7610 instantaneously as the user moves towards the corresponding portion of physical object 7602 and comes within the threshold distance thereof so as to provide a timely alert to the user. In some embodiments, second view 7620 of the virtual environment is gradually displayed, e.g., with fade-in/fade-out effect, to provide a smoother transition and less disruptive/intrusive user experience. In some embodiments, the computer system allows the user to navigate within the three-dimensional environment by moving in the physical environment, and changes the view of the three-dimensional environment presented to the user such that it reflects the computer-generated movement within the three-dimensional environment. For example, as shown in FIGS. 7N and 7O, when the user walks toward the physical object 7602, the user perceives his/her movement as moving in the same direction in the three-dimensional virtual environment toward the virtual object 7612 (e.g., seeing the virtual object 7612 getting closer and larger). In some embodiments, the virtual content presented to the user is unrelated to the user's movement in the physical environment, and not changed in accordance with the user's movement in the physical environment, except when the user has reached within a threshold distance of a physical object in the physical environment.

FIG. 7P illustrates yet another example view 7630 of the three-dimensional environment (also referred to as "third view 7630 of the three-dimensional environment," "third view 7630 of the virtual environment," or "third view 7630") displayed by the display generation component of the computer system (e.g., device 7100 or an HMD). In some embodiments, as user 7802 continues to move toward physical object 7602 in physical environment 7800 after display of second view 7620 of the virtual three-dimensional environment as discussed with reference to FIG. 7O, analysis of the sensor data shows that the distance between user 7802 and a portion 7606 of physical object 7602 are below the predefined threshold distance. In response, the display transitions from second view 7620 to third view 7630. In some embodiments, depending on the structure (e.g., size, shape, length, width, etc.) and relative location of the user and the physical object 7602, the portion 7606 and the portion 7604 of the physical object 7602 that were within the predefined threshold distance of the user when the user are at different locations in the physical environment 7800 is, optionally, completely distinct and non-overlapping portions of the physical object, the portion 7606 optionally completely encompass the portion 7604, the portion 7606 and the portion 7604 optionally only partially overlap, or the portion 7604 optionally completely encompass the portion

7606. In some embodiments, portions or entireties of one or more other physical object may be visually represented or cease to be represented in the currently displayed view of the virtual three-dimensional environment as the user moves around the room relative to those physical objects, depending on whether those physical objects are come within or outside the predefined threshold distance of the user.

In some embodiments, the computer system optionally allows the user to preselect a subset of physical objects in the physical environment 7800 for which the distance between the user and the preselected physical objects are monitored and for which the visual changes are applied to the virtual environment. For example, the user may wish to preselect furniture and pets as the subset of physical objects, and not select clothing, curtains, etc. as the subset of physical objects, and the visual change will not be applied to the virtual environment to alert the user for the presence of clothing and curtains even if the user walks into them. In some embodiments, the computer system allows the user to predesignate one or more physical objects that are always visually represented in the virtual environment by applying a visual effect (e.g., change in transparency, opacity, glow, index of refraction, etc.) to a portion of the virtual environment that corresponds to respective locations of the physical objects, irrespective of whether the user is within the threshold distance of the physical objects. These visual indications help the user orient him/herself relative to the real world, even as he/she is immersed in the virtual world, and feel more secure and steady when exploring the virtual world.

In some embodiments, as shown in FIG. 7P, third view 7630 includes a rendering of the portion 7606 of the physical object 7602 that is within the threshold distance from the user, as the user moved closer to the physical object. In some embodiments, the computer system optionally further increases value of the display property of the visual effect that is applied to the portion of the virtual environment that indicates the physical characteristic of the corresponding portion of physical object 7602, in accordance with the reduced distance between the user and the portion of the physical object. For example, the computer system optionally increases an index of refraction, a color saturation, a visual effect, an opacity, and/or a clarity of the portion of the virtual environment that corresponds to the portion of the physical object in third view 7630, as the user gradually moves closer to the portion of the physical object. In some embodiments, the spatial extent of the visual effect increases as user 7802 moves closer to physical object 7602, and the corresponding portion of physical object 7602 appears bigger in the user's field of view for the virtual environment. For example, portion 7606 in third view 7630 appears to gradually increase its size and extend out from virtual object 7612 and toward the user's direction compared to portion 7604 in second view 7620 as user 7802 moves closer to physical object 7602 in physical environment 7800 for at least two reasons: (1) more of the physical object 7602 are within the predefined distance of the user, and (2) the same portion of the physical object 7602 (e.g., portion 7604) occupies a larger portion of the user's field of view of the virtual environment because it is closer to the user's eyes.

In some embodiments, the computer system defines a gesture input (e.g., the user raising one or both arms to a preset level relative to the user's body within a threshold amount of time (e.g., an abrupt and sudden movement that is a muscle reflex for preventing falling or bumping into something)) that causes portions (e.g., all portions potentially visible within the user's field of view of the virtual environment) of a physical object that is partially within the threshold distance of the user, or all physical objects potentially visible in the user's field of view of the virtual environment, to be visually represented in the virtual environment by modifying a display property of the virtual environment at locations that corresponding to those portions of the physical object or all physical objects. This feature helps to allow the user to quickly reorient himself/herself when he/she feels insure about his/her body position in the physical environment, without completely exiting the immersive experience.

Additional descriptions regarding FIGS. 7A-7P are provided below in references to methods 8000, 9000, 10000, 11000, 12000, and 13000 described with respect to FIGS. 8-13 below.

FIG. 8 is a flowchart of an exemplary method 8000 for interacting with a three-dimensional environment using predefined input gestures, in accordance with some embodiments. In some embodiments, the method 8000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 8000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 8000 are, optionally, combined and/or the order of some operations is, optionally, changed.

In the method 8000, the computer system displays (8002) a view of a three-dimensional environment (e.g., a virtual or mixed reality environment). While displaying the view of the three-dimensional environment, the computer system detects (8004) movement of a user's thumb over the user's index finger of a first hand of the user (e.g., the left hand or the right hand that is ungloved or that is not covered with or attached to an input device/surface) using the one or more cameras (e.g., using one or more cameras positioned on the lower-edge of the HMD, as opposed to using a touch-sensitive glove, or a touch-sensitive surface on an hand-controlled input device, or other non-image-based means (e.g., acoustic waves, etc.)). This is illustrated in FIG. 7A and accompanying descriptions (e.g., thumb tap, thumb swipe, and thumb flick gestures), for example. In some embodiments, the user's hand or a graphical representation thereof is displayed in the view of the three-dimensional environment (e.g., in a pass-through portion of the display generation component or as part of the augmented reality view of the physical environment surrounding the user). In some embodiments, the user's hand or a graphical representation thereof is not shown in the view of the three-dimensional environment or displayed in a portion of the display that is outside of the view of the three-dimensional environment (e.g., in a separate or floating window). The benefit of using one or more cameras, especially cameras that are part of the HMD, includes that the spatial location and size of the user's hand as seen by the user as how they are naturally in the physical environment or virtual environment that he/she is interacting with, and the user is given an intuitive sense of scale, orientation, and anchor location to perceive the three-dimensional environment on display, without the extra computation needed to match the space of the input device to the three-dimensional environment and/ or to otherwise scale, rotate, and translate the representation of the user's hand before placing it in the displayed three-dimensional environment. Referring back to FIG. 8, in response to detecting the movement of the user's thumb over the user's index finger (e.g., as opposed to more exaggerated gestures using finger(s) or hand waving in the air or sliding on a touch-sensitive surface) using the one or more cameras (8006): in accordance with a determination that the movement is a swipe of the thumb over the index finger of the first hand in a first direction (e.g., movement along a first axis (e.g., x-axis) of an x-axis and a y-axis, where movement along the x-axis is movement along the length of the index finger, and movement along the y-axis is movement in a direction that is across the index finger (substantially perpendicular to movement along the length of the index finger), the computer system performs a first operation (e.g., changing a selected user interface object in a displayed user interface (e.g., iterating the selection of item in a first direction through a list of items (in left and right in a row of items) corresponding to the first direction), adjusting a location of a user interface object in a displayed user interface (e.g., moving the object in a direction in the user interface (e.g., leftward and rightward) corresponding to the first direction), and/or adjusting a system setting of a device (e.g., adjust volume, move to a subsequent list item, move to a previous list item, skip forward (e.g., fast forward and/or advance to next chapter, audio track, and/or content item), skip backward (e.g., rewind and/or move to prior chapter, audio track, and/or content item). In some embodiments, swiping in a first sub-direction (e.g., toward tip of index finger) of the first direction (e.g., along the length of the index finger) corresponds to performing the first operation in one manner, and swiping in the second sub-direction (e.g., toward the base of the index finger) of the first direction corresponds to performing the first operation in another manner. This is illustrated in FIGS. 7B and 7C, and 7F, and accompanying descriptions, for example. Referring back to FIG. 8, in response to detecting the movement of the user's thumb over the user's index finger (e.g., as opposed to more exaggerated gestures using finger(s) or hand waving in the air or sliding on a touch-sensitive surface) using the one or more cameras (8006): in accordance with a determination that the movement is a tap of the thumb (including touch-down and lift-off of the thumb on the index finger within a threshold amount of time) over the index finger at a first location on the index finger (e.g., at a first portion of the index finger, such as the distal phalanx, the middle phalanx, and/or the proximal phalanx) of the first hand, the computer system performs a second operation that is different from the first operation (e.g., performing an operation corresponding to a currently selected user interface object and/or changing a selected user interface object in a displayed user interface). In some embodiments, performing the first/second operation includes changing the view of the three-dimensional user interface, and the change depends on the current operating context. In other words, each gesture triggers different operations and correspondingly changes in the view of the three dimensional environment in a respective manner, depending on the current operating context (e.g., what object the user's is looking at, which way the user is facing, the last function that is performed immediately prior to the current gesture, and/or what object is currently selected). This is illustrated in FIGS. 7B and 7C, and 7F, and accompanying descriptions, for example.

In some embodiments, in response to detecting the movement of the user's thumb over the user's index finger using the one or more cameras, in accordance with a determination that the movement is a swipe of the thumb over the index finger of the first hand in a second direction that is substantially perpendicular to the first direction (e.g., movement along a second axis (e.g., y-axis) of the x-axis and the y-axis, where movement along the x-axis is movement along the length of the index finger, and movement along the y-axis is movement in a direction that is across the index finger (substantially perpendicular to movement along the length of the index finger), the computer system performs a third operation that is different from the first operation and different from the second operation (e.g., changing a selected user interface object in a displayed user interface (e.g., iterating the selection in a second direction in a list of items (e.g., up and down multiple rows of items in a 2D menu, or up and down a vertically arranged list) corresponding to the second direction), adjusting a location of a user interface object in a displayed user interface (e.g., moving the object in a direction in the user interface (e.g., upward and downward) corresponding to the second direction), and/or adjusting a system setting of a device (e.g., volume)). In some embodiments, the third operation is distinct from the first operation and/or the second operation. In some embodiments, swiping in a first sub-direction (e.g., around the index finger away from the palm) of the second direction (e.g., around the index finger) corresponds to performing the third operation in one manner, and swiping in the second sub-direction (e.g., around the index finger toward the palm) of the second direction corresponds to performing the third operation in another manner.

In some embodiments, in response to detecting the movement of the user's thumb over the user's index finger using the one or more cameras, in accordance with a determination that the movement is a movement of the thumb over the index finger in a third direction that is different from the first direction (and the second direction)(and that is not a tap of the thumb over the index finger), the computer system performs a fourth operation that is different from the first operation and is different from the second operation (and is different from the third operation). In some embodiments, the third direction is an upward direction from the index finger away from the index finger (e.g., opposite of tapping on the side of the index finger), and the gesture is a flick of the thumb from the side of the index finger away from the index finger and the palm. In some embodiments, this upward flick gesture across the middle of the index finger using the thumb causes a currently selected user interface object to be pushed into the three-dimensional environment and initiates an immersive experience (e.g., a 3D movie, or 3D virtual experience, panorama display mode, full-screen mode, etc.) corresponding to the currently selected user interface object (e.g., a movie icon, an app icon, an image, etc.). In some embodiments, swiping downward across the middle of the index finger toward the palm (e.g., a movement in one of the sub-directions of the second direction, as opposed to tapping on the middle of the index finger) while an immersive experience is ongoing, causes the immersive experience to be paused, stopped, and/or reduced to a reduced-immersion state (e.g., non-full-screen, 2D mode, etc.).

In some embodiments, performing the first operation includes: increasing a value corresponding to the first operation (e.g., a value of a system setting, a value indicating a position and/or selection of at least a portion of a user interface (e.g., a user interface object), and/or a value corresponding to selected content or a portion of content. For example, increasing the value includes increasing volume, moving an object in an increasing direction (e.g., upward and/or rightward), and/or adjusting a position (e.g., in a list and/or content item) to a subsequent or otherwise advanced position) in accordance with a determination that the swipe of the thumb over the index finger in the first direction (e.g., a direction along the length of the index finger, or a direction around the index finger) moves toward a first predefined portion of the index finger (e.g., toward the tip of the index finger, or toward the back side of the index finger). In some embodiments, performing the first operation further includes: decreasing the value corresponding to the first operation (e.g., decreasing the value includes decreasing volume, moving an object in a decreasing direction (e.g., downward and/or leftward), and/or adjusting a position (e.g., in a list and/or content item) to a previous or otherwise prior position) in accordance with a determination that the swipe of the thumb over the index finger in the first direction (e.g., a direction along the length of the index finger, or a direction around the index finger) moves away from the first predefined portion of the index finger (e.g., away from the tip of the index finger, or away from the back side (on the back side of the hand) of the index finger), toward a second predefined portion of the index finger (e.g., toward the base of the index finger, or toward the front side (on the palm side of the hand) of the index finger). In some embodiments, the direction of swipe of the thumb over the index finger in the second direction also determines the direction of the third operation in a manner similar to how the direction of swipe in the first direction determines the direction of the first operation.

In some embodiments, performing the first operation includes adjusting a value corresponding to the first operation (e.g., a value of a system setting, a value indicating a position and/or selection of at least a portion of a user interface (e.g., a user interface object), and/or a value corresponding to selected content or a portion of content) by an amount that corresponds to the amount of movement of the thumb over the index finger. In some embodiments, the movement of the thumb is measured against threshold positions on the index finger, and value corresponding to the first operation is adjusted between multiple discrete levels in accordance with which threshold position is reached. In some embodiments, the movement of the thumb is measured continuously, and the value corresponding to the first operation is adjusted continuously and dynamically based on the current location of the thumb on (e.g., along or around) the index finger. In some embodiments, the speed of the movement of the thumb is used to determine the magnitude of the operation, and/or the threshold that is used to determine when the different discrete values of the operation is triggered.

In some embodiments, in response to detecting the movement of the user's thumb over the user's index finger using the one or more cameras, in accordance with a determination that the movement is a tap of the thumb over the index finger at a second location (e.g., at a portion and/or phalanx of the index finger), distinct from the first location, on the index finger, the computer system performs a fifth operation that is different from the second operation (e.g., performing an operation corresponding to a currently selected user interface object and/or changing a selected user interface object in a displayed user interface). In some embodiments, the fifth operation is distinct from the first operation, the third operation and/or the fourth operation. In some embodiments, tapping the middle portion of the index finger activates a currently selected object, and tapping on the tip of the index finger minimizes/pauses/closes a currently active application or experience. In some embodiments, detecting the tap of the thumb over the index finger does not require detecting lift-off of the thumb from the index finger, and while the thumb remains on the index finger, movement of the thumb or the entire hand can be treated as movement combined with a tap-hold input of the thumb, e.g., for dragging an object.

In some embodiments, the computer system detects a swipe of the user's thumb over the user's middle finger using the one or more cameras (e.g., while detecting the user's index finger extended away from the middle finger). In response to detecting the swipe of the user's thumb over the user's middle finger, the computer system performs a sixth operation. In some embodiments, the sixth operation is different from the first operation, the second operation, the third operation, the fourth operation and/or the fifth operation. In some embodiments, the swipe of the user's thumb over the middle finger includes movement of the thumb along the length of the middle finger (e.g., from the base toward the tip of the middle finger, or vice versa) and one or more different operations are performed in accordance with a determination that the swipe of the user's thumb over the middle finger includes movement of the thumb along the length of the middle finger from the tip toward the base of the middle finger and/or movement across the middle finger from the palm-side of the middle finger to the top of the middle finger.

In some embodiments, the computer system detects a tap of the user's thumb over the user's middle finger using the one or more cameras (e.g., while detecting the user's index finger extended away from the middle finger). In response to detecting the tap of the user's thumb over the user's middle finger, the computer system performs a seventh operation. In some embodiments, the seventh operation is different from the first operation, the second operation, the third operation, the fourth operation, the fifth operation and/or the sixth operation. In some embodiments, the tap of the user's thumb over the middle finger is at a first position on the middle finger and a different operation is performed in accordance with a determination that the tap of the user's thumb over the middle finger is at a second position, distinct from the first position on the middle finger. In some embodiments, an upward flick from the first and/or second locations on the middle finger causes the device to perform other operations that are distinct from the first, second, . . . and/or seventh operations.

In some embodiments, the computer system displays a visual indication of an operating context (e.g., displaying a menu of selectable options, a dial for adjusting a value, an avatar of a digital assistant, selection indicator of a currently selected object, highlighting of an interactive object, etc.) of thumb gestures (e.g., thumb swiping/tapping/flicking on other fingers of the hand) in the three-dimensional environment (e.g., displaying a plurality of user interface objects in the three-dimensional environment when the device detects the user's hand in or enter a predefined ready state (e.g., thumb resting on the side of the index finger, or hovering over the side of the index finger, and/or flick of the wrist with the back of the thumb facing upward/resting on the side of the index finger) using the one or more cameras, and/or the thumb side of the hand is facing upward toward the cameras), where the user interface objects are responsive to the swipe and tap gestures of the thumb on other fingers of the hand), where performing the first operation (or the second, third, etc. operations) includes: displaying a visual change in the three-dimensional environment that corresponds to performance of the first operation (or the second, third, etc. operation)) (e.g., displaying the visual change includes activation of a respective user interface object of the plurality of user interface objects and causing an operation associated with the respective user interface object to be performed).

In some embodiments, while displaying the visual indication of the operation context of thumb gestures (e.g., while displaying the plurality of user interface objects in the three-dimensional environment in response to detecting the user's hand is in the predefined ready state), the computer system detects movement of the first hand (e.g., the movement of the entire hand in the physical environment relative to the cameras, as opposed to internal movement of the fingers relative to one another) (e.g., detecting the movement of the hand while the hand remains in the ready state) of the user using the one or more cameras (e.g., detecting movement and/or rotation of the hand/wrist in the three-dimensional environment). In response to detecting the movement of the first hand, the computer system changes the displayed location of the visual indication of the operation context of thumb gestures (e.g., the plurality of user interface objects) in the three-dimensional environment in accordance with the detected change in position of the hand (e.g., to maintain display of the plurality of user interface objects within a predefined distance of the hand (e.g., the menu of objects are stuck to the tip of the thumb) during the movement of the hand). In some embodiments, the visual indication is a system affordance (e.g., an indicator for an application launching user interface or dock). In some embodiments, the visual indication is a dock that include a plurality of application launch icons. In some embodiments, the dock changes as the configuration of hand changes (e.g., position of thumb, position of index/middle fingers). In some embodiments, the visual indication disappears when the hand is moved out of micro-gesture orientation (e.g., thumb up with hand below shoulders). In some embodiments, the visual indication reappears when the hand is moved into the micro-gesture orientation. In some embodiments, the visual indication appears in response to a gesture (e.g., swipe up of the thumb on the index finger while the user is looking at the hand). In some embodiments, the visual indication resets (e.g., disappears) after a time threshold (e.g., 8 seconds) of inactivity of the hand. More details are described with respect to FIGS. 7D-7F and 9, and accompanying descriptions, for example.

In some embodiments, the computer system detects movement of a user's thumb over the user's index finger of a second hand of the user (e.g., distinct from the first hand) using the one or more cameras (e.g., while detecting the movement of the user's thumb over the user's index finger of the first hand (e.g., in a two-handed gesture scenario); or while not detecting the movement of the user's thumb over the user's index finger of the first hand (e.g., in a one-handed gesture scenario)). In response to detecting the movement of the user's thumb over the user's index finger of the second hand using the one or more cameras: in accordance with a determination that the movement is a swipe of the thumb over the index finger of the second hand in the first direction (e.g., along the length of the index finger, or around the index finger, or upward away from the side of the index finger), the computer system performs an eighth operation that is different from the first operation; and in accordance with a determination that the movement is a tap of the thumb over the index finger of the second hand at the first location (e.g., at a first portion of the index finger, such as the distal phalanx, the middle phalanx, and/or the proximal phalanx) on the index finger of the second hand, the computer system performs a ninth operation that is different from the second operation (and the eighth operation). In some embodiments, the eighth and/or ninth operation is distinct from the first operation, the second operation, the third operation, the fourth operation, the fifth operation, the sixth operation, and/or the seventh operation. In some embodiments, if both hands are used to perform a two-handed gesture, the movement of the thumb on both hands are treated as concurrent inputs and used together to determine what functions are triggered. For example, if the thumb moves away from the tip of the index finger toward the base of the index finger on both hands (and the hands are facing each other), the device expands a currently selected object, and if the thumb moves toward the tip of the index finger from the base of the index finger on both hands (and the hands are facing each other), the device minimizes a currently selected object. In some embodiments, if the thumb taps down on the index finger on both hands simultaneously, the device activates a currently selected object in a first manner (e.g., starts video recording using a camera app), and if the thumb taps down on the index finger on the left hand, the device activates the currently selected object in a second manner (e.g., performs autofocus using the camera app), and if the thumb taps down on the index finger on the right hand, the device activates the currently selected object in a third manner (e.g., taps a snapshot using the camera app).

In some embodiments, in response to detecting the movement of the user's thumb over the user's index finger (e.g., as opposed to more exaggerated gestures using finger(s) or hand waving in the air or sliding on a touch-sensitive surface) using the one or more cameras, and in accordance with the determination that the movement includes is a touch-down of the thumb on the index finger of the first hand followed by a wrist flick gesture of the first hand (e.g., an upward movement of the first hand relative to the wrist of the first hand), the computer system performs a tenth operation that is different from the first operation (e.g., different from each of or a subset of the first through the ninth operations that correspond to other types of movement patterns of the user's fingers) (e.g., providing an input to operate a selected user interface object, providing an input to select an object (e.g., a virtual object that is selected and/or held by the user), and/or providing an input to discard an object). In some embodiments, while the device detects that the user's gaze is directed to a selectable object (e.g., a photo file icon, a movie file icon, a notification banner, etc.) in the three-dimensional environment, the device detects the touch-down of the user's thumb on the index finger followed by the upward wrist flick gesture, the device launches the experience corresponds to the object (e.g., opens a photo in the air, starts a 3D movie, opens an expanded notification, etc.).

In some embodiments, in response to detecting the movement of the user's thumb over the user's index finger (e.g., as opposed to more exaggerated gestures using finger(s) or hand waving in the air or sliding on a touch-sensitive surface) using the one or more cameras, and in accordance with the determination that the movement includes is a touch-down of the thumb on the index finger of the first hand followed by a hand rotation gesture of the first hand (e.g., a rotation of at least a portion of the first hand relative to the wrist of the first hand), the computer system performs an eleventh operation that is different from the first operation (e.g., different from each of or a subset of the first through the tenth operations that correspond to other types of movement patterns of the user's fingers) (e.g., adjusting a value by an amount that corresponds to the amount of rotation of the hand). For example, the eleventh operation causes a virtual object (e.g., that is selected and/or held by the user (e.g., using gaze)) or a user interface object (e.g., a virtual dial control) to rotate in accordance with the hand rotation gesture.

In some embodiments, while displaying the view of the three-dimensional environment, the computer system detects movement of a palm of the first hand of the user toward the face of the user. in accordance with a determination that the movement of the palm of the first hand of the user toward the face of the user meets invocation criteria, the computer system performs a twelfth operation that is different from the first operation (e.g., different from each of or a subset of the first through the eleventh operations that correspond to other types of movement patterns of the user's fingers) (e.g., displaying a user interface object associated with a virtual assistant and/or displaying, at a location that corresponds to the palm of the first hand an image (e.g., a virtual representation of the user, a camera view of the user, a magnified view of the three-dimensional environment, and/or a magnified view of an object (e.g., a virtual object and/or a real object in the three-dimensional environment))). In some embodiments, the invocation criteria include a criterion that is met in accordance with a determination that a distance between the palm of the user and the face of the user decreases below a threshold distance. In some embodiments, the invocation criteria include a criterion that is met in accordance with a determination that the fingers of the hand are extended.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 10000, 11000, 12000, and 13000) are also applicable in an analogous manner to method 8000 described above with respect to FIG. 8. For example, the gestures, gaze inputs, physical objects, user interface objects, and/or animations described above with reference to method 8000 optionally have one or more of the characteristics of the gestures, gaze inputs, physical objects, user interface objects, and/or animations described herein with reference to other methods described herein (e.g., methods 9000, 10000, 11000, 12000, and 13000). For brevity, these details are not repeated here.

FIG. 9 is a flowchart of an exemplary method 9000 for interacting with a three-dimensional environment using predefined input gestures, in accordance with some embodiments. In some embodiments, the method 9000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 9000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 9000 are, optionally, combined and/or the order of some operations is, optionally, changed.

In the method 9000, the computer system displays (9002) a view of a three-dimensional environment (e.g., a virtual environment, or an augmented reality environment). While displaying the three-dimensional environment, the computer system detects a hand at a first position that corresponds to a portion of the three-dimensional environment (e.g., detecting the hand in a position of the physical environment that makes the hand visible to the user according to the user's current field of view of the three-dimensional environment (e.g., the user's hand has moved to a location that intersect with or near the user's line of sight)). In some embodiments, a representation or an image of the user's hand is displayed in the portion of the three-dimensional environment, in response to detecting the hand at the first position in the physical environment. In response to detecting the hand at the first position that corresponds to the portion of the three-dimensional environment (9004): in accordance with a determination that the hand is being held in a first predefined configuration (e.g., a predefined ready state, such as detecting thumb resting on index finger using a camera or a touch-sensitive glove or touch-sensitive finger attachments), displaying (e.g., in proximity to the representation of the hand displayed in the portion of the three-dimensional environment) a visual indication of a first operation context for gesture input using hand gestures (e.g., a visual indication such as a system affordance (e.g., system affordance 7214 in FIGS. 7E, 7F, and 7G), a dock, a menu, an avatar for a voice-based virtual assistant, displaying additional information about user interface elements in the three-dimensional environment that can be manipulated in response to hand gesture input etc.) in the three-dimensional environment; and in accordance with a determination that the hand is not being held in the first predefined configuration, forgoing display of the visual indication of the first operation context for gesture input using hand gestures in the three-dimensional environment (e.g., displaying the representation of the hand at the portion of the three-dimensional environment without displaying the visual indication in proximity to the representation of the hand, as shown in FIG. 7D).

In some embodiments, the visual indication of the first operation context for gesture input using hand gestures is displayed at a location in the portion of the three-dimensional environment that corresponds to the first position (e.g., the detected hand position). For example, the visual indication (e.g., the home affordance or dock, etc.) is displayed at a position that is at and/or within a predefined distance of the detected hand position. In some embodiments, the visual indication is displayed at a position that corresponds to a particular portion of the hand (e.g., above an upper portion of the detected hand, below a lower portion of the detected hand, and/or overlaid on the hand).

In some embodiments, while displaying the visual indication in the portion of the three-dimensional environment, the computer system detects a change in position of the hand from the first position to a second position (e.g., detecting movement and/or rotation of the hand (e.g., while the hand is in the first predefined configuration or some other predefined configuration that is also indicative of a ready state of the hand) in the three-dimensional environment). In response to detecting the change in position of the hand from the first position to the second position, the computer system changes the displayed location of the visual indication in accordance with the detected change in position of the hand (e.g., to maintain display of the visual indication within the predefined distance of the hand in the three-dimensional environment).

In some embodiments, the visual indication includes one or more user interface objects. In some embodiments, visual indicator is a system affordance icon (e.g., system affordance 7120 in FIG. 7E) that indicates a region from which one or more user interface objects may be displayed and/or accessed. For example, as shown in FIG. 7F part (A), as the thumb of hand 7200 moves across the index finger in the direction 7120, display of visual indicator 7214 is replaced by display of a set of user interface objects 7170. In some embodiments, presence of the system affordance icon near the user's hand indicates that the next gesture provided by the hand will cause a system-level operation (e.g., a non-object or application specific operation, e.g. an operation performed by the operating system independent of an application) to be performed, and absence of the system affordance near the user's hand indicates that the next gesture provided by the hand will cause an application or object-specific operation (e.g., operation specific to or within a currently selected object or application, e.g., performed by the application) to be performed. In some embodiments, the device displays the system affordance near the hand in accordance with a determination that the user's gaze is directed to the hand in the ready state.

In some embodiments, the one or more user interface objects include a plurality of application launch icons (e.g., the one or more user interface objects is a dock including a row of application launch icons for a plurality of frequently used applications or experiences), wherein activation of a respective one of the application launch icons causes an operation associated with a corresponding application to be performed (e.g., causing the corresponding application to be launched).

In some embodiments, while displaying the visual indication, the computer system detects a change in a configuration of the hand from the first predefined configuration to a second predefined configuration (e.g., detecting a change in a position of a thumb (e.g., relative to another finger, such as movement across another finger). In response to detecting the change in the configuration of the detected hand from the first predefined configuration to the second predefined configuration, the computer system displays (e.g., in addition to the visual indication and/or replacing display of the visual indication) a first collection of user interface objects (e.g., a home region or application launching user interface), wherein activation of a respective user interface object of the first collection of user interface objects causes an operation associated with the respective user interface object to be performed. In some embodiments, the visual indicator is a system affordance icon (e.g., system affordance 7214 in FIGS. 7E and 7F) that indicates a region from which the home region or application launching user interface may be displayed and/or accessed. For example, as shown in FIG. 7F part (A), as the thumb of hand 7200 moves across the index finger in the direction 7120, display of visual indicator 7214 is replaced by display of a set of user interface objects 7170. In some embodiments, at least some of the user interface objects of the first collection of user interface objects application launch icons, wherein activation of the application launch icon causes a corresponding application to be launched.

In some embodiments, while displaying the visual indication, the computer system determines, during a time window (e.g., a time window of 5 seconds, eight seconds, fifteen seconds, etc., from the time at which the visual indication was displayed in response to detecting the hand in the ready state at the first position) whether movement of the hand meets interaction criteria (e.g., the interaction criteria are met in accordance with a determination that at least one finger and/or thumb of the hand moves by a distance that increases above a threshold distance and/or moves in accordance with a predefined gesture). In accordance with the determination that movement of the hand does not meet the interaction criteria during the time window, the computer system ceases to display the visual indication. In some embodiments, the device redisplays the visual indication when the hand is detected again in the first predefined configuration in the field of view of the user, after either the user's hand exits the field of view of the user or the user's hand changes to another configuration that is not the first or other predefined configuration that correspond to the ready state of the hand.

In some embodiments, while displaying visual indication, the computer system detects a change in the hand configuration from the first predefined configuration to a second predefined configuration that meets input criteria (e.g., the configuration of the hand has changed but the hand is still in the field of view of the user. For example, the detected change is a change in a position of a thumb (e.g., relative to another finger, such as contact with and/or release of contact from another finger, movement along the length of another finger and/or movement across another finger) and/or a change in a position of an index and/or middle finger of the hand (e.g., extension of a finger and/or other movement of the finger relative to the hand)). In response to detecting the change in the hand configuration from the first predefined configuration to the second configuration that meets input criteria (e.g., in accordance with a determination that the user's hand changes from a configuration that is the starting state of a first accepted gesture to the starting state of a second accepted gesture), the computer system adjusts the visual indication (e.g., adjusting a selected respective user interface object of the set of one or more user interface objects from a first respective user interface object to a second respective user interface object; changing a displayed location of the one or more user interface objects; and/or displaying and/or ceasing to display a respective user interface object of the one or more user interface objects).

In some embodiments, while displaying the visual indication, the computer system detects a change in the hand configuration from the first predefined configuration to a third configuration that does not meet the input criteria (e.g., the configuration does not meet the input criteria in accordance with a determination that the at least a portion of the hand is outside of the user's field of view). In some embodiments, the device determines that the third configuration does not meet the input criteria in accordance with a determination that the user's hand changes from a configuration that is the starting state of a first accepted gesture to a state that does not correspond to the starting state of any accepted gestures. In response to detecting the change in the configuration of the detected hand from the first predefined configuration to the third configuration that does not meet the input criteria, the computer system ceases to display the visual indication.

In some embodiments, after ceasing to display the visual indication, the computer system detects a change in the hand configuration to the first predefined configuration (and that the hand is in the field of view of the user). In response to detecting the change in the configuration of the detected hand to the first predefined configuration, the computer system redisplays the visual indication.

In some embodiments, in response to detecting the hand at the first position that corresponds to the portion of the three-dimensional environment, in accordance with a determination that the hand is not being held in the first predefined configuration, the computer system performs an operation distinct from displaying the visual indication of the first operation context for gesture input using hand gestures (e.g., displaying a representation of the hand without the visual indication and/or provide a prompt to indicate that the hand is not being held in the first predefined configuration).

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 10000, 11000, 12000, and 13000) are also applicable in an analogous manner to method 9000 described above with respect to FIG. 9. For example, the gestures, gaze inputs, physical objects, user interface objects, and/or animations described above with reference to method 9000 optionally have one or more of the characteristics of the gestures, gaze inputs, physical objects, user interface objects, and/or animations described herein with reference to other methods described herein (e.g., methods 8000, 10000, 11000, 12000, and 13000). For brevity, these details are not repeated here.

FIG. 10 is a flowchart of an exemplary method 10000 for interacting with a three-dimensional environment using predefined input gestures, in accordance with some embodiments. In some embodiments, the method 10000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 10000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 10000 are, optionally, combined and/or the order of some operations is, optionally, changed.

In the method 10000, the computer system displays (10002) a three-dimensional environment (e.g., an augmented reality environment), including displaying a representation of a physical environment (e.g., displaying a camera view of the physical environment surrounding the user, or including a pass-through portion in displayed a user interface or virtual environment that reveals the physical environment surrounding the user). While displaying the representation of the physical environment, the computer system detects (10004) (e.g., using a camera or one or more motion sensors) a gesture (e.g., a gesture involving a predefined movement of the user's hand, finger, wrist, or arm, or a predefined stationary posture of the hand that is distinct from a natural resting posture of the hand). In response to detecting the gesture (10006): in accordance with a determination that a user's gaze is directed to a location (e.g., in the three-dimensional environment) that corresponds to a predefined physical location (e.g., a hand of the user) in the physical environment (e.g., in accordance with a determination that the gaze is directed to and remains at the location during the time when the gesture is initiated and completed, or in accordance with a determination that the gaze is directed to the hand while the hand is in a final state of the gesture (e.g., the ready state of the hand (e.g., the predefined stationary posture of the hand)), the computer system displays a system user interface (e.g., user interface including visual indications and/or selectable options for interaction options available for the three-dimensional environment, and the user interface is displayed in response to the gesture and was not displayed prior to the detection of the gesture (e.g., when the gaze was directed to the)) in the three-dimensional environment. This is illustrated in FIG. 7G parts A-1, A-2, and A-3, for example, where the input gestures by hand 7200 causes interactions with the system user interface elements such as system affordance 7214, system menu 7170, and application icon 7190, etc. In some embodiments, the location that corresponds to the predefined physical location is a representation (e.g., video image or a graphical abstraction), in the three-dimensional environment, of the predefined physical location (e.g., a hand of the user that is moveable within the physical environment, or a physical object that is stationary in the physical environment). In some embodiments, the system user interface includes one or more application icons (e.g., of which a respective application icon, when activated, launches a respective corresponding application). In response to detecting the gesture (10006): in accordance with a determination that the user's gaze is not directed to the location (e.g., in the three-dimensional environment) that corresponds to the predefined physical location in the physical environment (e.g., in accordance with a determination that the gaze is directed to and/or remains at another location or no gaze is detected at the location during the time when the gesture is initiated and completed, or in accordance with a determination that the gaze is not directed to the hand while the hand is in a final state of the gesture (e.g., the ready state of the hand (e.g., the predefined stationary posture of the hand)), performing an operation in a current context of the three-dimensional environment without displaying the system user interface. This is illustrated in FIG. 7G, parts B-1, B-2, and B-3, for example. In some embodiments, the operation includes a first operation that changes the state of the electronic device (e.g., changes the output volume of the device) that does not produce a visual change in the three-dimensional environment. In some embodiments, the operation includes a second operation that displays the hand making the gesture and does not cause further interaction with the three-dimensional environment. In some embodiments, the operation includes an operation to change the state of a virtual object that the gaze is currently directed to. In some embodiments, the operation includes an operation that changes the state of the virtual object that the user has last interacted with in the three-dimensional environment. In some embodiments, the operation includes an operation that changes the state of the virtual object that is currently selected and has input focus.

In some embodiments, the computer system displays a system affordance (e.g., a home affordance that indicates the device is ready to detect one or more system gestures for display a user interface for system-level (as opposed to application-level) operations) at a predefined location relative to the location that corresponds to the predefined physical location. In some embodiments, the location that corresponds to the predefined physical location is a location in the three-dimensional environment. In some embodiments, the location that corresponds to the predefined physical location is a location on the display. In some embodiments, the system affordance remains displayed even though the location that corresponds to the predefined physical location is no longer visible in the displayed portion of the three-dimensional environment (e.g., the system affordance continues to be displayed even though the predefined physical location moves out of the field of view of one or more cameras of the electronic device), as long as the predefined location of the system affordance is a location in the displayed three-dimensional environment. In some embodiments, the system affordance is displayed at a predefined fixed location relative to a user's hand, wrist or finger, or relative to a representation of the user's hand, wrist, or finger in the three-dimensional environment (e.g., superimposed on or replaces display of a portion of the user's hand, wrist, or finger, or at a fixed location offset from the user's hand, wrist, or finger). In some embodiments, the system affordance is displayed at the predefined location relative to the location that corresponds to the predefined physical location without regard to whether the user's gaze remains directed to the location in the three-dimensional environment (e.g., system affordance remains displayed within a predefined timeout period, even after the user's gaze has moved away from the user's hand in the ready state or after the gesture is completed).

In some embodiments, displaying the system affordance at the predefined location relative to the location that corresponds to the predefined physical location includes: detecting movement of the location that corresponds to the predefined physical location in the three-dimensional environment (e.g., detecting that the location of the user's hand shown in the three-dimensional environment has changed as a movement of the user's head or hand); and in response to detecting movement of the location that corresponds to the predefined physical location in the three-dimensional environment, moving the system affordance in the three-dimensional environment such that a relative position of the system affordance and the location that corresponds to the predefined physical location remain unchanged in the three-dimensional environment (e.g., when the location of the user's hand changes in the three-dimensional environment, the system affordance follows the location of the user's hand (e.g., the system affordance is displayed at a location corresponding to the top of the user's thumb in the displayed view of the three-dimensional environment)).

In some embodiments, the system affordance is displayed at the predefined location relative to the location that corresponds to the predefined physical location (e.g., sometimes called "predefined relative location") in accordance with a determination that the user's gaze is directed to the location that corresponds to the predefined physical location. In some embodiments, the system affordance is displayed at the predefined relative location in accordance with a determination that the user's gaze is directed to a location near the predefined physical location (e.g., within a predefined threshold distance of the predefined physical location). In some embodiments, when the user's gaze is not directed to the predefined physical location (e.g., when the user's gaze is directed away from, or at least a predefined distance away from, the predefined physical location), the system affordance is not displayed. In some embodiments, while displaying the system affordance at the predefined location relative to the location that corresponds to the predefined physical location in the three-dimensional environment, the device detects that the user's gaze moves away from the location that corresponds to the predefined physical location, and in response to detecting the user's gaze moving away from the location correspond the predefined physical location in the three-dimensional environment, the device ceases to display the system affordance at the predefined location in the three-dimensional environment.

In some embodiments, displaying the system affordance at the predefined location relative to the location that corresponds to the predefined physical location in the three-dimensional environment includes: in accordance with a determination that the user's gaze is not directed to the location that corresponds to the predefined physical location, displaying the system affordance with a first appearance (e.g., shape, size, color, etc.); and in accordance with a determination that the user's gaze is directed to the location that corresponds to the predefined physical location, displaying the system affordance with a second appearance that is different from the first appearance. In some embodiments, the system affordance has the first appearance while the user's gaze is directed away from the location that corresponds to the predefined physical location. In some embodiments, the system affordance has the second appearance while the user's gaze is directed to the location that corresponds to the predefined physical location. In some embodiments, the system affordance changes from the first appearance to the second appearance when the user's gaze shifts to (e.g., within a threshold distance of) the location that corresponds to the predefined physical location, and from the second appearance to the first appearance when the user's gaze shifts away (e.g., at least a threshold distance away) from the location that corresponds to the predefined physical location.

In some embodiments, the system affordance is displayed at the predefined location relative to the location that corresponds to the predefined physical location in accordance with a determination that the user is prepared to perform a gesture. In some embodiments, determining that the user is prepared to perform a gesture includes detecting an indication that the user is prepared to perform a gesture, for example by detecting that the predefined physical location (e.g., the user's hand, wrist, or finger(s)) is in (or has been brought into) a predefined configuration (e.g., a predefined pose relative to the device in the physical environment). In one example, the system affordance is displayed at the predefined location relative to a displayed representation of the user's hand in the three-dimensional environment when the device detects that the user has brought his hand into a predefined ready state in the physical environment (e.g., a specific position and/or orientation of the hand) in additional to detecting the gaze on the hand in the ready state. In some embodiments, the predefined configuration requires that the predefined physical location (e.g., the user's hand) have a specific position relative to the electronic device or the one or more input devices of the electronic device, such as being within the field of view of one or more cameras.

In some embodiments, displaying the system affordance at the predefined location relative to the location that corresponds to the predefined physical location includes: in accordance with a determination that the user is not prepared to perform a gesture, displaying the system affordance with a first appearance. In some embodiments, determining that the user is not prepared to perform a gesture includes detecting an indication that the user is not prepared to perform a gesture (e.g., detecting that the user's hand is not in a predefined ready state). In some embodiments, determining that the user is not prepared includes failing to detect an indication that the user is prepared (e.g., failing to or being unable to detect that the user's hand is in a predefined ready state, for example if the user's hand is outside of the field of view of one or more cameras of the electronic device). Detecting an indication of the user's preparedness to perform a gesture is described in further detail herein with reference to FIG. 7E and associated descriptions. In some embodiments, displaying the system affordance at the predefined location relative to the location that corresponds to the predefined physical location further includes: in accordance with a determination that the user is prepared to perform a gesture (e.g., in accordance with detecting the indication that the user is prepared to perform a gesture, as described herein with reference to FIG. 7E and accompanying descriptions), displaying the system affordance with a second appearance that is different from the first appearance. A person of ordinary skill in the art will recognize that the presence or absence of the system affordance, and the particular appearance of the system affordance, can be modified depending on what information is intended to be conveyed to the user in that particular context (e.g., what operation(s) will be performed in response to a gesture, and/or whether additional criteria need to be satisfied in order for a gesture to invoke the system user interface). In some embodiments, while the system affordance is displayed at the predefined location relative to the location that corresponds to the predefined physical location in the three-dimensional environment, the device detects that the user hand changes from a first state to a second state, in response to detecting the change of from the first state to the second state: in accordance with a determination that the first state is a ready state and the second state is not a ready state, the device displays the system affordance with the second appearance (changes from the first appearance); and in accordance with a determination that the first state is not a ready state and the second state is a ready state, the device displays the system affordance with the first appearance (e.g., changes from the second appearance). In some embodiments, if the computer system does not detect the user's gaze on the user's hand and the user's hand is not in the ready state configuration, the computer system does not display the system affordance, or, optionally, displays the system affordance with a first appearance. If a subsequent input gesture is detected (e.g., when the system affordance is not displayed or displayed with the first appearance), the computer system does not perform a system operation corresponding to the input gesture or, optionally, performs an operation in the current user interface context corresponding to the input gesture. In some embodiments, if the computer system does detect the user's gaze on the user's hand but the hand is not in the ready state configuration, the computer system does not display the system affordance, or, optionally, displays the system affordance with the first appearance or the second appearance. If a subsequent gesture input is detected (e.g., when the system affordance is not displayed or displayed with the first appearance or second appearance), the computer system does not perform a system operation corresponding to the input gesture or, optionally, performs displays a system user interface (e.g., a dock or system menu). In some embodiments, if the computer system does not detect the user's gaze on the user's hand but the hand is in the ready state configuration, the computer system does not display the system affordance, or, optionally, displays the system affordance with the first appearance or the second appearance. If a subsequent gesture input is detected (e.g., when the system affordance is not displayed or displayed with the first appearance or second appearance), the computer system does not perform a system operation corresponding to the input gesture or, optionally, performs an operation in the current user interface context. In some embodiments, if the computer system detect the user's gaze on the user's hand and the hand is in the ready state configuration, the computer system display the system affordance with the second appearance or a third appearance. If a subsequent gesture input is detected (e.g., when the system affordance is with the second appearance or third appearance), the computer system performs a system operation (e.g., displays a system user interface). In some embodiments, multiple of the above are combined in the same implementation.

In some embodiments, the predefined physical location is a hand of the user, and determining that the user is prepared to perform a gesture (e.g., the hand is currently in a predefined ready state or a starting gesture has just been detected) includes determining that a predefined portion (e.g., a designated finger) of the hand is in contact with a physical control element. In some embodiments, the physical control element is a controller (e.g., a respective input device) separate from the user (e.g., the ready state is the user's thumb in contact with a touch-sensitive strip or ring attached to the user's index finger). In some embodiments, the physical control element is a different portion of the user's hand (e.g., the ready state is thumb in contact with the upper side of the index finger (e.g., near the second knuckle)). In some embodiments, the device detects whether the hand is in the predefined ready state using a camera and displays the hand in the ready state in the view of the three-dimensional environment. In some embodiments, the device detects whether the hand is in the predefined ready state using the physical control element that is touch-sensitive and that is communicably coupled to the electronic device to transmit the touch input to the electronic device.

In some embodiments, the predefined physical location is a hand of the user, and determining that the user is prepared to perform a gesture includes determining that the hand is raised above a predefined level relative to the user. In some embodiments, determining that the hand is raised includes determining that the hand is positioned above a particular transverse plane relative to the user (e.g., above the user's waist, that is, closer to the user's head than to the user's feet). In some embodiments, determining that the hand is raised includes determining that the user's wrist or elbow is bent at least a certain amount (e.g., within a 90-degree angle). In some embodiments, the device detects whether the hand is in the predefined ready state using a camera and, optionally, displays the hand in the ready state in the view of the three-dimensional environment. In some embodiments, the device detects whether the hand is in the predefined ready state using one or more sensors (e.g., motion sensors) attached to the user's hand, wrist, or arm and that are communicably coupled to the electronic device to transmit the movement input to the electronic device.

In some embodiments, the predefined physical location is a hand of the user, and determining that the user is prepared to perform a gesture includes determining that the hand is in a predefined configuration. In some embodiments, the predefined configuration requires a respective finger of the hand (e.g., the thumb) to be in contact with a different portion of the user's hand (e.g., an opposing finger, such as the index finger, or a predefined portion of the opposing finger, such as the middle phalanx or middle knuckle of the index finger). In some embodiments, the predefined configuration requires, as described above, that the hand be above a particular transverse plane (e.g., above the user's waist). In some embodiments, the predefined configuration requires bending of the wrist toward the thumb side and away from the pinky side (e.g., radial flexion) (e.g., without axial rotation of the arm). In some embodiments, when the hand is in the predefined configuration, one or more fingers are in a natural resting position (e.g., curled), and the entire hand is tilted or moved away from a natural resting position of the hand, wrist, or arm to indicate the user's preparedness to perform a gesture. One of ordinary skill in the art will recognize that the particular predefined ready state used may be selected so as to have an intuitive and natural user interaction, and may require any combination of the aforementioned criteria. In some embodiments, the predefined configuration is distinct from a natural resting pose of a user's hand (e.g., relaxed and resting pose on one's lap, tabletop, or side of the body) when the user merely wishes to view the three-dimensional environment rather than providing input to and interact with the three-dimensional environment. The change from the natural resting pose to the predefined configuration is purposeful and requires a user's deliberate movement of the hand into the predefined configuration.

In some embodiments, the location that corresponds to the predefined physical location is a fixed location within the three-dimensional environment (e.g., the corresponding predefined physical location is a fixed location in the physical environment). In some embodiments, the physical environment is the frame of reference of the user. That is, one of ordinary skill in the art will recognize that locations referred to as "fixed" locations in the physical environment may not be absolute locations in space, but are fixed with respect to the frame of reference of the user. In some examples, if the user is in a room of a building, the location is a fixed location in the three-dimensional environment that corresponds to (e.g., that is a representation of) a fixed location in the room (e.g., on a wall, floor, or ceiling of the room). In some examples, if a user is inside of a moving vehicle, the location is a fixed location in the three-dimensional environment that corresponds to (e.g., that is a representation of) a fixed location along the interior of the vehicle. In some embodiments, the location is fixed relative to content displayed in the three-dimensional environment, where the displayed content corresponds to the fixed predefined physical location in the physical environment.

In some embodiments, the location that corresponds to the predefined physical location is a fixed location relative to the display of the three-dimensional environment (e.g., relative to the display generation component). In some embodiments, the location is fixed relative to the user's perspective of the three-dimensional environment (e.g., a location that is fixed relative to the display of the three-dimensional environment by the display generation component), without regard to specific content displayed within the three-dimensional environment, which is generally updated as the user's perspective changes (e.g., in response to or in conjunction with changes in the user's perspective). In some examples, the location is a fixed location along (e.g., within a predefined distance of) an edge of the display of the three-dimensional environment. In some examples, the location is centered relative to the display of the three-dimensional environment (e.g., centered within a display region along the bottom, top, left, or right edge of the display of the three-dimensional environment).

In some embodiments, the predefined physical location is a fixed location on the user. In some examples, the predefined physical location is a hand or finger of the user. In some such examples, the location that corresponds to the predefined physical location includes a displayed representation of the hand or finger of the user in the three-dimensional environment.

In some embodiments, after displaying the system user interface in the three-dimensional environment, the computer system detects a second gesture (e.g., a second gesture performed by the user's hand, wrist, finger(s), or arm) (e.g., while displaying the system user interface after detecting the first gesture and the gaze directed at the location corresponding to the predefined physical location). In response to detecting the second gesture, displaying a system user interface (e.g., an application-launching user interface). In some embodiments, the second gesture is a continuation of the first gesture. For example, the first gesture is a swipe gesture (e.g., by movement of a user's thumb over the user's index finger on the same hand), and the second gesture is a continuation of the swipe gesture (e.g., continued movement of the thumb over the index finger) (e.g., the second gesture begins from the end position of the first gesture without resetting the starting position of the second gesture to that of the first gesture). In some embodiments, the second gesture is a repetition of the first gesture (e.g., after performing the first gesture, the starting position for the second gesture is reset to within a predefined distance of the starting position of the first gesture, and the second gesture retraces the movement of the first gesture within a predefined tolerance). In some embodiments, displaying the home user interface includes expanding the system affordance from the predefined location relative to the location that corresponds to the predefined physical location to occupy a larger portion of the displayed three-dimensional environment and show additional user interface objects and options. In some embodiments, the system affordance is an indicator without respective content, and the respective content (e.g., a dock with a row of application icons for recently used or frequently used applications) replaces the indicator in response to a first swipe gesture by the hand, a two-dimensional grid of application icons for all of the installed applications replaces the dock in response to a second swipe gesture by the hand; and a three-dimensional working environment with interactive application icons suspended in different depths and locations in the three-dimensional working environment replaces the two-dimensional grid in response to a third swipe gesture by the hand.

In some embodiments, the current context of the three-dimensional environment includes display of an indication of a received notification (e.g., initial display of a subset of information about a received notification), and performing the operation in the current context of the three-dimensional environment includes displaying an expanded notification that includes additional information about the received notification (e.g., display of information beyond the subset initially displayed). In some embodiments, the current context of the three-dimensional environment is determined based on the location to which the gaze is currently directed. In some embodiments, when a notification is received and indicated in the three-dimensional environment, and the user's gaze is detected to be toward the notification (and not at location that corresponds to the predefined physical location (e.g., the user's hand)), the device determines that the current context is interaction with the notification, and displays expanded notification content in the three-dimensional environment in response to detecting the user's gesture (e.g., a upward flick gesture by the thumb or wrist).

In some embodiments, the current context of the three-dimensional environment includes display of an indication of one or more photos (e.g., one or more respective thumbnails of the one or more photos), and performing the operation in the current context of the three-dimensional environment includes displaying at least one of the one or more photos in the three-dimensional environment (e.g., displaying the photo in an augmented manner (e.g., expanded, animated, enhanced, in 3D, etc.)). In some embodiments, the current context of the three-dimensional environment is determined based on the location to which the gaze is currently directed. In some embodiments, when an image is displayed in the three-dimensional environment, and the user's gaze is detected to be toward the image (and not at location that corresponds to the predefined physical location (e.g., the user's hand)), the device determines that the current context is interaction with the image, and displays the image in an augmented manner in the three-dimensional environment in response to detecting the user's gesture (e.g., a upward flick gesture by the thumb or wrist).

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 11000, 12000, and 13000) are also applicable in an analogous manner to method 10000 described above with respect to FIG. 10. For example, the gestures, gaze inputs, physical objects, user interface objects, and/or animations described above with reference to method 10000 optionally have one or more of the characteristics of the gestures, gaze inputs, physical objects, user interface objects, and/or animations described herein with reference to other methods described herein (e.g., methods 8000, 9000, 11000, 12000, and 13000). For brevity, these details are not repeated here.

Figure 11:
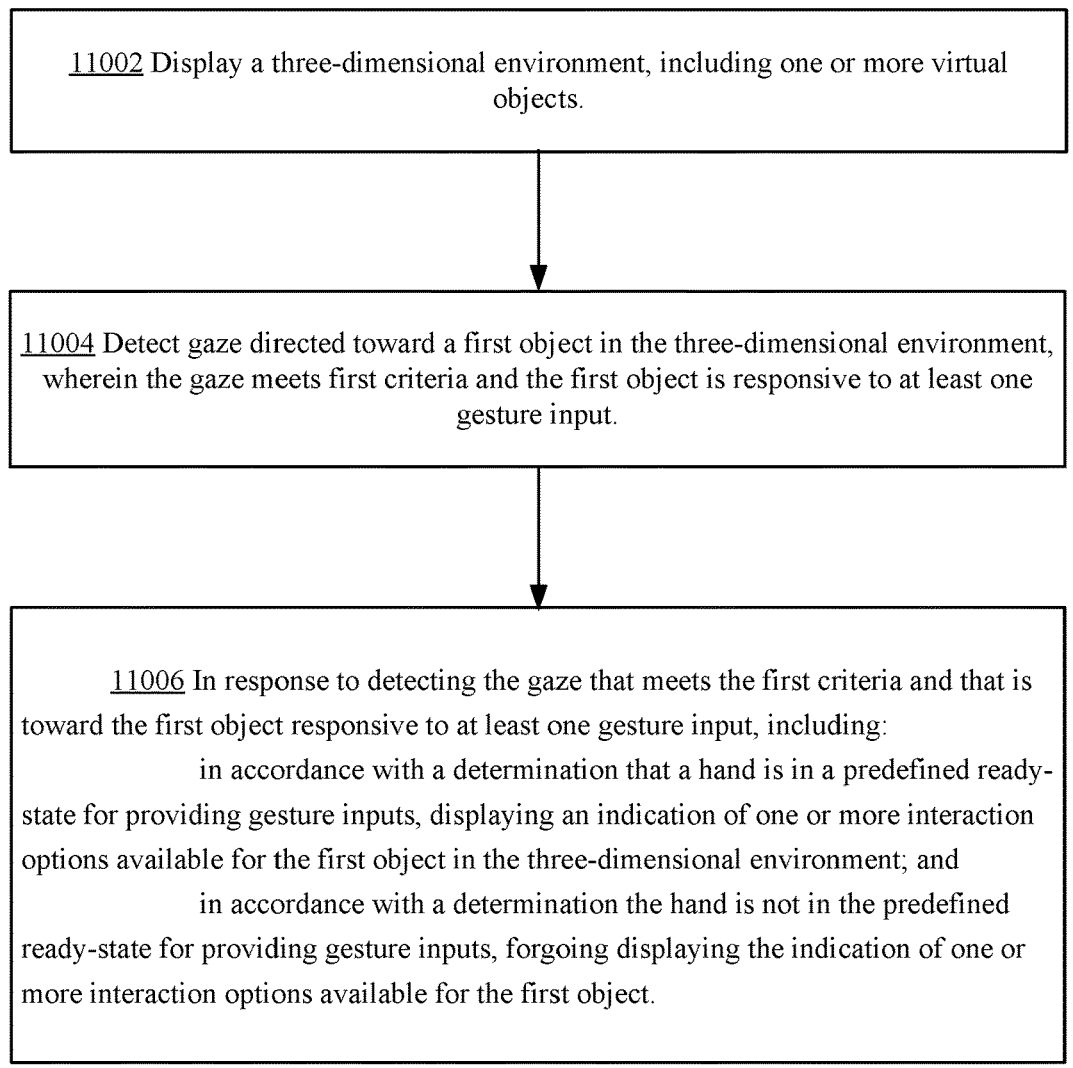
FIG. 11 is a flowchart of a method of interacting with a three-dimensional environment, in accordance with some embodiments.

FIG. 11 is a flowchart of an exemplary method 11000 for interacting with a three-dimensional environment using predefined input gestures, in accordance with some embodiments. In some embodiments, the method 11000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 11000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 11000 are, optionally, combined and/or the order of some operations is, optionally, changed.

In the method 11000, the computer system displays (11002) a three-dimensional environment (e.g., a virtual environment or an augmented reality environment), including one or more virtual objects (and optionally a representation of a field of view of a camera directed to a portion of the physical environment with the virtual objects (e.g., icons, pictures, avatars, etc.) overlaid on representations of one or more physical surfaces (e.g., walls, windows, table top, etc.) in the physical environment). The computer system detects (11004) gaze (e.g., of a user) directed toward a first object (e.g., a physical object or a virtual object, other than a handheld controller used to control the electronic device, and other than the user's hand, wrist, or arm or representation(s) thereof)) in the three-dimensional environment (e.g., the gaze is detected at a physical object displayed in the representation of the field of view of the camera, or a virtual object displayed in the augmented reality view of the physical environment or a purely virtual environment), wherein the gaze meets first criteria (e.g., stability, duration requirements) and the first object is responsive to at least one gesture input. In some embodiments, detecting the gaze toward the first object including detecting movement of the gaze from a first location at which the first object is not present to a second location at which the first object is present. The arrival of the gaze at the second location triggers the heuristic for determining whether to show an indication of interaction options associated with the first object in the three-dimensional environment, as describe below. In some embodiments, detecting the gaze toward the first object includes detecting that the gaze and determining that the gaze has remained substantially stationary at the location of the first object for at least a threshold amount of time. In response to detecting the gaze that meets the first criteria and that is toward the first object responsive to at least one gesture input (11006): in accordance with a determination that a hand (e.g., of the user) is in a predefined ready state for providing gesture inputs (e.g., hand in ready pose, or hand on controller) (e.g., the hand comes into the ready state while the gaze meets the first criteria and is toward the first object, or the gaze meets the first criteria while it is directed to the first object, while the hand is already placed in and remains in the ready state), the computer system displays an indication of one or more interaction options available for the first object in the three-dimensional environment (e.g., altering the appearance of the first object shown in the three-dimensional environment, or displaying one or more additional virtual objects near the first object in the three-dimensional environment). This is illustrated in FIG. 7J and accompanying descriptions, where the virtual objects 7506, 7508, or 7510 are highlighted in response to the gaze meeting the first criteria while the user's hand is in the ready state configuration. In some embodiments, an interaction option is a way in which a user can interact with a respective virtual or physical object through the device. For example, an interaction can involve controlling an appearance of the first object in the three-dimensional environment. In another example, an interaction can involve controlling output of content associated with the first object (e.g., visual, aural, and/or tactile outputs). In some embodiments, the indication of one or more interaction options available for the first object is merely an indication that one or more interaction options are available (e.g., without identifying what the interaction options are). In some embodiments, the indication of one or more interaction options identifies one or more of the interaction options that are available. In some embodiments, the first object is a virtual object (e.g., a picture, a virtual model, a virtual assistant, an avatar, etc.), and the indication is display of a menu of selectable options associated with the virtual object, or a change in the visual characteristics (e.g., color, applied visual effect, size, opacity, saturation, etc.) of the virtual object. In some embodiments, the first object is a physical object (e.g., a light bulb, a speaker, an electric fireplace, a fan, etc.), and the indication is display of a menu of selectable options or gesture prompts for various controllable functions associated with the physical object, or an augmentation of the appearance (e.g., overlaid with a mask or decor, zoomed, highlighted, etc.) of the physical object in the three-dimensional environment. In response to detecting the gaze that meets the first criteria and that is toward the first object responsive to at least one gesture input (11006): in accordance with a determination the hand is not in the predefined ready state for providing gesture inputs, forgoing displaying the indication of one or more interaction options available for the first object (e.g., the appearance of three-dimensional environment including the appearance of the first object is not altered in any way, except for the changes resulted from the changed field of view of the camera). This is illustrated in FIG. 7I and accompanying descriptions, where the virtual objects 7506, 7508, or 7510 are not highlighted in response to the gaze meeting the first criteria while the user's hand is not in the ready state configuration. In some embodiments, the device continuously tracks the user's gaze and whenever the user's gaze is detected on an interactive object in the three-dimensional environment and meets the predefined criteria (e.g., stability, duration), the device uses the above heuristic based on whether the user's hand is in a ready state to determine if the visual indication of one or more interaction options available for the first object should be displayed. In some embodiments, the device continuously tracks the user's hand, and when the device detects that the user's hand is put into the ready state, and the device enters the state for displaying visual indication for interaction options, and displays indications of interaction options whenever the user's gaze meets the first criteria toward an object with interaction options. The above human-machine interface designs allow the user to look at the three-dimensional environment freely, while reducing visual clutter and distraction if the user merely wishes to observe the environment rather than interacting with it. If the user is interested in interacting with the environment and would like to see which objects are interactive and what interaction options are available, the user can put his hand in the ready state, and use his gaze to explore the environment. The user can also directly interact with an object, by concurrently gazing at the object and putting his/her hand in the ready state to see the indication of interaction options, and then perform a gesture for a desired interaction option for the object. The currently disclosed human-machine interface design is distinct from a design that uses gaze (or other types of input) alone to select objects and trigger visual indication of selection, and then allows the user to interact with the selected object using hand gestures after the object is selected by gaze (or other input). Using gaze alone (or other single type of input) to select object and trigger display of visual feedback irrespective of whether the user has placed his hand in the ready state causes many visual distractions to the user when the user merely wishes to visually scans the environment casually, without actually interacting with the objects in the environment. Although some system requires the user to place his/her hand in the ready state before the system initiates gesture recognition procedure for additional gesture input, these conventional systems do not require gaze and the ready state to be concurrently present to trigger visual indication of interaction options for the object.

In some embodiments, determining that the hand is in the predefined ready state for providing gesture inputs includes determining that a predefined portion (e.g., a designated finger) of the hand is in contact with a physical control element. In some embodiments, the physical control element is a controller (e.g., a respective input device) separate from the user (e.g., the ready state is the user's thumb in contact with a touch-sensitive strip or ring attached to the user's index finger). In some embodiments, the physical control element is a different portion of the user's hand (e.g., the ready state is thumb in contact with the upper side of the index finger (e.g., near the second knuckle)). In some embodiments, the physical control element is not used to identify the first object or specify the location of the object for which the indication of interaction options are to be shown (e.g., physical control element is not used as a pointing device), and gaze is used for that purpose. In some embodiments, the device detects whether the hand is in the predefined ready state using a camera and displays the hand in the ready state in the view of the three-dimensional environment. In some embodiments, the device detects whether the hand is in the predefined ready state using the physical control element that is touch-sensitive and that is communicably coupled to the electronic device to transmit the touch input to the electronic device.

In some embodiments, determining that the hand is in the predefined ready state for providing gesture inputs includes determining that the hand is raised above a predefined level relative to the user. In some embodiments, determining that the hand is raised includes determining that the hand is positioned above a particular transverse plane (e.g., above the user's waist). In some embodiments, determining that the hand is raised includes determining that the user's wrist or elbow is bent at least a certain amount (e.g., within a 90-degree angle). In some embodiments, the device detects whether the hand is in the predefined ready state using a camera and displays the hand in the ready state in the view of the three-dimensional environment. In some embodiments, the device detects whether the hand is in the predefined ready state using one or more sensors (e.g., motion sensors) attached to the user's hand, wrist, or arm and that are communicably coupled to the electronic device to transmit the movement input to the electronic device.

In some embodiments, determining that the hand is in the predefined ready state for providing gesture inputs includes determining that the hand is in a predefined configuration. In some embodiments, the predefined configuration requires a respective finger of the hand (e.g., the thumb) to be in contact with a different portion of the user's hand (e.g., an opposing finger, such as the index finger, or a predefined portion of the opposing finger, such as the middle phalanx or middle knuckle of the index finger). In some embodiments, the predefined configuration requires, as described above, that the hand be above a particular transverse plane (e.g., above the user's waist). In some embodiments, the predefined configuration requires bending of the wrist toward the thumb side and away from the pinky side (e.g., radial flexion) (e.g., without axial rotation of the arm). In some embodiments, when the hand is in the predefined configuration, one or more fingers are in a natural resting position (e.g., curled), and the entire hand is tilted or moved away from a natural resting position of the hand, wrist, or arm to indicate the user's preparedness to perform a gesture. One of ordinary skill in the art will recognize that the particular predefined ready state used may be selected to have an intuitive and natural user interaction, and may require any combination of the aforementioned criteria. In some embodiments, the predefined configuration is distinct from a natural resting pose of a user's hand (e.g., relaxed and resting pose on one's lap, tabletop, or side of the body) when the user merely wishes to view the three-dimensional environment rather than providing input to and interact with the three-dimensional environment. The change from the natural resting pose to the predefined configuration is purposeful and requires a user's deliberate movement of the hand into the predefined configuration.

In some embodiments, displaying the indication of one or more interaction options available for the first object includes displaying information about the first virtual object that is adjustable in response to a subsequent input (e.g., a voice input, a hand gesture, etc.). In some embodiments, the display of the information about the first virtual object (where the information was not previously displayed) indicates that the virtual object is interactive (e.g., an affordance or visual indication that indicates the object is ready to receive additional gesture inputs), and the subsequent input cause a menu of selectable options to be displayed. For example, the object is an icon of a 3D movie, the indication is an introduction of the movie, and the device displays playback controls for the movie in response to a gesture input while the gaze is on the icon and while the introduction is displayed. In some embodiments, the display of information about the first virtual object includes a set of limited interactive options. For example, the object is a physical speaker and the indication is a reduced set of playback controls; and in response to a gesture input while the gaze is on the physical speaker and while the reduced set of playback controls are displayed, an expanded control interface with additional content and controls for the media player is displayed. In some embodiments, the information about the first virtual object includes a time and/or a location associated with the first virtual object (e.g., associated with content displayed with or represented by the first virtual object (e.g., time and location of when a picture was taken)). In some examples where the first virtual object is a virtual window displaying virtual scenery (e.g., static image or video), the information about the first virtual object includes a location of the displayed virtual scenery (e.g., a geographical location where images for the virtual scenery were taken) and/or a time of day of the displayed virtual scenery; and in response to a subsequent input received while the location and/or time is displayed, the device displays a scenery of a different location and/or time of day/year, or starts a time sequence of the scenery (a building at different stage of construction, a geographic location in different seasons or time of day).

In some embodiments, displaying the indication of one or more interaction options available for the first object (e.g., a first virtual object such as a three-dimensional character, a two-dimensional image, an icon, an avatar, etc.) includes displaying an animation of the first object. In some examples, the first virtual object is an image, such as a photograph or piece of artwork, and displaying the animation of the first virtual object includes animating the image itself and/or animating one or more elements displayed in the image. In some examples, the first virtual object includes a still image that represents a motion photo that includes video content (optionally with corresponding audio content) or a multi-frame photo, and displaying the animation includes displaying at least a portion of the video content (and optionally corresponding audio content) of the motion or multi-frame photo. In some embodiments, the first object is an icon of a movie, and the information includes a brief cut scene from the movie.

In some embodiments, displaying the indication of one or more interaction options available for the first object includes displaying a selection indicator over at least a portion of the first object (e.g., highlighting, animating, applying a visual effect (e.g., shimmering, spotlighting, jiggling, etc.) to at least a portion, such as the edges, or the entirety of the first object.).

In some embodiments, the computer system detects the gaze (e.g., of the user) directed toward a second object (e.g., a physical object or a virtual object, other than a handheld controller used to control the electronic device, and other than the user's hand, wrist, or arm or representation(s) thereof)) in the three-dimensional environment (e.g., detecting movement of the gaze from the first object to the second object distinct from the first object), wherein the gaze meets the first criteria (e.g., stability, duration requirements) and the second virtual object is responsive to at least one gesture input. In response to detecting the gaze that meets the first criteria and that is toward the second virtual object that is responsive to at least one gesture input: in accordance with a determination that the hand is in the predefined ready state for providing gesture inputs (e.g., hand in ready pose, or hand on controller) (e.g., the hand comes into the ready state while the gaze meets the first criteria and is toward the second object, or the gaze meets the first criteria while it is directed to the second object, while the hand is already placed in and remains in the ready state), the computer system displays an indication of one or more interaction options available for the second virtual object. In some embodiments, as the user's gaze shifts from one object to another (and, in some embodiments, in accordance with the determination that the hand is in the predefined ready state), the indication that one or more interaction options are available also shifts from the one virtual object to the other. In other words, when the indication of one or more interaction options available for the second object is displayed, the device ceases to display the indication of one or more interaction options for the first object.

In some embodiments, in response to detecting the gaze that meets the first criteria and that is toward the first object that is responsive to at least one gesture input: in accordance with the determination that the hand is in the predefined ready state for providing gesture inputs (e.g., while the gaze remains on the first object and while the indication of one or more interaction options available for the first object is displayed): the computer system detects (e.g., using a camera or one or more sensors on a physical controller device) a first gesture input by the hand (e.g., a tap gesture, such as a tap of the thumb on an opposing finger, or a swipe gesture using one or more fingers or the entire hand). In some embodiments, detecting the first gesture input by the hand includes detecting movement of the hand from the predefined ready state to a first preset state, movement of the hand from the predefined ready state that satisfy a predefined movement pattern/path. In response to detecting the first gesture input by the hand, the computer system performs an interaction with the first object (e.g., an interaction that is associated with the first gesture input). For example, the first object is an image, and the indication is animation of the image, and first gesture input is a tap input or swipe input on or across the index finger by the thumb; and performing the interaction with the first object includes enlarging the image and placing the image into the three-dimensional environment to provide an immersive experience associated with the image (e.g., a 3D view of a short movie associated with the image). In another example, the first object is first virtual scenery shown in a virtual window or overlaid on a real window, the indication is textual information about the location and time associated with the first virtual scenery, and the first gesture input is a swipe gesture of the arm, hand, or finger; and performing the interaction with the first object includes switching display of the first virtual scenery with a first location and/or first time to a second virtual scenery with a second location and/or second time, distinct from the first location and/or first time.

In some embodiments, the first object includes a first image (e.g., a first photograph or motion photo), and performing the interaction with the first object includes replacing the first image with a second image (e.g., a second photograph or motion photo) that is different from the first image. For example, when the user gazes at a photo overlaid on the wall (e.g., a physical wall) with his/her hand in the ready state, the photo animates to indicate that the photo is associated with one or more interaction options; when the user then provides a swipe gesture using his/her hand while gazing at the photo, the device replaces the current photo with another photo (e.g., from a list of photos in the photo library).

In some embodiments, the first object includes a first playable media content (e.g., first video content, first audio content, or first multimedia content), and performing the interaction with the first object includes toggling playback of (e.g., playing or pausing) the first playable media content (e.g., toggling between playing and pausing the first video content, first audio content, or first multimedia content). In some examples, the first object displays a respective frame (e.g., a still image) of the first video content, and the interaction initiates playback of the first video content from a current point within the first video content corresponding to the displayed respective frame (e.g., by initiating or restarting playback from a beginning of the video content, or by resuming playback from a point partway through the video content). In some examples, the first object displays video content being played, and the interaction pauses playback of the video content. In some embodiments, active playing of the first playable media content includes enlarging a presentation area of the first playable media content (e.g., to occupy a larger portion of the display, or switching from 2D display mode to a 3D display mode).

In some embodiments, the first object is a virtual window displaying first virtual scenery, and performing the interaction with the first object includes replacing display of the first virtual scenery with display of second virtual scenery that is different from the first virtual scenery. In some embodiments, respective virtual scenery includes an image of a landscape, cityscape, aerial view, panorama, etc., and is optionally updated as the user's perspective of the virtual window within the three-dimensional environment changes (e.g., as the user moves the electronic device or one or more cameras of the electronic device).

In some embodiments, the first gesture input is an upward flick gesture (e.g., an upward flick of the wrist toward the thumb side (e.g., radial flexion), optionally with the thumb resting on or otherwise in contact with an opposing finger, such as the index finger). Performing the interaction with the first object (e.g., a virtual stereo, or a physical speaker) includes displaying a user interface with one or more interaction options (or, in some embodiments, one or more additional interaction options) for the first object. In some embodiments, the interaction with the first object (e.g., displaying the expanded control user interface with the one or more additional controls and a set of albums) is performed in accordance with a determination that the gesture is an upward flick gesture, and other types of gestures (e.g., thumb tapping or swipe on index finger, without the wrist flicking upward) are used to activate one or more playback controls that are initially displayed as indication of one or more interaction options available for the first object.

In some embodiments, the first gesture input includes rotation of the hand (e.g., axial rotation of the wrist and forearm (also called pronation or supination of the wrist), or bending of the wrist toward or away from the palm (also called flexion and extension), or circular clockwise or counterclockwise movement of the thumb around the finger tip of the index finger). Performing the interaction with the first object (e.g., a virtual stereo, an album cover, or a physical speaker) includes changing an output volume of content (e.g., currently played or last played audio content) associated with the first object. In some embodiments, the first gesture input is detected while outputting the content associated with the first object. In some embodiments, rotation of the wrist so that the palm rotates downward (e.g., pronation) causes a decrease in output volume of the content, while rotation of the wrist so that the palm rotates upward (e.g., supination) causes an increase in output volume of the content. In some embodiments, counterclockwise rotation of the wrist or finger (regardless of whether the left hand or the right hand is used) causes a decrease in output volume, while clockwise rotation of the wrist or finger causes an increase in output volume of the content (e.g., as if the user were adjusting a physical volume knob).

In some embodiments, the first criteria include a requirement that the gaze remains directed toward the first object for at least a threshold amount of time (e.g., with less than a threshold amount of deviation from the first object).

It should be understood that the particular order in which the operations in FIG. 11 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 12000, and 13000) are also applicable in an analogous manner to method 13000 described above with respect to FIG. 11. For example, the gestures, gaze inputs, physical objects, user interface objects, and/or animations described above with reference to method 11000 optionally have one or more of the characteristics of the gestures, gaze inputs, physical objects, user interface objects, and/or animations described herein with reference to other methods described herein (e.g., methods 8000, 9000, 10000, 12000, and 13000). For brevity, these details are not repeated here.

FIG. 12 is a flowchart of an exemplary method 12000 for transitioning into a three-dimensional environment, in accordance with some embodiments. In some embodiments, the method 12000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 12000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 12000 are, optionally, combined and/or the order of some operations is, optionally, changed.

In the method 12000, the computer system detects (12002) placement of the display generation component in a predefined position relative to a user of the electronic device (e.g., detecting the user putting the HMD on his or her head (e.g., via device orientation and/or sensors on HMD that detect wearing status), detecting the display orientation in combination with user's gaze looking at the display (e.g., via motion sensor and eye tracking technology implemented on the display generation component), detecting the user's eyes directly in front of the display (e.g., using a camera on the display generation component), or detecting a combination of the movement of the display generation component and the hand grip (e.g., using touch sensors and motion sensors on the display generation component)). For example, the device detects that the user has just put the HMD on his head (e.g., using a combination of HMD orientation and user's two-handed grip to wear the HMD), or that the user just used his two hands to hold, elevate, and orient the display directly towards the user's eyes, or that a button on the housing that is physically coupled with the display generation component for initiating a welcome interface has just been activated by the user. The placement of the display generation component in the predefined position relative to the user of the computer system indicates that the user is about to initiate a virtual and immersive experience (e.g., starting a three-dimensional movie, entering a three-dimensional virtual world, etc.) using the electronic device, where enabling the user's virtual immersive experience requires that the user's current view of the real world surrounding the user is temporarily blocked by the electronic device (e.g., by the presence of the display close in front of the user's eyes and the sound muffling cancelation functions of the HMD). This occurs a point in time that is before the start of a virtual immersive experience for the user, and the initial transition into the virtual immersive experience benefits from a more controlled and gradual transition (e.g., a cognitively gentle transition) than the transitions for subsequently pausing the ongoing immersive experience to temporarily reveal the view of the real world, and then resuming the paused immersive experience. Referring back to FIG. 12, in response to detecting the placement of the display generation component in the predefined position relative to the user of the computer system, the computer system displays (12004), through the display generation component, a first view of a three-dimensional environment including a pass-through portion, wherein the pass-through portion includes a representation of at least a portion of a real world surrounding the user. This is illustrated, for example, in FIG. 7K where device 7100 displays the physical environment 7800 when the user is holding the device 7100 with two hands in front of his eyes. For example, the first view is a welcome/introductory user interface that is displayed when the electronic device is first turned on or placed in front of the user's eyes. In some embodiments, the pass-through portion is a semi-transparent or a see-through portion revealing the physical environment surrounding the user. In some embodiments, the pass-through portion displays a live feed of images or video captured of the physical environment around the user by a camera. In some embodiments, the pass-through portion is a portion of the display generation component (e.g., display or HMD) that is made transparent or semi-transparent (e.g., such that the user can see through it to view the real world surrounding the user without removing the display generation component from the predefined position relative to the user) in response to a control instruction from the electronic device. In some embodiments, the pass-through portion is displayed within the introductory user interface with other virtual content (e.g., two-dimensional and/or three-dimensional virtual objects and user interface elements) surrounding the pass-through portion. In some embodiments, in the first view, the pass-through portion is not displayed with any other virtual content when the user first places the display generation component into the predefined position (e.g., when the user first put the HMD on his/her head). In some embodiments, in the first view, the pass-through portion is displayed with other virtual content (e.g., a two-dimensional desktop or a dock or other user interface elements floating in the user's view) when the user first places the display generation component in the predefined position. Referring back to FIG. 12, while displaying the first view of the three-dimensional environment including the pass-through portion (and while the display generation component is in the predefined position relative to the user of the computer system), the computer system detects (12006) a change in grip of the hand on a housing that is physically coupled with the display generation component (e.g., enclosing, partially enclosing, directly coupled or coupled via an intermediary portion of the device). For example, the change in grip of the hand includes a change of a total number of hands detected on the housing that is physically coupled with the display generation component (e.g., from two hands to one hand, or from one hand to no hands, or from two hands to no hands), a change of a total number of fingers in contact with the display generation components (e.g., from eight fingers to six fingers, from four fingers to two fingers, from two fingers to no fingers, etc.), a change from hand contact to no hand contact on the housing that is physically coupled with the display generation component, and/or a change in contact position(s) and/or contact intensities on the housing that is physically coupled with the display generation component (e.g., resulted from a change in hand posture, orientation, relative grip forces of different fingers on the housing that is physically coupled with the display generation component, etc.). The change in grip of the hand on the housing that is physically coupled with the display generation component optionally does not cause a change in the predefined position of the display generation component relative to the user (e.g., the HMD is still on the user's head covering the user's eyes), and the change in grip of the hand represents the user letting go of the display generation component (e.g., gradually or resolutely) and is ready to be immersed in the virtual immersive experience. In some embodiments, detecting the change in grip of the hand on the housing that is physically coupled with the display generation component includes detecting two or more transitions of states of the hand grip on the housing that is physically coupled with the display generation component that represents reduced manual control of the display generation component by the user's hand(s). Referring back to FIG. 12, in response to detecting the change in grip of the hand on the housing that is physically coupled with the display generation component: in accordance with a determination that the change in grip of the hand on the housing that is physically coupled with the display generation component meets first criteria, replacing the first view of the three-dimensional environment with a second view of the three-dimensional environment, wherein the second view replaces at least a portion of the pass-through portion with virtual content (e.g., expansion and transformation of existing virtual content in the first view, and/or additional virtual content that was not present in the first view). This is illustrated in FIG. 7L, for example, where some portions of the physical environment shown on device 7100 are replaced with virtual content (e.g., virtual objects 7506, 7508, and 7510) in response to the user's change in grip (e.g., from two hands to one hand) when facing the display of the device 7100. In some embodiments, the first criteria require a reduction in the total number of hands (or fingers) detected on the housing that is physically coupled with the display generation component from a first predefined number to a second predefined number that is smaller than the first predefined number (e.g., from two to one, from two to zero, or from one to zero, etc.) in order for the first criteria to be met. For example, the first criteria are met when one of the user's two hands is removed from the HMD after the user uses two hands to put the HMD on the user's head, or when one of the user's hands is removed from the display after the user used two hands to place the display directly in front of the user's eyes, or when the user takes his hand(s) completely off the display or HMD after the uses the hand(s) to place the display or HMD into the predefined position (e.g., on the user's head or in front of the user's eyes). In some embodiments, the first criteria require a reduction in the number of contacts (e.g., the total number of fingers detected on the housing that is physically coupled with the display generation component) or in the total amount of contacts (e.g., a total area of contact with the user's hand(s)) from a first number/amount to a second number/amount that is smaller than the first number/amount. For example, the first criteria are met when the user loosens/removes some or all of the fingers used to hold and place the display generation component into the predefined position on/from the display generation component. The first criteria represent the required reduction in the amount of manual control on the display generation component to indicate that the user is ready to be shielded from the physical world around his/her and be fully immersed in the virtual immersive experience provided by the electronic device. In some embodiments, the second view is a system user interface of the electronic device, which includes an increased amount of virtual content than the first view. For example, the second view includes a 3-D view of the virtual environment that includes less or no view of the real world surrounding the user and includes more virtual content or includes completely immersive virtual content. In some embodiments, replacing the first view with the second view includes replacing a portion of the pass-through portion with virtual content (e.g., new virtual content overlays on the portion of the pass-through portion). In some embodiments, replacing the first view with the second view includes increasing the opacity of the pass-through portion (e.g., when the pass-through portion is implemented with a semi-transparent or transparent state of the display), such that the virtual content displayed on the semi-transparent or transparent portion of the display becomes more visible and color saturated. In some embodiments, the virtual content in the second view provides a more immersive experience to the user than the virtual content in the first view (e.g., virtual content in the first view are two-dimensional objects and/or three-dimensional objects displayed in front of the user (e.g., at different depths from the user), and the virtual content in the second view includes a three-dimensional world represented in a panorama or 360-degree view from the user.). In some embodiments, the second view includes a smaller pass-through portion that reveals fewer portions or a smaller portion of the physical environment surrounding the user as compared to the first view. For example, the pass-through portion of first view shows four walls of a room in which the user is located, and the pass-through portion of the second view shows the window on one of the four walls replaced with a virtual window, so the area of the pass-through portion is reduced in the second view.

In some embodiments, the first view includes a first set of virtual objects spanning a first viewing angle or range of viewing depth in front of eyes of the user's; and the second view includes a second set of virtual objects spanning a second viewing angle or range of viewing depth that is greater than the first viewing angle or range of viewing depth. For example, in the first view, virtual objects of the introductory user interface (e.g., two-dimensional user interface objects, two-dimensional images, or three-dimensional user interface objects) are displayed within a cone of 60-degrees at the same or different depths from the user; and in the second view, the virtual objects of the system user interface are displayed within a cone of 100 degrees, 180 degrees, or 210 degrees centered in front of the user's eyes. In some embodiments, in the first view, the virtual objects are displayed within a small depth of one another (e.g., confined to a surface or a thin layer in space); and in the second view, the virtual objects are displayed with a wider range of depths.

In some embodiments, the first view includes first virtual content overlaying a first surface in the three-dimensional environment that corresponds to a first physical object in the real world surrounding the user, and the second view includes second virtual content overlaying a second surface in the three-dimensional environment that corresponds to a second physical object in the real world surrounding the user, in addition to the first virtual content overlaying the first surface. For example, in the first view, a wall or a table top present in the real world is overlaid (e.g., completely or partially covered, blocked, or draped, or embellished, etc.) with virtual objects (e.g., icons, images, or other 2D or 3D objects); and in the second view, more walls or the entire room is overlaid (e.g., completely or partially covered, blocked, or draped, or embellished, etc.) with virtual objects. In some embodiments, the second view is completely composed of virtual content and leaves little or no visible evidence of the structure of the real world surrounding the user.

In some embodiments, wherein the first view includes first virtual content, and the second view includes second virtual content that replaces the first virtual content and the pass-through portion. In some embodiments, the first view includes a plurality of user interface objects that when activated produce various immersive application environments and/or experiences in the three-dimensional environment. When the user first places the display generation component into the predefined position relative to the user using his/her hand(s), the first view is displayed, with the plurality of user interface objects and the pass-through portion showing a portion of the physical world surrounding the user. When the user changes his/her hand grip in the required manner (e.g., releasing some of the fingers on the housing that is physically coupled with the display generation component or letting go completely of the display generation component), the second view is displayed replacing the plurality of user interface object and the pass-through portion with a completely immersive virtual experience or environment. In some embodiments, the user optionally uses gaze or voice commands to activate one of the plurality of user interface objects in the first view to initiate an application or experience, but the application and experience does not go into the fully immersive mode (e.g., remains in a suspended state) until the first criteria are met by the change in grip of the user's hand(s).

In some embodiments, the second view comprises including one or more selectable virtual objects representing one or more applications and virtual experiences, respectively. For example, in some embodiments, the first view includes a pass-through portion without displaying the virtual desktop of the electronic device, and the second view displays the virtual desktop that includes various user interface objects representing different applications and virtual experiences that can be started in the three-dimensional environment. In some embodiments, while displaying the virtual desktop, the electronic device receives a user input (e.g., a gaze detected by the camera, a user input on a controller, a touch detected on a touch-sensitive surface, etc.) to select and activate a virtual object representing an application in response to the user input, the device displays a virtual immersive environment associated with the selected application (e.g., a 3D movie or game) through the display generation component.

In some embodiments, while displaying the second view of the three-dimensional environment (and while the display generation component is in the predefined position relative to the user of the computer system), the computer system detects a second change in grip of the hand on the housing that is physically coupled with the display generation component. In response to detecting the second change in grip of the hand on the housing that is physically coupled with the display generation component: in accordance with a determination that the change in grip of the hand on the housing that is physically coupled with the display generation component meets second criteria (e.g., the second criteria require a change in grip of the hand from a first state of the hand that met the first criteria to a second state with a further reduction of manual control (e.g., required amount of reduction represented by the reduced number of contacts, reduced number of hands, reduced area of contacts, reduced intensities of contacts, change positions of contacts, or a combination of two or more of the above, etc.) on the housing that is physically coupled with the display generation component), the computer system replaces the second view of the three-dimensional environment with a third view of the three-dimensional environment that does not include a pass-through portion (e.g., the third view including three-dimensional immersive virtual content). For example, the third view is a 3D theater mode: the change in grip of the user's hand that meets the second criteria includes detecting no hand grip on the housing that is physically coupled with the display generation component after the previous one or more two handed grips, the electronic device will start playing the movie or game or showing other types of virtual content in 3-D immersive VR view. In some embodiments, the change from the first view to the second view and then to the third view includes a gradual transition from (1) the first view including a see-through view of the real world (e.g., even a full screen of real world view), to (2) the second view of a mixture of see-through view and virtual content (e.g., including virtual content overlays real world content), to (3) the third view of a full virtual reality immersive content, in response to changes in (1) grip of the user's hands from two-handed grip to wear the HMD, to (2) one-handed grip or other types of reduction of contact area or intensities on the HMD, then to (3) no hand/contact detected on the HMD.

In some embodiments, while display a respective view of the three-dimensional environment (e.g., the second view or the third view) that does not include the pass-through portion to show at least a portion of the real world surrounding the user (and while the display generation component is in the predefined position relative to the user), the computer system detects a user input on the housing that is physically coupled with the display generation component (e.g., a user touch on the housing that is physically coupled with the display generation component). In response to detecting the user input on the housing that is physically coupled with the display generation component, in accordance with a determination that the user input meets third criteria, the computer system redisplays, through the display generation component, the first view including the pass-through portion that includes a representation of at least a portion of the real world. This is illustrated in FIGS. 7L-7M, for example. In some embodiments, the third criteria require that the display generation component is in the predefined position relative to the user and the user input is user's hand contact within a predefined region of the display generation component (e.g., the areas on the front and sides of the HMD that the user would generally grab to take off the HMD), in order for the third criteria to be met. In some embodiments, the third criteria require that the hand contact to be one-handed contact in order for the third criteria to be met (e.g., a transition from no hand contact to one-handed contact on either side of the HMD (or a side corresponding to the user's dominant hand) is required). In some embodiments, the third criteria require the hand contact to be two-handed contact in order for the third criteria to be met (e.g., a transition from no hand contact to two-handed contact on both sides of the HMD is required). In some embodiments, in response to detecting the user input on housing of the display generation component, in accordance with a determination that the user input does not meet the third criteria, the computer system forgoes redisplaying the first view through the display generation component (e.g., the user remains in the immersive environment).

In some embodiments, in response to detecting the change in grip of the hand on the housing of the display generation component: in accordance with a determination that the change in grip of the hand does not meet the first criteria, the first view of the three-dimensional environment is maintained (and is not replaced with the second view of the three-dimensional environment). While displaying the first view of the three-dimensional environment, the computer system detects a user input that is distinct from a change in grip of the hand on the housing that is physically coupled with the display generation component, wherein the user input causes activation of a first input device of the electronic device (e.g., a mechanical button on the housing that is physically coupled with the display generation component). In response to detecting the user input that causes activation of the first input device of the electronic device, the computer system replaces the first view of the three-dimensional environment with the second view of the three-dimensional environment (e.g., in the same manner as when the change in grip of the hand met the first criteria). In some embodiments, the device also replaces the first view with the second view of the three-dimensional environment in response to detecting that the camera lens used to capture the real-world is blocked by the user's hand, or in response to detecting other indications that the user is ready to enter the virtual immersive environment (e.g., after a preset period of time has expired after the user put on the HMD).

It should be understood that the particular order in which the operations in FIG. 12 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 13000) are also applicable in an analogous manner to method 12000 described above with respect to FIG. 12. For example, the gestures, gaze inputs, physical objects, user interface objects, and/or animations described above with reference to method 12000 optionally have one or more of the characteristics of the gestures, gaze inputs, physical objects, user interface objects, and/or animations described herein with reference to other methods described herein (e.g., methods 8000, 9000, 10000, 11000, and 13000). For brevity, these details are not repeated here.

FIG. 13 is a flowchart of an exemplary method 13000 for transitioning into a three-dimensional environment, in accordance with some embodiments. In some embodiments, the method 13000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 13000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 13000 are, optionally, combined and/or the order of some operations is, optionally, changed.

In the method 13000, the computer system displays, via the display generation component, a view of a virtual environment (e.g., a three-dimensional virtual environment providing an immersive virtual experience (e.g., a movie or game)). This is illustrated in FIG. 7N, where the virtual environment 7610 is displayed on device 7100, for example. In some embodiments, the view includes 100% virtual content without including a pass-through portion that displays a representation of a portion of the real world surrounding the display generation component. In some embodiments, the view of the virtual environment is distinct from a representation of a portion of the real world surrounding the display generation component, and does not visually convey presence, locations, and/or physical structures of physical objects in the real world surrounding the display generation component. In some embodiments, the view of the virtual environment includes an indication of presence and location of a selected physical object, but does not visually convey presence, locations, and/or physical structures of one or more other physical objects in the real world surrounding the display generation components. In other words, the view of the virtual environment includes virtual content that replaces the display of physical objects that would be present in the user's normal field of view (e.g., the field of view of the user without the display generation component placed in front of the user's eyes) on the display. While displaying the view of the virtual environment and while the view of the virtual environment does not include a visual representation of a first portion of a first physical object present in a physical environment in which a user is located, the computer detects (13004) first movement of the user in the physical environment. For example, the view of the virtual environment does not include any type of visual representation (e.g., virtual content or see-through view) of the first portion of the physical object that reflects the presence and actual size, shape, location, and/or other kinds of characteristics associated with the first physical object. In some embodiments, the first movement of the user includes a movement of the entire body of the user or of a portion of the user such as a hand or arm of the user. In some embodiments, the first physical object includes a static object in the physical environment, such as a wall, a chair, a table, etc., or a moving object in the physical environment, such as another person or a dog in the physical environment that moves relative to the user while the user is static relative to the physical environment (e.g., user's pet moves around while the user is sitting on the sofa watching movie). When the view of the virtual environment does not include a visual representation of a first portion of the first physical object present in the physical environment in which the user is located, the same first portion of the first physical object, given its location relative to the user in the physical environment (e.g., the first portion of the first physical object is not being blocked by other physical object in the first physical environment), would have been visible in the field of view of the user if the display generation component had a pass-through portion or the display generation component were not present in front of the user's eyes. Referring back to FIG. 13, in response to detecting the first movement of the user in the physical environment (13006): in accordance with a determination that the user (e.g., the center of the user, any part of the user, or a predefined portion of the user (e.g., a hand or foot of the user) is within a threshold distance of the first portion of the first physical object, wherein the first physical object (e.g., including the first portion and a second portion of the first physical object) has an extent that is potentially visible to the user based on a field of view of the user (e.g., a typical field of view of a human (e.g., ~200 degrees) or a field of view of a HMD (e.g., ~100-200 degrees)) for the virtual environment (e.g., based on the field of view at the current moment and user's current location and heading direction) (e.g., all or part of the first physical object would be visible in a pass-through portion that displays the physical environment in front of the user if the field of view of the user shown on the display generation component were replaced with the pass-through portion), the computer system changes an appearance of the view of the virtual environment in a first manner that indicates a physical characteristic of the first portion of the first physical object, without changing an appearance of the view of the virtual environment to indicate a second portion of the first physical object that is part of the extent of the first physical object that is potentially visible to the user based on the field of view of the user for the virtual environment (e.g., the first portion of the first physical object is a first part of the extent of the first physical object that is potentially visible that is closest to the user and the second portion of the first physical object is a second part of the extent of the first physical object that is potentially visible that is farther away from the user than the first portion of the first physical object). This is illustrated in FIG. 7O, where a portion 7604 of the physical object 7602 is visually represented in virtual environment 7620, while some portions of the physical object 7602 are not visually represented despite the fact that those portions are also potentially visible (e.g., in the user's line of sight and not blocked by other physical objects in the physical environment) in accordance with the user's field of view of the virtual environment, for example. In some embodiments, the physical characteristic of the first portion of the first physical object includes one or more of size, shape, color, pattern, and a corresponding location in the physical environment; and the change in appearance of the view of the virtual environment in the first manner is distinct from generating a simple visual alert/notification or displaying a pass-through view of the physical environment (e.g., displaying a video feed of the camera in the pass-through portion, or making a predefined portion of the display see-through (e.g., a the pass-through view has a predefined shape or size that is unrelated to the shape and size of the first physical object)). In some embodiments, the portion of the view of the virtual environment remains smoothly connected and blended in with the other portions of the view of the virtual environment, thus providing only a moderate degree of interruptions to the immersive experience provided by the view of the virtual environment. In some embodiments, "the field of view of the user for the virtual environment" corresponds to (1) a range of the physical environment that is detectable/detected by one or more sensors (e.g., cameras (e.g., visible light or infrared cameras)) of the electronic device; (2) a naked-eye view of the physical environment by an average user (e.g., within a normal viewing distance and not blocking by other physical objects) with the current location and direction of the user's eyes; and/or (3) the range of the physical environment or naked-eye view of the physical environment in (1) and (2) that is confined within the boundary of the displayed field of view (e.g., the angular extent of the viewport) for the virtual environment. In some embodiments, changing an appearance of the view includes replacing a portion of the view of the virtual environment corresponding to the location/position/distance/orientation of the first portion of the first physical object in the physical environment with a visual representation of the first portion of the physical object. In some embodiments, the first portion of the first physical object that is used to alter the appearance of the virtual environment is segmented (e.g., along the boundaries of the first portion of the first physical object) from the entire extent of the first physical object that is currently captured within the field of view of the camera and segmented (e.g., along the visual boundaries of the first portion of the first physical object) from the surrounding physical environment (e.g., the portion of surrounding physical environment that adjacent to the first physical object, or blocking or being blocked by a portion of the first physical object) that is currently captured within the field of view of the camera, so even though the electronic device is in possession of the image data for altering the appearance of the view of the virtual environment based on a bigger extent of the first physical object and altering the appearance of the view of the virtual environment based on a portion of the surrounding physical environment of the first physical object, the electronic device forgoes doing so by design. In other words, the portion and amount of the first physical object that is used to alter the appearance of the view of the virtual environment is determined based on the shape and size of the first physical object and the distances of different parts of the first physical object to the user, in addition to which part of the first physical object is currently in the camera view. In addition, the electronic device forgoes altering the appearance of the virtual environment based on image data of portions of the physical environment that appear immediately adjacent to the first portion of the first physical object in the camera view, such that the physical boundaries of the first portion of the first physical object is visually represented in the changed appearance of the view of the virtual environment. Referring back to FIG. 13, in response to detecting the first movement of the user in the physical environment (13006): in accordance with a determination that the user (e.g., the center of the user, any part of the user, or a predefined portion of the user (e.g., a hand or foot of the user) is not within the threshold distance of the first physical object present in the physical environment surrounding the user, forgoing changing the appearance of the view of the virtual environment in the first manner that indicates the physical characteristic of the first portion of the first physical object (e.g., despite of the fact that the first physical object has an extent that is potentially visible to the user based on the field of view of the user (e.g., a typical field of view of a human (e.g., ~200 degrees) or the field of view of a HMD (e.g., ~100-200 degrees)) for the virtual environment).

In some embodiments, changing the appearance of the view of the virtual environment in the first manner that indicates the physical characteristic of the first portion of the first physical object further includes: maintaining the appearance of the view of the virtual environment in a first portion of the virtual environment while changing the appearance of the view of the virtual environment in a second portion of the virtual environment, wherein a boundary between the first portion of the virtual environment and the second portion of the virtual environment in the changed view of the virtual environment corresponds to a physical boundary of the first portion of the first physical object (e.g., the location and shape of the boundary between an altered portion of the virtual environment and an unaltered portion of the virtual environment correspond to the location and shape of the first portion of the first physical object as captured in the camera view, rather than an artificial boundary of a predefined cut-out area. This is distinct from a cut-out or pass-through area (e.g., a simulated flashlight illuminated region that displays the camera feed) with a predefined shape and size for displaying a camera view that are independent of the shapes and sizes of physical objects included in the cut-out or pass-through area.

In some embodiments, the computer system detects second movement of the user relative to the first physical object in the physical environment (e.g., after the first movement of the user is detected). In response to detecting the second movement of the user relative to the first physical object in the physical environment: in accordance with a determination that the user is within the threshold distance of the second portion of the first physical object that is part of the extent of the first physical object that is potentially visible to the user based on the field of view of the user for the virtual environment (e.g., based on the field of view at the current moment and user's current location and heading direction) (e.g., all or part of the first physical object would be visible in a pass-through portion that displays the physical environment in front of the user if the field of view of the user shown on the display generation component were replaced with the pass-through portion), the computer system changes the appearance of the view of the virtual environment in a second manner that indicates a physical characteristic of the second portion of the first physical object. In some embodiments, in response to the second movement of the user relative to the first physical object, in accordance with a determination that the user is no longer within the threshold distance of the first portion of the physical object after the second movement, the portion of the view of the virtual environment corresponding to the physical characteristic of the first portion of the physical object (e.g., a portion of the table) is changed back to the original virtual content (e.g., grass) at that location; and in accordance with a determination that the user is still within the threshold distance of the first portion of the physical object after the second movement, the view of the virtual environment is changed in a manner that indicates the physical characteristics of both the first and the second portions of the first physical object.

In some embodiments, changing the appearance of the view of the virtual environment in the first manner that indicates the physical characteristic of the first portion of the first physical object further comprises: displaying a translucent visual representation of the first portion of the first physical object in the view of the virtual environment (e.g., making the virtual content shown at the location corresponding to the first portion of the first physical object in the field of view of the user for the virtual environment semi-transparent, such that image of the first portion of the first physical object is visible at that location in a translucent manner, or making the image of the first portion of the first physical object semi-transparent and overlay it on the virtual content shown at that location). In some embodiments, the view of the virtual environment is changed instantaneously as the user moves towards the first portion of the first physical object and comes within the threshold distance so as to provide a timely alert to the user. In some embodiments, the view of the virtual environment is changed gradually, e.g., with fade-in/fade-out effect, to provide a smoother transition and less disruptive/intrusive user experience.

In some embodiments, changing the appearance of the view of the virtual environment in the first manner that indicates the physical characteristic of the first portion of the first physical object further comprises: distorting a portion of the virtual environment in a shape that represents a shape of the first portion of the first physical object (e.g., generating a portion of the virtual environment with a glassy appearance to generate an appearance as if the first physical object were made out of glass or another translucent material and placed over a portion of the virtual environment) (e.g., the representation of the first portion of the first physical object has a simulated refractive index that bends the light coming from the portion of the virtual content underlying the representation of the first portion of the first physical object). For example, as the user gets closer to a table placed in the room, the device shows a portion of the table that is closest to the user as a glossy, semi-transparent, see-through object placed in front of a virtual environment (e.g., a ball or virtual meadow in the virtual view, and the virtual objects behind the portion of the table is visible through the portion of the glassy-looking table).

In some embodiments, changing the appearance of the view of the virtual environment in the first manner that indicates the physical characteristic of the first portion of the first physical object further includes displaying a predefined distortion of a portion of the view of the virtual environment that corresponds to the first portion of the first physical object. In some embodiments, distorting the virtual content shown at a location in the view of the virtual environment that corresponds to the first portion of the physical object is used as a way to reflect characteristics such as shape, size, boundary, and/or location of the first portion of the first physical object. In some embodiments, distorting the virtual content includes stretching a portion of the view of the virtual environment, applying a static or animated visual effect, such as applying a shimmering, rippling, glowing, darkening, blurring, or swirling visual effect, to the virtual content, or applying a different texture (e.g., different tint, reflectivity, roughness, graininess, etc.) to the virtual content.

In some embodiments, the computer system detects continued movement of the user in the physical environment after the first movement. In response to detecting the continued movement of the user in the physical environment after the first movement and in accordance with a determination that the user (e.g., the center of the user, any part of the user, or a predefined portion of the user (e.g., a hand or foot of the user) remains within the threshold distance of the first portion of the first physical object: in accordance with a determination that the distance between the user and the first portion of the first physical object has increased as a result of the continued movement of the user in the physical environment, the computer system decreases a first display property of a visual effect that is currently applied to the view of the virtual environment that indicates the physical characteristic of the first portion of the first physical object (e.g., gradually decreasing a degree of refraction, color saturation, visual effect, opacity, clarity, etc. applied to the view of the virtual environment at the location corresponding to the first portion of the first physical object, as the user gradually moves farther away from the first portion of the first physical object, such that the visual impact created by the physical characteristic of the first portion of the first physical object is gradually lessened on the display when the user moves away from the first portion of the first physical object). In response to detecting the continued movement of the user in the physical environment after the first movement and in accordance with a determination that the distance between the user and the first portion of the first physical object has decreased as a result of the continued movement of the user in the physical environment, the computer system increases the first display property of the visual effect that is currently applied to the view of the virtual environment that indicates the physical characteristic of the first portion of the first physical object (e.g., gradually increasing a degree of refraction, color saturation, visual effect, opacity, clarity, etc. applied to the view of the virtual environment at the location corresponding to the first portion of the first physical object, as the user gradually moves closer to the first portion of the first physical object, such that the visual impact created by the physical characteristic of the first portion of the first physical object is gradually increased on the display when the user moves closer toward the first portion of the first physical object). In some embodiments, the first display property of the visual effect that is applied to the view of the virtual environment that indicates the physical characteristic of the first portion of the first physical object is distinct from the spatial extent, boundary, or application location of the visual effect. The spatial extent of the visual effect increases as the user moves closer to the first physical object, and the first portion of the first physical object appears bigger in the user's field of view for the virtual environment.

In some embodiments, the computer system detects continued movement of the user in the physical environment after the first movement. In response to detecting the continued movement of the user in the physical environment after the first movement and while the first physical object (e.g., including the first portion and a second portion of the first physical object) is potentially visible to the user based on the field of view of the user for the virtual environment (e.g., based on the field of view at the current moment and user's current location and heading direction) (e.g., all or part of the first physical object would be visible in a pass-through portion that displays the physical environment in front of the user if the field of view of the user shown on the display generation component were replaced with the pass-through portion): in accordance with a determination that the distance between the user and the first portion of the first physical object has increased above the threshold distance as a result of the continued movement of the user in the physical environment and a determination that the distance between the user and the second portion of the first physical object has decreased below the threshold distance as a result of the continued movement of the user in the physical environment: the computer system ceases to change the appearance of the view of the virtual environment in the first manner that indicates the physical characteristic of the first portion of the first physical object, without changing the appearance of the view of the virtual environment to indicate the second portion of the first physical object that is part of the extent of the first physical object that is potentially visible to the user based on the field of view of the user for the virtual environment (e.g., ceasing to apply the visual effect to the view of the virtual environment that indicates the physical characteristic of the first portion of the first physical object (e.g., ceasing to apply the refraction, color saturation, visual effect, opacity, clarity, etc. to the view of the virtual environment at the location corresponding to the first portion of the first physical object, as the user moves outside of threshold distance of the first portion of the first physical object, such that the first portion of the first physical object is no longer visually represented by the visual effect on the display when the user moves sufficiently far away from the first portion of the first physical object)); and the computer system changes the appearance of the view of the virtual environment in a second manner that indicates the physical characteristic of the second portion of the first physical object, without changing the appearance of the view of the virtual environment to indicate the first portion of the first physical object that is part of the extent of the first physical object that is potentially visible to the user based on the field of view of the user for the virtual environment (e.g., applying the visual effect to the view of the virtual environment that indicates the physical characteristic of the second portion of the first physical object (e.g., to apply the refraction, color saturation, visual effect, opacity, clarity, etc. to the view of the virtual environment at the location corresponding to the second portion of the first physical object, as the user moves within the threshold distance of the second portion of the first physical object, such that the first portion of the first physical object is no longer visually represented by the visual effect on the display and the second portion of the first physical object is visually represented by the visual effect on the display)).

In some embodiments, the computer system changes a rate of changing the appearance of the view of the virtual environment that indicates the physical characteristic of the first portion of the first physical object in accordance with a speed of the first movement of the user relative to the first physical object in the physical environment. For example, if the user moves faster relative to the first physical object in the physical environment, the appearance of the virtual environment changes faster (e.g., the visual impact of the visual effect used to reflect the physical characteristic of the first portion of the first physical object increases more quickly on the display); and if the user moves slower relative to the first physical object in the physical environment, the appearance of the virtual environment changes slower (e.g., the visual impact of the visual effect used to reflect the physical characteristic of the first portion of the first physical object increases more gradually and slowly on the display).

In some embodiments, the computer system persistently displays a representation of at least a portion of the second physical object in the view of the virtual environment that indicates a physical characteristic (e.g., shape, size, location, boundary, etc.) of the second physical object, wherein the second physical object is selected by the user (e.g., before displaying the view of the virtual environment or while displaying a visual representation of the second physical object in the view of the virtual environment, the device detected a user input selecting the second physical object that is to be persistently represented (or otherwise visually represented) in the virtual environment to indicate the physical characteristic (e.g., location, shape, size, boundary, etc.) of the second physical object, irrespective of the distance between the user and the second physical object in the physical environment). In some embodiments, the user selects the second physical object to be persistently represented in the view of the virtual environment by selecting the second physical object from a menu, or pointing at a wall or an object in the room in a pass-through view of the room, or a predetermined gesture (e.g., raising an arm) to display representation of walls in the room. In some embodiments, the user is allowed to identify physical objects (such as a dangerous obstacle to avoid (e.g., a fireplace or a heater), a boundary of the room (e.g., walls, windows, doors, or stairs)) such that their locations, shapes, and/or boundaries are persistently represented visually in the view of the virtual environment, to help the user orient himself/herself while having the immersive virtual experience in the virtual environment.

In some embodiments, after changing the appearance of the view of the virtual environment in the first manner that indicates the physical characteristic of the first portion of the first physical object, the computer system detects a change in a posture of the user in the physical environment (e.g., the user raises one or both arms with palms open, or tilts his/her upper body backward a little while moving forward, or otherwise indicating uncertainty of his/her position relative to the obstacles in the physical environment). In some embodiments, the change in posture of the user includes movement of both hands of the user upward with more than a threshold starting speed (e.g., a sudden movement). In response to detecting the change in the posture, and in accordance with a determination that the change in posture meets first predefine posture criteria (e.g., criteria for recognizing the hands/arms up, palm open, arched back postures, or other posture type(s) may be pre-set at the manufacturer and/or during customization by individual users), the computer system changes the appearance of the view of the virtual environment in a respective manner that increases visibility of the first physical object in the view of the virtual environment. Allowing the user to use a gesture or change in posture to cause the system to reveal the physical environment is a fast and efficient user safety feature that does not place cognitive burden on the user. When a natural gesture that indicates the user is concerned about bumping into something (e.g., suddenly raising of both hands together) triggers display of additional information about potential obstacles in the physical space surrounding the user, the system allows the user to quickly reorient himself and reassure himself of his/her safety in the environment.

In some embodiments, changing the appearance of the view of the virtual environment in a respective manner that increases visibility of the first physical object in the view of the virtual environment includes: increasing a display property (e.g., opaqueness, saturation, clarity, contrast, distortion, etc.) of a visual effect that is currently applied to a portion of the virtual environment that indicates the physical characteristic of the first portion of the first physical object. For example, when detecting that the user elevates his right arm with an open palm, the changed view corresponding to the first portion of the first physical object becomes brighter with sharper contrast, so the physical characteristic of the first portion of the first physical object becomes more visible to the user.

In some embodiments, changing the appearance of the view of the virtual environment in a respective manner that increases visibility of the first physical object in the view of the virtual environment includes: increasing an extent of the view of the virtual environment of which the appearance is changed to indicate the physical characteristic of an additional portion of the first physical object (e.g., while maintaining the change in appearance of the view of the virtual environment that indicates the physical characteristic of the first portion of the first physical object). For example, in some embodiments, when the user abruptly raises both hands with palms open facing forward, or when the user raises his arms slightly when moving forward, the device makes more portions or all of the first physical object visible within the view of the virtual environment (e.g., through visual effect allowed to a portion of the virtual content in the view of the virtual environment). In some embodiments, the speed by which the user raised his/her arms is used to determine how much of the first physical object is made visible in the virtual environment. In some embodiments, all portions of the first physical object that are potentially visible to the user based on the field of view of the user for the virtual environment are revealed to the user when the first predefine posture criteria are met by the user's change in posture.

In some embodiments, changing the appearance of the view of the virtual environment in a respective manner that increases visibility of the first physical object in the view of the virtual environment includes: increasing an extent of the view of the virtual environment of which the appearance is changed to indicate the physical characteristic of all physical objects (e.g., including the first physical object and one or more other physical objects not represented in the view of the virtual environment) that are potentially visible to the user based on the field of view of the user for the virtual environment. For example, in some embodiments, all physical objects that are potentially visible to the user based on the field of view of the user for the virtual environment are revealed to the user when the first predefine posture criteria are met by the user's change in posture.

In some embodiments, after detecting the change in posture that meets the first predefined posture criteria, the computer system detects a reversed change in the posture of the user in the physical environment (e.g., the user lowers one or both of the raise arms, or restores his/her upper body to the upright position while moving forward, or otherwise indicating confidence of his/her position relative to the obstacles in the physical environment). In response to detecting the reversed change in the posture, and in accordance with a determination that the reversed change in posture meets second predefine posture criteria (e.g., criteria for recognizing the restoration of a normal posture), the computer system changes the appearance of the view of the virtual environment in a respective manner that reverses the increased visibility of the first physical object in the view of the virtual environment (e.g., reducing the amount of the first physical object that is shown, or reducing one or more the above-mentioned display properties of the visual effect used to indicate the physical characteristic of the first physical object).

In some embodiments, after changing the appearance of the view of the virtual environment in the first manner that indicates the physical characteristic of the first portion of the first physical object, in accordance with a determination that virtual-view-restoration criteria are met, wherein the virtual-view-restoration criteria require that the position of the user and the first portion of the first physical object has remained unchanged for a first threshold amount of time, the computer system reverses the change (e.g., ceasing the change all at once, or gradually reducing the amount of change over a predefined period of time) (e.g., the speed of reversal is optionally slower than the speed of applying the change initially, or the speed of the reversal is in accordance with a movement metric of a reversal gesture provided by the user) in the appearance of the view of the virtual environment in the first manner (e.g., to reduce visibility of the first portion of the first physical object in the view of the virtual environment).

It should be understood that the particular order in which the operations in FIG. 13 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 10000, 11000, and 12000) are also applicable in an analogous manner to method 13000 described above with respect to FIG. 13. For example, the gestures, gaze inputs, physical objects, user interface objects, and/or animations described above with reference to method 13000 optionally have one or more of the characteristics of the gestures, gaze inputs, physical objects, user interface objects, and/or animations described herein with reference to other methods described herein (e.g., methods 8000, 9000, 10000, 11000, and 12000). For brevity, these details are not repeated here.

The operations described above with reference to FIGS. 8, 9, 10, 11, 12, and 13 are, optionally, implemented by components depicted in FIGS. 1-6. In some embodiments, aspects/operations of methods 8000, 9000, 10000, 11000, 12000, and 13000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device including a display generation component and one or more input devices:
displaying, via the display generation component, a three-dimensional environment, including one or more virtual objects;
detecting, via the one or more input devices, gaze, of a user of the electronic device, directed toward a first virtual object in the three-dimensional environment, wherein the gaze meets first criteria and the first virtual object is responsive to at least one gesture input; and
in response to detecting the gaze that meets the first criteria and that is directed toward the first virtual object responsive to at least one gesture input:
in accordance with a determination that a hand is in a predefined ready state for providing gesture inputs while detecting that the gaze of the user is directed toward the first virtual object, displaying, via the display generation component, an indication of one or more interaction options available for the first virtual object in the three-dimensional environment; and
in accordance with a determination the hand is not in the predefined ready state for providing gesture inputs while detecting that the gaze of the user is directed toward the first virtual object, forgoing displaying the indication of one or more interaction options available for the first virtual object.

2. The method of claim 1, wherein determining that the hand is in the predefined ready state for providing gesture inputs includes determining that a predefined portion of the hand is in contact with a physical control element.

3. The method of claim 1, wherein determining that the hand is in the predefined ready state for providing gesture inputs includes determining that the hand is raised above a predefined level relative to the user.

4. The method of claim 1, wherein determining that the hand is in the predefined ready state for providing gesture inputs includes determining that the hand is in a predefined configuration.

5. The method of claim 1, wherein displaying the indication of one or more interaction options available for the first virtual object includes displaying information about the first virtual object that is adjustable in response to a subsequent input.

6. The method of claim 1, wherein displaying the indication of one or more interaction options available for the first virtual object includes displaying an animation of the first virtual object.

7. The method of claim 1, wherein displaying the indication of one or more interaction options available for the first virtual object includes displaying a selection indicator over at least a portion of the first virtual object.

8. The method of claim 1, including:
detecting the gaze directed toward a second virtual object in the three-dimensional environment, wherein the gaze meets the first criteria and the second virtual object is responsive to at least one gesture input; and
in response to detecting the gaze that meets the first criteria and that is toward the second virtual object that is responsive to at least one gesture input:
in accordance with a determination that the hand is in the predefined ready state for providing gesture inputs, displaying an indication of one or more interaction options available for the second virtual object.

9. The method of claim 1, including:
in response to detecting the gaze that meets the first criteria and that is directed toward the first virtual object that is responsive to at least one gesture input:
in accordance with the determination that the hand is in the predefined ready state for providing gesture inputs while detecting that the gaze of the user is directed toward the first virtual object:
detecting, via the one or more input devices, a first gesture input by the hand; and
in response to detecting the first gesture input by the hand, performing an interaction with the first virtual object.

10. The method of claim 9, wherein the first virtual object includes a first image, and performing the interaction with the first virtual object includes replacing the first image with a second image that is different from the first image.

11. The method of claim 9, wherein the first virtual object includes a first playable media content, and performing the interaction with the first virtual object includes toggling playback of the first playable media content.

12. The method of claim 9, wherein the first virtual object is a virtual window displaying first virtual scenery, and performing the interaction with the first virtual object includes replacing display of the first virtual scenery with display of second virtual scenery that is different from the first virtual scenery.

13. The method of claim 9, wherein:
the first gesture input is an upward flick gesture; and
performing the interaction with the first virtual object includes displaying a user interface with one or more interaction options for the first virtual object.

14. The method of claim 9, wherein:
the first gesture input includes rotation of the hand; and
performing the interaction with the first virtual object includes changing an output volume of content associated with the first virtual object.

15. The method of claim 1, wherein the first criteria include a requirement that the gaze remains directed toward the first virtual object for at least a threshold amount of time.

16. The method of claim 1, wherein:
in accordance with a determination the hand is in the predefined ready state for providing gesture inputs while detecting that the gaze of the user is not directed toward the first virtual object, forgoing displaying the indication of one or more interaction options available for the first virtual object.

17. An electronic device, comprising:
one or more processors;
a display generation component;
one or more input devices; and
memory storing one or more programs that are configured for execution by the one or more processors, the one or more programs including instructions for:
displaying, via the display generation component, a three-dimensional environment, including one or more virtual objects;
detecting, via the one or more input devices, gaze, of a user of the electronic device, directed toward a first virtual object in the three-dimensional environment, wherein the gaze meets first criteria and the first virtual object is responsive to at least one gesture input; and
in response to detecting the gaze that meets the first criteria and that is toward the first virtual object responsive to at least one gesture input:
in accordance with a determination that a hand is in a predefined ready state for providing gesture inputs while detecting that the gaze of the user is directed toward the first virtual object, displaying, via the display generation component, an indication of one or more interaction options available for the first virtual object in the three-dimensional environment; and
in accordance with a determination the hand is not in the predefined ready state for providing gesture inputs while detecting that the gaze of the user is directed toward the first virtual object, forgoing displaying the indication of one or more interaction options available for the first virtual object.

18. The electronic device of claim 17, wherein determining that the hand is in the predefined ready state for providing gesture inputs includes determining that a predefined portion of the hand is in contact with a physical control element.

19. The electronic device of claim 17, wherein determining that the hand is in the predefined ready state for providing gesture inputs includes determining that the hand is raised above a predefined level relative to the user.

20. The electronic device of claim 17, wherein determining that the hand is in the predefined ready state for providing gesture inputs includes determining that the hand is in a predefined configuration.

21. The electronic device of claim 17, wherein displaying the indication of one or more interaction options available for the first virtual object includes displaying information about the first virtual object that is adjustable in response to a subsequent input.

22. The electronic device of claim 17, wherein displaying the indication of one or more interaction options available for the first virtual object includes displaying an animation of the first virtual object.

23. The electronic device of claim 17, wherein displaying the indication of one or more interaction options available for the first virtual object includes displaying a selection indicator over at least a portion of the first virtual object.

24. The electronic device of claim 17, wherein the one or more programs include instructions for:
  detecting the gaze directed toward a second virtual object in the three-dimensional environment, wherein the gaze meets the first criteria and the second virtual object is responsive to at least one gesture input; and
  in response to detecting the gaze that meets the first criteria and that is toward the second virtual object that is responsive to at least one gesture input:
    in accordance with a determination that the hand is in the predefined ready state for providing gesture inputs, displaying an indication of one or more interaction options available for the second virtual object.

25. The electronic device of claim 17, wherein the one or more programs include instructions for:
  in response to detecting the gaze that meets the first criteria and that is directed toward the first virtual object that is responsive to at least one gesture input:
    in accordance with the determination that the hand is in the predefined ready state for providing gesture inputs while detecting that the gaze of the user is directed toward the first virtual object:
      detecting, via the one or more input devices, a first gesture input by the hand; and
      in response to detecting the first gesture input by the hand, performing an interaction with the first virtual object.

26. The electronic device of claim 25, wherein the first virtual object includes a first image, and performing the interaction with the first virtual object includes replacing the first image with a second image that is different from the first image.

27. The electronic device of claim 25, wherein the first virtual object includes a first playable media content, and performing the interaction with the first virtual object includes toggling playback of the first playable media content.

28. The electronic device of claim 25, wherein the first virtual object is a virtual window displaying first virtual scenery, and performing the interaction with the first virtual object includes replacing display of the first virtual scenery with display of second virtual scenery that is different from the first virtual scenery.

29. The electronic device of claim 25, wherein:
  the first gesture input is an upward flick gesture; and
  performing the interaction with the first virtual object includes displaying a user interface with one or more interaction options for the first virtual object.

30. The electronic device of claim 25, wherein:
  the first gesture input includes rotation of the hand; and
  performing the interaction with the first virtual object includes changing an output volume of content associated with the first virtual object.

31. The electronic device of claim 17, wherein the first criteria include a requirement that the gaze remains directed toward the first virtual object for at least a threshold amount of time.

32. The electronic device of claim 17, wherein the one or more programs include instructions for:
  in accordance with a determination the hand is in the predefined ready state for providing gesture inputs while detecting that the gaze of the user is not directed toward the first virtual object, forgoing displaying the indication of one or more interaction options available for the first virtual object.

33. A non-transitory computer-readable storage medium storing executable instructions that, when executed by an electronic device with one or more processors, a display generation component and one or more input devices, cause the electronic device to:
  display, via the display generation component, a three-dimensional environment, including one or more virtual objects;
  detect, via the one or more input devices, gaze, of a user of the electronic device, directed toward a first virtual object in the three-dimensional environment, wherein the gaze meets first criteria and the first virtual object is responsive to at least one gesture input; and
  in response to detecting the gaze that meets the first criteria and that is toward the first virtual object responsive to at least one gesture input:
    in accordance with a determination that a hand is in a predefined ready state for providing gesture inputs while detecting that the gaze of the user is directed toward the first virtual object, display, via the display generation component, an indication of one or more interaction options available for the first virtual object in the three-dimensional environment; and
    in accordance with a determination the hand is not in the predefined ready state for providing gesture inputs while detecting that the gaze of the user is directed toward the first virtual object, forgo displaying the indication of one or more interaction options available for the first virtual object.

34. The non-transitory computer-readable storage medium of claim 33, wherein determining that the hand is in the predefined ready state for providing gesture inputs includes determining that a predefined portion of the hand is in contact with a physical control element.

35. The non-transitory computer-readable storage medium of claim 33, wherein determining that the hand is in the predefined ready state for providing gesture inputs includes determining that the hand is raised above a predefined level relative to the user.

36. The non-transitory computer-readable storage medium of claim 33, wherein determining that the hand is in the predefined ready state for providing gesture inputs includes determining that the hand is in a predefined configuration.

37. The non-transitory computer-readable storage medium of claim 33, wherein displaying the indication of one or more interaction options available for the first virtual object includes displaying information about the first virtual object that is adjustable in response to a subsequent input.

38. The non-transitory computer-readable storage medium of claim 33, wherein displaying the indication of one or more interaction options available for the first virtual object includes displaying an animation of the first virtual object.

39. The non-transitory computer-readable storage medium of claim 33, wherein displaying the indication of one or more interaction options available for the first virtual object includes displaying a selection indicator over at least a portion of the first virtual object.

40. The non-transitory computer-readable storage medium of claim 33, wherein the executable instructions that, when executed by the electronic device, cause the electronic device to:
detect the gaze directed toward a second virtual object in the three-dimensional environment, wherein the gaze meets the first criteria and the second virtual object is responsive to at least one gesture input; and
in response to detecting the gaze that meets the first criteria and that is toward the second virtual object that is responsive to at least one gesture input:
in accordance with a determination that the hand is in the predefined ready state for providing gesture inputs, display an indication of one or more interaction options available for the second virtual object.

41. The non-transitory computer-readable storage medium of claim 33, wherein the executable instructions that, when executed by the electronic device, cause the electronic device to:
in response to detecting the gaze that meets the first criteria and that is directed toward the first virtual object that is responsive to at least one gesture input:
in accordance with the determination that the hand is in the predefined ready state for providing gesture inputs while detecting that the gaze of the user is directed toward the first virtual object:
detect, via the one or more input devices, a first gesture input by the hand; and
in response to detecting the first gesture input by the hand, perform an interaction with the first virtual object.

42. The non-transitory computer-readable storage medium of claim 41, wherein the first virtual object includes a first image, and performing the interaction with the first virtual object includes replacing the first image with a second image that is different from the first image.

43. The non-transitory computer-readable storage medium of claim 41, wherein the first virtual object includes a first playable media content, and performing the interaction with the first virtual object includes toggling playback of the first playable media content.

44. The non-transitory computer-readable storage medium of claim 41, wherein the first virtual object is a virtual window displaying first virtual scenery, and performing the interaction with the first virtual object includes replacing display of the first virtual scenery with display of second virtual scenery that is different from the first virtual scenery.

45. The non-transitory computer-readable storage medium of claim 41, wherein:
the first gesture input is an upward flick gesture; and
performing the interaction with the first virtual object includes displaying a user interface with one or more interaction options for the first virtual object.

46. The non-transitory computer-readable storage medium of claim 41, wherein:
the first gesture input includes rotation of the hand; and
performing the interaction with the first virtual object includes changing an output volume of content associated with the first virtual object.

47. The non-transitory computer-readable storage medium of claim 33, wherein the first criteria include a requirement that the gaze remains directed toward the first virtual object for at least a threshold amount of time.

48. The non-transitory computer-readable storage medium of claim 33, wherein the executable instructions that, when executed by the electronic device, cause the electronic device to:
in accordance with a determination the hand is in the predefined ready state for providing gesture inputs while detecting that the gaze of the user is not directed toward the first virtual object, forgoing displaying the indication of one or more interaction options available for the first virtual object.

* * * * *

UNITED STATES PATENT AND TRADEMARK OFFICE
CERTIFICATE OF CORRECTION

PATENT NO. : 12,314,529 B2
APPLICATION NO. : 18/244864
DATED : May 27, 2025
INVENTOR(S) : Stephen O. Lemay et al.

Page 1 of 1

It is certified that error appears in the above-identified patent and that said Letters Patent is hereby corrected as shown below:

In the Specification

Column 60, Line 31, please delete "Figure 1A" and insert --Figure 1--.

Column 67, Line 66, please delete "Figure 1A" and insert --Figure 1--.

Column 71, Line 44, please delete "Figure 1A" and insert --Figure 1--.

Column 79, Line 48, please delete "Figure 1A" and insert --Figure 1--.

Column 86, Line 51, please delete "Figure 1A" and insert --Figure 1--.

Column 93, Line 15, please delete "Figure 1A" and insert --Figure1--.

Signed and Sealed this
Second Day of September, 2025

Coke Morgan Stewart
*Acting Director of the United States Patent and Trademark Office*